(12) United States Patent
Lee et al.

(10) Patent No.: US 11,792,424 B2
(45) Date of Patent: Oct. 17, 2023

(54) METHOD AND DEVICE USING INTER PREDICTION INFORMATION

(71) Applicants: Electronics and Telecommunications Research Institute, Daejeon (KR); INDUSTRY-UNIVERSITY COOPERATION FOUNDATION KOREA AEROSPACE UNIVERSITY, Goyang-si (KR)

(72) Inventors: Jin-Ho Lee, Daejeon (KR); Jung-Won Kang, Daejeon (KR); Hyunsuk Ko, Daejeon (KR); Sung-Chang Lim, Daejeon (KR); Ha-Hyun Lee, Seoul (KR); Dong-San Jun, Daejeon (KR); Hui-Yong Kim, Daejeon (KR); Jae-Gon Kim, Goyang-si (KR); Do-Hyeon Park, Goyang-si (KR); Yong-Uk Yoon, Jeju-si (KR)

(73) Assignees: Electronics and Telecommunications Research Institute, Daejeon (KR); INDUSTRY-UNIVERSITY COOPERATION FOUNDATION KOREA AEROSPACE UNIVERSITY, Goyang-si (KR)

( * ) Notice: Subject to any disclaimer, the term of this patent is extended or adjusted under 35 U.S.C. 154(b) by 159 days.

(21) Appl. No.: 17/359,737

(22) Filed: Jun. 28, 2021

(65) Prior Publication Data

US 2021/0329294 A1    Oct. 21, 2021

Related U.S. Application Data

(63) Continuation of application No. 16/753,155, filed as application No. PCT/KR2018/011905 on Oct. 10, 2018, now Pat. No. 11,082,716.

(30) Foreign Application Priority Data

Oct. 10, 2017  (KR) .................. 10-2017-0129156
Dec. 22, 2017  (KR) .................. 10-2017-0178140
(Continued)

(51) Int. Cl.
 *H04N 19/573*  (2014.01)
 *H04N 19/176*  (2014.01)

(52) U.S. Cl.
 CPC ......... *H04N 19/573* (2014.11); *H04N 19/176* (2014.11)

(58) Field of Classification Search
 CPC ..................... H04N 19/573; H04N 19/176
 See application file for complete search history.

(56) References Cited

U.S. PATENT DOCUMENTS 9,554,150 B2   1/2017  Zhang et al.
10,116,941 B2  10/2018  Jeon et al.
(Continued)

FOREIGN PATENT DOCUMENTS

KR       10-1197176 B1    11/2012
KR    10-2014-0064944 A    5/2014
(Continued)

OTHER PUBLICATIONS

International Search Report dated Jan. 18, 2019 in counterpart International Patent Application No. PCT/KR2018/011905 (2 pages in English and 3 pages in Korean).

*Primary Examiner* — Nam D Pham
(74) *Attorney, Agent, or Firm* — NSIP Law

(57) ABSTRACT

Disclosed herein are a video decoding method and apparatus and a video encoding method and apparatus. In video encoding and decoding, inter-prediction information for a target block may be derived, and inter prediction for a target block may be performed using the derived inter-prediction (Continued)

information. Combined inter-prediction information may be performed by combining multiple pieces of inter-prediction information, and the combined inter-prediction information may be added as a candidate to a list used for inter prediction. One of candidates in the list may be selected for inter prediction for the target block, and inter prediction using the selected candidate may be performed.

18 Claims, 34 Drawing Sheets

(30) Foreign Application Priority Data

Jun. 20, 2018 (KR) .......................... 10-2018-0071065
Oct. 10, 2018 (KR) .......................... 10-2018-0120642

(56) References Cited

U.S. PATENT DOCUMENTS

| | | | |
|---|---|---|---|
| 10,341,677 | B2 | 7/2019 | Sung et al. |
| 2014/0205013 | A1 | 7/2014 | Kim et al. |
| 2015/0195520 | A1* | 7/2015 | Li .................. H04N 19/176 |
| | | | 375/240.02 |
| 2016/0219278 | A1 | 7/2016 | Chen et al. |
| 2016/0381374 | A1 | 12/2016 | Bang et al. |
| 2018/0124398 | A1* | 5/2018 | Park .................. H04N 19/70 |
| 2019/0158876 | A1 | 5/2019 | Liu et al. |
| 2020/0045306 | A1* | 2/2020 | Lee .................. H04N 19/105 |

FOREIGN PATENT DOCUMENTS

| | | |
|---|---|---|
| KR | 10-1457930 B1 | 11/2014 |
| KR | 10-2016-0075753 A | 6/2016 |
| KR | 10-2017-0108010 A | 9/2017 |
| KR | 10-2017-0108012 A | 9/2017 |
| WO | WO 2016/175550 A1 | 11/2016 |

* cited by examiner

|   | e | f | g | h |
|---|---|---|---|---|
| d | A | B | C | D |
| c | E | F | G | H |
| b | I | J | K | L |
| a | M | N | O | P |

METHOD AND DEVICE USING INTER PREDICTION INFORMATION

This application is a Continuation application of U.S. patent application Ser. No. 16/753,155, filed on Apr. 2, 2020, which is a U.S. National Stage Application of International Application No. PCT/KR2018/011905, filed on Oct. 10, 2018, which claims the benefit under 35 USC 119(a) and 365(b) of Korean Patent Application No. 10-2017-0129156, filed on Oct. 10, 2017, Korean Patent Application No. 10-2017-0178140, filed on Dec. 22, 2017, Korean Patent Application No. 10-2018-0071065, filed on Jun. 20, 2018, and Korean Patent Application No. 10-2018-0120642, filed on Oct. 10, 2018 in the Korean Intellectual Property Office, the entire disclosure of which is incorporated herein by reference for all purposes.

TECHNICAL FIELD

The following embodiments relate generally to a video decoding method and apparatus and a video encoding method and apparatus, and more particularly, to a method and apparatus that use inter-prediction information in video encoding and decoding.

BACKGROUND ART

With the continuous development of the information and communication industries, broadcasting services supporting High-Definition (HD) resolution have been popularized all over the world. Through this popularization, a large number of users have become accustomed to high-resolution and high-definition images and/or videos.

To satisfy users' demand for high definition, many institutions have accelerated the development of next-generation imaging devices. Users' interest in UHD TVs, having resolution that is more than four times as high as that of Full HD (FHD) TVs, as well as High-Definition TVs (HDTV) and FHD TVs, has increased. As interest therein has increased, image encoding/decoding technology for images having higher resolution and higher definition is continually required.

An image encoding/decoding apparatus and method may use inter-prediction technology, intra-prediction technology, entropy-coding technology, etc. so as to perform encoding/decoding on a high-resolution and high-definition image. Inter-prediction technology may be technology for predicting the value of a pixel included in a target picture using temporally previous pictures and/or temporally subsequent pictures. Intra-prediction technology may be technology for predicting the value of a pixel included in a target picture using information about pixels in the target picture. Entropy-coding technology may be technology for assigning short code words to frequently occurring symbols and assigning long code words to rarely occurring symbols.

Various prediction methods have been developed to improve the efficiency and accuracy of intra prediction and/or inter prediction. Prediction efficiency may vary greatly depending on which prediction method among various applicable prediction methods is used for encoding and/or decoding of a block.

DISCLOSURE

Technical Problem

An embodiment is intended to provide an encoding apparatus and method and a decoding apparatus and method that perform inter prediction for a target block.

An embodiment is intended to provide an encoding apparatus and method and a decoding apparatus and method that derive combined inter-prediction information for a target block and perform inter prediction using the derived combined inter-prediction information.

Technical Solution

In accordance with an aspect, there is provided an encoding apparatus, including a processing unit for deriving inter-prediction information for a target block and performing inter prediction for the target block using the derived inter-prediction information, wherein the processing unit configures a list for the target block using combined inter-prediction information, and wherein the processing unit generates the combined inter-prediction information by combining two or more of pieces of inter-prediction information of neighbor blocks of the target block.

In accordance with another aspect, there is provided a decoding apparatus, including a processing unit for deriving inter-prediction information for a target block and performing inter prediction for the target block using the derived inter-prediction information, wherein the processing unit configures a list for the target block using combined inter-prediction information, and wherein the processing unit generates the combined inter-prediction information by combining two or more of pieces of inter-prediction information of neighbor blocks of the target block.

In accordance with a further aspect, there is provided a decoding method, including deriving inter-prediction information for a target block; and performing inter prediction for the target block using the derived inter-prediction information, wherein a list for the target block is configured using combined inter-prediction information, and wherein the combined inter-prediction information is generated by combining two or more of pieces of inter-prediction information of neighbor blocks of the target block.

The inter-prediction information may include at least one of an Illumination Compensation (IC) flag and an Overlapped Block Motion Compensation (OBMC) flag.

The list may be a merge list or an Advanced Motion Vector Prediction (AMVP) list.

The neighbor blocks may include a spatial neighbor block and a temporal neighbor block of the target block.

When inter-prediction information of one of the neighbor blocks is unavailable, combined inter-prediction information for the one neighbor block may be derived.

When inter-prediction information of one of the neighbor blocks is not added to the list, the combined inter-prediction information derived for the one neighbor block may be added to the list.

A motion vector of the combined inter-prediction information may be a result of a formula that uses motion vectors of the neighbor blocks.

The motion vector of the combined inter-prediction information may be a weighted average of the motion vectors of the neighbor blocks.

The motion vector of the combined inter-prediction information may be a result of a weighted combination of the motion vectors of the neighbor blocks based on block size.

The motion vector of the combined inter-prediction information may be a result of a Picture Order Count (POC)-weighted combination of the motion vectors of the neighbor blocks.

The motion vector of the combined inter-prediction information may be a result of an extrapolation-based combination of the motion vectors of the neighbor blocks.

First inter-prediction information related to a location to left of a specific block and second inter-prediction information related to a location to right of the specific block may be derived, and the combined inter-prediction information may be generated by combining the first inter-prediction information with the second inter-prediction information.

A scheme for configuring the list may be determined based on a shape of the target block.

A scheme for configuring the list may be determined based on a splitting state of the target block.

A scheme for configuring the list may be determined based on a location of the target block.

The combined inter-prediction information may be added to the list with a priority lower than those of pieces of inter-prediction information of the neighbor blocks.

The combined inter-prediction information may be added to a location in the list that is subsequent to inter-prediction information of a spatial neighbor block and is previous to inter-prediction information of a temporal neighbor block.

A scheme for configuring the list may be determined based on a depth of the target block.

Advantageous Effects

There are provided an encoding apparatus and method and a decoding apparatus and method that perform inter prediction for a target block.

There are provided an encoding apparatus and method and a decoding apparatus and method that derive combined inter-prediction information for a target block and perform inter prediction using the derived combined inter-prediction information.

DESCRIPTION OF DRAWINGS

FIG. 28 illustrates spatial neighbor blocks of a target block and sub-blocks of the target block according to an example;

BEST MODE

Figure 1:
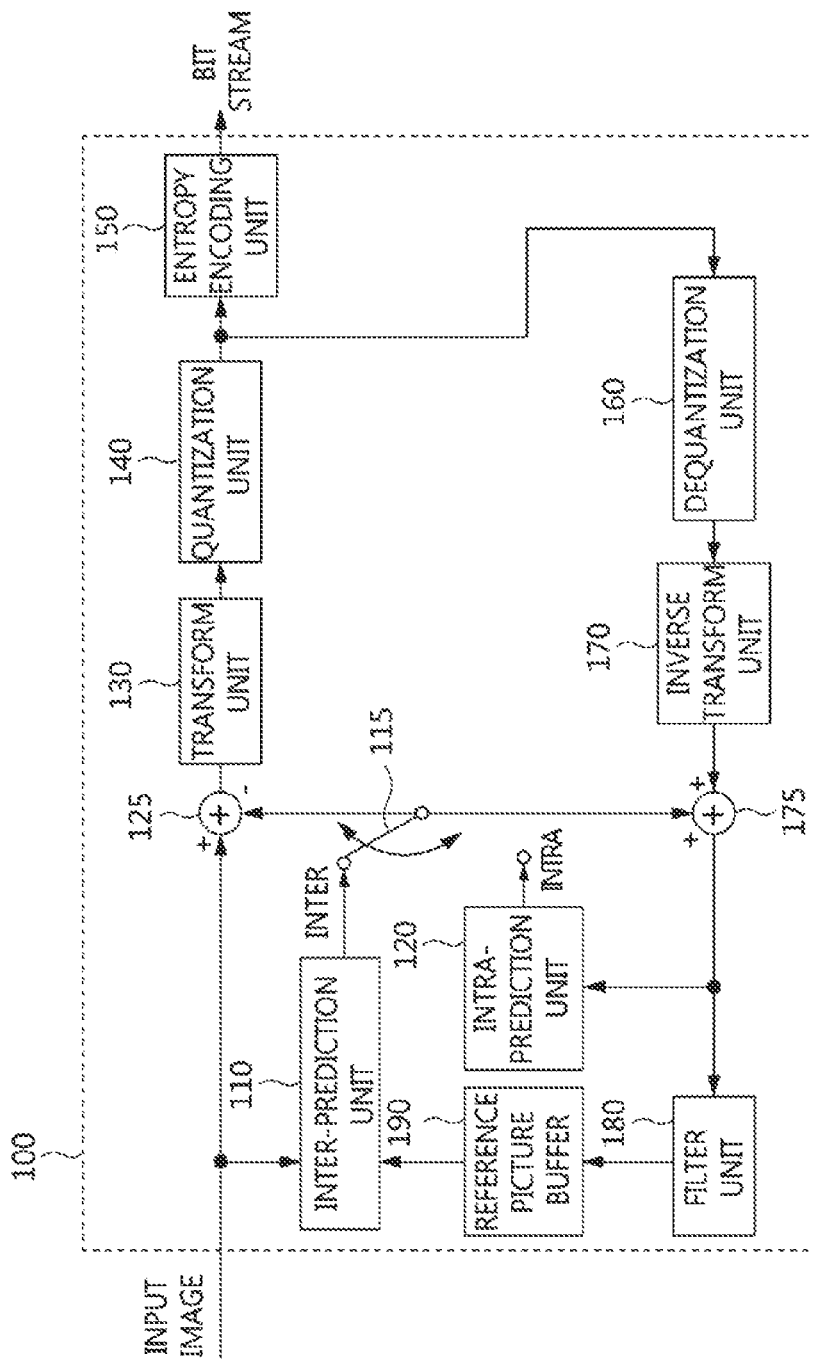
FIG. 1 is a block diagram illustrating the configuration of an embodiment of an encoding apparatus to which the present disclosure is applied.

The present invention may be variously changed, and may have various embodiments, and specific embodiments will be described in detail below with reference to the attached drawings. However, it should be understood that those embodiments are not intended to limit the present invention to specific disclosure forms, and that they include all changes, equivalents or modifications included in the spirit and scope of the present invention.

Detailed descriptions of the following exemplary embodiments will be made with reference to the attached drawings illustrating specific embodiments. These embodiments are described so that those having ordinary knowledge in the technical field to which the present disclosure pertains can easily practice the embodiments. It should be noted that the various embodiments are different from each other, but do not need to be mutually exclusive of each other. For example, specific shapes, structures, and characteristics described here may be implemented as other embodiments without departing from the spirit and scope of the embodiments in relation to an embodiment. Further, it should be understood that the locations or arrangement of individual components in each disclosed embodiment can be changed without departing from the spirit and scope of the embodiments. Therefore, the accompanying detailed description is not intended to restrict the scope of the disclosure, and the scope of the exemplary embodiments is limited only by the accompanying claims, along with equivalents thereof, as long as they are appropriately described.

In the drawings, similar reference numerals are used to designate the same or similar functions in various aspects. The shapes, sizes, etc. of components in the drawings may be exaggerated to make the description clear.

Terms such as "first" and "second" may be used to describe various components, but the components are not restricted by the terms. The terms are used only to distinguish one component from another component. For example, a first component may be named a second component without departing from the scope of the present specification. Likewise, a second component may be named a first component. The terms "and/or" may include combinations of a plurality of related described items or any of a plurality of related described items.

It will be understood that when a component is referred to as being "connected" or "coupled" to another component, the two components may be directly connected or coupled to each other, or intervening components may be present between the two components. It will be understood that when a component is referred to as being "directly connected or coupled", no intervening components are present between the two components.

Also, components described in the embodiments are independently shown in order to indicate different characteristic functions, but this does not mean that each of the components is formed of a separate piece of hardware or software. That is, the components are arranged and included separately for convenience of description. For example, at least two of the components may be integrated into a single component. Conversely, one component may be divided into multiple components. An embodiment into which the components are integrated or an embodiment in which some components are separated is included in the scope of the present specification as long as it does not depart from the essence of the present specification.

Further, it should be noted that, in the exemplary embodiments, an expression describing that a component "comprises" a specific component means that additional components may be included within the scope of the practice or the technical spirit of exemplary embodiments, but does not preclude the presence of components other than the specific component.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Embodiments will be described in detail below with reference to the accompanying drawings so that those having ordinary knowledge in the technical field to which the embodiments pertain can easily practice the embodiments. In the following description of the embodiments, detailed descriptions of known functions or configurations which are deemed to make the gist of the present specification obscure will be omitted. Further, the same reference numerals are used to designate the same components throughout the drawings, and repeated descriptions of the same components will be omitted.

Hereinafter, "image" may mean a single picture constituting a video, or may mean the video itself. For example, "encoding and/or decoding of an image" may mean "encoding and/or decoding of a video", and may also mean "encoding and/or decoding of any one of images constituting the video".

Hereinafter, the terms "video" and "motion picture" may be used to have the same meaning, and may be used interchangeably with each other.

Hereinafter, a target image may be an encoding target image, which is the target to be encoded, and/or a decoding target image, which is the target to be decoded. Further, the target image may be an input image that is input to an encoding apparatus or an input image that is input to a decoding apparatus.

Hereinafter, the terms "image", "picture", "frame", and "screen" may be used to have the same meaning and may be used interchangeably with each other.

Hereinafter, a target block may be an encoding target block, i.e. the target to be encoded and/or a decoding target block, i.e. the target to be decoded. Further, the target block may be a current block, i.e. the target to be currently encoded and/or decoded. Here, the terms "target block" and "current block" may be used to have the same meaning, and may be used interchangeably with each other.

Hereinafter, the terms "block" and "unit" may be used to have the same meaning, and may be used interchangeably with each other. Alternatively, "block" may denote a specific unit.

Hereinafter, the terms "region" and "segment" may be used interchangeably with each other.

Hereinafter, a specific signal may be a signal indicating a specific block. For example, the original signal may be a signal indicating a target block. A prediction signal may be a signal indicating a prediction block. A residual signal may be a signal indicating a residual block.

In the following embodiments, specific information, data, a flag, an element, and an attribute may have their respective values. A value of "0" corresponding to each of the information, data, flag, element, and attribute may indicate a logical false or a first predefined value. In other words, the value of "0", false, logical false, and a first predefined value may be used interchangeably with each other. A value of "1" corresponding to each of the information, data, flag, element, and attribute may indicate a logical true or a second predefined value. In other words, the value of "1", true, logical true, and a second predefined value may be used interchangeably with each other.

When a variable such as i or j is used to indicate a row, a column, or an index, the value of i may be an integer of 0 or more or an integer of 1 or more. In other words, in the embodiments, each of a row, a column, and an index may be counted from 0 or may be counted from 1.

Below, the terms to be used in embodiments will be described.

Encoder: An encoder denotes a device for performing encoding.

Decoder: A decoder denotes a device for performing decoding.

Unit: A unit may denote the unit of image encoding and decoding. The terms "unit" and "block" may be used to have the same meaning, and may be used interchangeably with each other.

"Unit" may be an M×N array of samples. M and N may be positive integers, respectively. The term "unit" may generally mean a two-dimensional (2D) array of samples.

In the encoding and decoding of an image, "unit" may be an area generated by the partitioning of one image. A single image may be partitioned into multiple units. Alternatively, one image may be partitioned into sub-parts, and the unit may denote each partitioned sub-part when encoding or decoding is performed on the partitioned sub-part.

In the encoding and decoding of an image, predefined processing may be performed on each unit depending on the type of the unit.

Depending on functions, the unit types may be classified into a macro unit, a Coding Unit (CU), a Prediction Unit (PU), a residual unit, a Transform Unit (TU), etc. Alternatively, depending on functions, the unit may denote a block, a macroblock, a coding tree unit (CTU), a coding tree block, a coding unit, a coding block, a prediction unit, a prediction block, a residual unit, a residual block, a transform unit, a transform block, etc.

The term "unit" may mean information including a luminance (luma) component block, a chrominance (chroma) component block corresponding thereto, and syntax elements for respective blocks so that the unit is designated to be distinguished from a block.

The size and shape of a unit may be variously implemented. Further, a unit may have any of various sizes and shapes. In particular, the shapes of the unit may include not only a square, but also a geometric figure that can be represented in two dimensions (2D), such as a rectangle, a trapezoid, a triangle, and a pentagon.

Further, unit information may include one or more of the type of unit, which indicates a coding unit, a prediction unit, a residual unit or a transform unit, the size of a unit, the depth of a unit, the order of encoding and decoding of a unit, etc.

One unit may be partitioned into sub-units, each having a smaller size than that of the relevant unit.

Depth: A depth may denote the degree to which the unit is partitioned. Further, the depth may indicate the level at which the corresponding unit is present when units are represented in a tree structure.

Unit partition information may include a depth indicating the depth of a unit. A depth may indicate the number of times the unit is partitioned and/or the degree to which the unit is partitioned.

In a tree structure, it may be considered that the depth of a root node is the smallest, and the depth of a leaf node is the largest.

A single unit may be hierarchically partitioned into multiple sub-units while having depth information based on a tree structure. In other words, the unit and sub-units, generated by partitioning the unit, may correspond to a node and child nodes of the node, respectively. Each of the partitioned sub-units may have a depth. Since the depth indicates the number of times the unit is partitioned and/or the degree to which the unit is partitioned, the partition information of the sub-units may include information about the sizes of the sub-units.

In a tree structure, the top node may correspond to the initial node before partitioning. The top node may be referred to as a "root node". Further, the root node may have a minimum depth value. Here, the top node may have a depth of level '0'.

A node having a depth of level '1' may denote a unit generated when the initial unit is partitioned once. A node having a depth of level '2' may denote a unit generated when the initial unit is partitioned twice.

A leaf node having a depth of level 'n' may denote a unit generated when the initial unit has been partitioned n times.

The leaf node may be a bottom node, which cannot be partitioned any further. The depth of the leaf node may be the maximum level. For example, a predefined value for the maximum level may be 3.

QT depth may denote the depth of quad-splitting. BT depth may denote the depth of binary-splitting. TT depth may denote the depth of triple-splitting.

Sample: A sample may be a base unit constituting a block. A sample may be represented by values from 0 to $2^{Bd}-1$ depending on the bit depth (Bd).

A sample may be a pixel or a pixel value.

Hereinafter, the terms "pixel" and "sample" may be used to have the same meaning, and may be used interchangeably with each other.

A Coding Tree Unit (CTU): A CTU may be composed of a single luma component (Y) coding tree block and two chroma component (Cb, Cr) coding tree blocks related to the luma component coding tree block. Further, a CTU may mean information including the above blocks and a syntax element for each of the blocks.

Each coding tree unit (CTU) may be partitioned using one or more partitioning methods, such as a quad tree (QT), a binary tree (BT) and a ternary tree (TT), so as to configure sub-units, such as a coding unit, a prediction unit, and a transform unit.

"CTU" may be used as a term designating a pixel block, which is a processing unit in an image-decoding and encoding process, as in the case of partitioning of an input image.

Coding Tree Block (CTB): "CTB" may be used as a term designating any one of a Y coding tree block, a Cb coding tree block, and a Cr coding tree block.

Neighbor (neighboring) block: A neighbor block means a block adjacent to a target block. The term "neighbor block" may also refer to a reconstructed neighbor block.

Hereinafter, the terms "neighbor block" and "adjacent block" may be used to have the same meaning, and may be used interchangeably with each other.

Spatial neighbor block: A spatial neighbor block may be a block spatially adjacent to a target block. Neighbor blocks may include spatial neighbor blocks.

A target block and a spatial neighbor block may be included in a target picture.

A spatial neighbor block may be either a block, the boundary of which meets a target block, or a block located at a predetermined distance from the target block.

A spatial neighbor block may be a block adjacent to the vertex of a target block. Here, the block adjacent to the vertex of the target block may be either a block vertically adjacent to a neighbor block that is horizontally adjacent to the target block, or a block horizontally adjacent to a neighbor block that is vertically adjacent to the target block.

A temporal neighbor block: A temporal neighbor block may be a block temporally adjacent to a target block. Neighbor blocks may include the temporal neighbor block.

A temporal neighbor block may include a co-located block (col block).

A col block may be a block in a previously reconstructed co-located picture (col picture). The location of the col block in the col picture may correspond to the location of a target block in a target picture. The col picture may be a picture included in a reference picture list.

A temporal neighbor block may be a spatial neighbor block of a target block.

Prediction unit: A prediction unit may be a base unit for prediction, such as inter prediction, intra prediction, inter compensation, intra compensation, and motion compensation.

A single prediction unit may be divided into multiple partitions having smaller sizes or sub-prediction units. The multiple partitions may also be base units in the performance of prediction or compensation. The partitions generated by dividing the prediction unit may also be prediction units.

Prediction unit partition: A prediction unit partition may be the shape into which a prediction unit is divided.

Reconstructed neighboring unit: A reconstructed neighboring unit may be a unit which has already been decoded and reconstructed around a target unit.

A reconstructed neighboring unit may be a unit that is spatially adjacent to the target unit or that is temporally adjacent to the target unit.

A reconstructed spatially neighboring unit may be a unit which is included in a target picture and which has already been reconstructed through encoding and/or decoding.

A reconstructed temporally neighboring unit may be a unit which is included in a reference image and which has already been reconstructed through encoding and/or decoding. The location of the reconstructed temporally neighboring unit in the reference image may be identical to that of the target unit in the target picture, or may correspond to the location of the target unit in the target picture.

Parameter set: A parameter set may be header information in the structure of a bitstream. For example, a parameter set may include a sequence parameter set, a picture parameter set, an adaptation parameter set, etc.

Rate-distortion optimization: An encoding apparatus may use rate-distortion optimization so as to provide high coding efficiency by utilizing combinations of the size of a coding unit (CU), a prediction mode, the size of a prediction unit (PU), motion information, and the size of a transform unit (TU).

A rate-distortion optimization scheme may calculate rate-distortion costs of respective combinations so as to select an optimal combination from among the combinations. The rate-distortion costs may be calculated using the following Equation 1. Generally, a combination enabling the rate-distortion cost to be minimized may be selected as the optimal combination in the rate-distortion optimization scheme.

$$D + \lambda * R \qquad \text{[Equation 1]}$$

D may denote distortion. D may be the mean of squares of differences (i.e. mean square error) between original transform coefficients and reconstructed transform coefficients in a transform unit.

R may denote the rate, which may denote a bit rate using related-context information.

$\lambda$ denotes a Lagrangian multiplier. R may include not only coding parameter information, such as a prediction mode, motion information, and a coded block flag, but also bits generated due to the encoding of transform coefficients.

An encoding apparatus may perform procedures, such as inter prediction and/or intra prediction, transform, quantization, entropy encoding, inverse quantization (dequantization), and inverse transform so as to calculate precise D and R. These procedures may greatly increase the complexity of the encoding apparatus.

Bitstream: A bitstream may denote a stream of bits including encoded image information.

Parameter set: A parameter set may be header information in the structure of a bitstream.

The parameter set may include at least one of a video parameter set, a sequence parameter set, a picture parameter set, and an adaptation parameter set. Further, the parameter set may include information about a slice header and information about a tile header.

Parsing: Parsing may be the decision on the value of a syntax element, made by performing entropy decoding on a bitstream. Alternatively, the term "parsing" may mean such entropy decoding itself.

Symbol: A symbol may be at least one of the syntax element, the coding parameter, and the transform coefficient of an encoding target unit and/or a decoding target unit. Further, a symbol may be the target of entropy encoding or the result of entropy decoding.

Reference picture: A reference picture may be an image referred to by a unit so as to perform inter prediction or motion compensation. Alternatively, a reference picture may be an image including a reference unit referred to by a target unit so as to perform inter prediction or motion compensation.

Hereinafter, the terms "reference picture" and "reference image" may be used to have the same meaning, and may be used interchangeably with each other.

Reference picture list: A reference picture list may be a list including one or more reference images used for inter prediction or motion compensation.

The types of a reference picture list may include List Combined (LC), List 0 (L0), List 1 (L1), List 2 (L2), List 3 (L3), etc.

For inter prediction, one or more reference picture lists may be used.

Inter-prediction indicator: An inter-prediction indicator may indicate the inter-prediction direction of a target unit. Inter prediction may be one of unidirectional prediction and bidirectional prediction. Alternatively, the inter-prediction indicator may denote the number of reference images used to generate a prediction unit of a target unit. Alternatively, the inter-prediction indicator may denote the number of prediction blocks used for inter prediction or motion compensation of a target unit.

Reference picture index: A reference picture index may be an index indicating a specific reference image in a reference picture list.

Motion vector (MV): A motion vector may be a 2D vector used for inter prediction or motion compensation. A motion vector may mean an offset between an encoding target image/decoding target image and a reference image.

For example, a MV may be represented in a form such as ($mv_x$, $mv_y$). $mv_x$ may indicate a horizontal component, and $mv_y$ may indicate a vertical component.

Search range: A search range may be a 2D area in which a search for a MV is performed during inter prediction. For example, the size of the search range may be M×N. M and N may be respective positive integers.

Motion vector candidate: A motion vector candidate may be a block that is a prediction candidate or the motion vector of the block that is a prediction candidate when a motion vector is predicted.

A motion vector candidate may be included in a motion vector candidate list.

Motion vector candidate list: A motion vector candidate list may be a list configured using one or more motion vector candidates.

Motion vector candidate index: A motion vector candidate index may be an indicator for indicating a motion vector candidate in the motion vector candidate list. Alternatively, a motion vector candidate index may be the index of a motion vector predictor.

Motion information: Motion information may be information including at least one of a reference picture list, a reference image, a motion vector candidate, a motion vector candidate index, a merge candidate, and a merge index, as well as a motion vector, a reference picture index, and an inter-prediction indicator.

Merge candidate list: A merge candidate list may be a list configured using merge candidates.

Merge candidate: A merge candidate may be a spatial merge candidate, a temporal merge candidate, a combined merge candidate, a combined bi-prediction merge candidate, a zero-merge candidate, etc. A merge candidate may include motion information such as an inter-prediction indicator, a reference picture index for each list, and a motion vector.

Merge index: A merge index may be an indicator for indicating a merge candidate in a merge candidate list.

A merge index may indicate a reconstructed unit used to derive a merge candidate between a reconstructed unit spatially adjacent to a target unit and a reconstructed unit temporally adjacent to the target unit.

A merge index may indicate at least one of pieces of motion information of a merge candidate.

Transform unit: A transform unit may be the base unit of residual signal encoding and/or residual signal decoding, such as transform, inverse transform, quantization, dequantization, transform coefficient encoding, and transform coefficient decoding. A single transform unit may be partitioned into multiple transform units having smaller sizes.

Scaling: Scaling may denote a procedure for multiplying a factor by a transform coefficient level.

As a result of scaling of the transform coefficient level, a transform coefficient may be generated. Scaling may also be referred to as "dequantization".

Quantization Parameter (QP): A quantization parameter may be a value used to generate a transform coefficient level for a transform coefficient in quantization. Alternatively, a quantization parameter may also be a value used to generate a transform coefficient by scaling the transform coefficient level in dequantization. Alternatively, a quantization parameter may be a value mapped to a quantization step size.

Delta quantization parameter: A delta quantization parameter is a differential value between a predicted quantization parameter and the quantization parameter of an encoding/decoding target unit.

Scan: Scan may denote a method for aligning the order of coefficients in a unit, a block or a matrix. For example, a method for aligning a 2D array in the form of a one-dimensional (1D) array may be referred to as a "scan". Alternatively, a method for aligning a 1D array in the form of a 2D array may also be referred to as a "scan" or an "inverse scan".

Transform coefficient: A transform coefficient may be a coefficient value generated as an encoding apparatus performs a transform. Alternatively, the transform coefficient may be a coefficient value generated as a decoding apparatus performs at least one of entropy decoding and dequantization.

A quantized level or a quantized transform coefficient level in which quantization is applied to a transform coefficient or a residual signal may also be included in the meaning of the term "transform coefficient".

Quantized level: A quantized level may be a value generated as the encoding apparatus performs quantization on a transform coefficient or a residual signal. Alternatively, the quantized level may be a value that is the target of dequantization as the decoding apparatus performs dequantization.

A quantized transform coefficient level, which is the result of transform and quantization, may also be included in the meaning of a quantized level.

Non-zero transform coefficient: A non-zero transform coefficient may be a transform coefficient having a value other than 0 or a transform coefficient level having a value other than 0. Alternatively, a non-zero transform coefficient may be a transform coefficient, the magnitude of the value of which is not 0, or a transform coefficient level, the magnitude of the value of which is not 0.

Quantization matrix: A quantization matrix may be a matrix used in a quantization or dequantization procedure so as to improve the subjective image quality or objective image quality of an image. A quantization matrix may also be referred to as a "scaling list".

Quantization matrix coefficient: A quantization matrix coefficient may be each element in a quantization matrix. A quantization matrix coefficient may also be referred to as a "matrix coefficient".

Default matrix: A default matrix may be a quantization matrix predefined by the encoding apparatus and the decoding apparatus.

Non-default matrix: A non-default matrix may be a quantization matrix that is not predefined by the encoding apparatus and the decoding apparatus. The non-default matrix may be signaled by the encoding apparatus to the decoding apparatus.

Signaling: Signaling may indicate that information is transmitted from an encoding apparatus to a decoding apparatus. Alternatively, signaling may mean that information is included in a bitstream or a storage medium. The information signaled by the encoding apparatus may be used by the decoding apparatus.

FIG. 1 is a block diagram illustrating the configuration of an embodiment of an encoding apparatus to which the present disclosure is applied.

An encoding apparatus 100 may be an encoder, a video encoding apparatus or an image encoding apparatus. A video may include one or more images (pictures). The encoding apparatus 100 may sequentially encode one or more images of the video.

Referring to FIG. 1, the encoding apparatus 100 includes an inter-prediction unit 110, an intra-prediction unit 120, a switch 115, a subtractor 125, a transform unit 130, a quantization unit 140, an entropy encoding unit 150, a dequantization (inverse quantization) unit 160, an inverse transform unit 170, an adder 175, a filter unit 180, and a reference picture buffer 190.

The encoding apparatus 100 may perform encoding on a target image using an intra mode and/or an inter mode.

Further, the encoding apparatus 100 may generate a bitstream, including information about encoding, via encoding on the target image, and may output the generated bitstream. The generated bitstream may be stored in a computer-readable storage medium and may be streamed through a wired/wireless transmission medium.

When the intra mode is used as a prediction mode, the switch 115 may switch to the intra mode. When the inter mode is used as a prediction mode, the switch 115 may switch to the inter mode.

The encoding apparatus 100 may generate a prediction block of a target block. Further, after the prediction block has been generated, the encoding apparatus 100 may encode a residual between the target block and the prediction block.

When the prediction mode is the intra mode, the intra-prediction unit 120 may use pixels of previously encoded/decoded neighboring blocks around the target block as reference samples. The intra-prediction unit 120 may perform spatial prediction on the target block using the reference samples, and may generate prediction samples for the target block via spatial prediction.

The inter-prediction unit 110 may include a motion prediction unit and a motion compensation unit.

When the prediction mode is an inter mode, the motion prediction unit may search a reference image for the area most closely matching the target block in a motion prediction procedure, and may derive a motion vector for the target block and the found area based on the found area.

The reference image may be stored in the reference picture buffer 190. More specifically, the reference image may be stored in the reference picture buffer 190 when the encoding and/or decoding of the reference image have been processed.

The motion compensation unit may generate a prediction block for the target block by performing motion compensation using a motion vector. Here, the motion vector may be a two-dimensional (2D) vector used for inter-prediction. Further, the motion vector may indicate an offset between the target image and the reference image.

The motion prediction unit and the motion compensation unit may generate a prediction block by applying an interpolation filter to a partial area of a reference image when the motion vector has a value other than an integer. In order to perform inter prediction or motion compensation, it may be determined which one of a skip mode, a merge mode, an advanced motion vector prediction (AMVP) mode, and a current picture reference mode corresponds to a method for predicting the motion of a PU included in a CU, based on the CU, and compensating for the motion, and inter prediction or motion compensation may be performed depending on the mode.

The subtractor 125 may generate a residual block, which is the differential between the target block and the prediction block. A residual block may also be referred to as a "residual signal".

The residual signal may be the difference between an original signal and a prediction signal. Alternatively, the residual signal may be a signal generated by transforming or quantizing the difference between an original signal and a prediction signal or by transforming and quantizing the difference. A residual block may be a residual signal for a block unit.

The transform unit 130 may generate a transform coefficient by transforming the residual block, and may output the generated transform coefficient. Here, the transform coefficient may be a coefficient value generated by transforming the residual block.

When a transform skip mode is used, the transform unit 130 may omit transforming the residual block.

By applying quantization to the transform coefficient, a quantized transform coefficient level or a quantized level may be generated. Hereinafter, in the embodiments, each of the quantized transform coefficient level and the quantized level may also be referred to as a 'transform coefficient'.

The quantization unit 140 may generate a quantized transform coefficient level or a quantized level by quantizing the transform coefficient depending on quantization parameters. The quantization unit 140 may output the quantized transform coefficient level or the quantized level that is generated. In this case, the quantization unit 140 may quantize the transform coefficient using a quantization matrix.

The entropy encoding unit 150 may generate a bitstream by performing probability distribution-based entropy encoding based on values, calculated by the quantization unit 140, and/or coding parameter values, calculated in the encoding procedure. The entropy encoding unit 150 may output the generated bitstream.

The entropy encoding unit 150 may perform entropy encoding on information about the pixels of the image and information required to decode the image. For example, the information required to decode the image may include syntax elements or the like.

The coding parameters may be information required for encoding and/or decoding. The coding parameters may include information encoded by the encoding apparatus 100 and transferred from the encoding apparatus 100 to a decoding apparatus, and may also include information that may be derived in the encoding or decoding procedure. For example, information transferred to the decoding apparatus may include syntax elements.

For example, the coding parameters may include values or statistical information, such as a prediction mode, a motion vector, a reference picture index, an encoding block pattern, the presence or absence of a residual signal, a transform coefficient, a quantized transform coefficient, a quantization parameter, a block size, and block partition information. The prediction mode may be an intra-prediction mode or an inter-prediction mode.

The residual signal may denote the difference between the original signal and a prediction signal. Alternatively, the residual signal may be a signal generated by transforming the difference between the original signal and the prediction signal. Alternatively, the residual signal may be a signal generated by transforming and quantizing the difference between the original signal and the prediction signal.

When entropy encoding is applied, fewer bits may be assigned to more frequently occurring symbols, and more bits may be assigned to rarely occurring symbols. As symbols are represented by means of this assignment, the size of a bit string for target symbols to be encoded may be reduced. Therefore, the compression performance of video encoding may be improved through entropy encoding.

Further, for entropy encoding, the entropy encoding unit 150 may use a coding method such as exponential Golomb, Context-Adaptive Variable Length Coding (CAVLC), or Context-Adaptive Binary Arithmetic Coding (CABAC). For example, the entropy encoding unit 150 may perform entropy encoding using a Variable Length Coding/Code (VLC) table. For example, the entropy encoding unit 150 may derive a binarization method for a target symbol. Further, the entropy encoding unit 150 may derive a probability model for a target symbol/bin. The entropy encoding unit 150 may perform arithmetic coding using the derived binarization method, a probability model, and a context model.

The entropy encoding unit 150 may transform the coefficient of the form of a 2D block into the form of a 1D vector through a transform coefficient scanning method so as to encode a transform coefficient level.

The coding parameters may include not only information (or a flag or an index), such as a syntax element, which is encoded by the encoding apparatus and is signaled by the encoding apparatus to the decoding apparatus, but also information derived in an encoding or decoding process. Further, the coding parameters may include information required so as to encode or decode images. For example, the coding parameters may include at least one or combinations of the size of a unit/block, the depth of a unit/block, partition information of a unit/block, the partition structure of a unit/block, information indicating whether a unit/block is partitioned in a quad-tree structure, information indicating whether a unit/block is partitioned in a binary tree (BT) structure, the partitioning direction of a binary tree structure (horizontal direction or vertical direction), the partitioning form of a binary tree structure (symmetrical partitioning or asymmetrical partitioning), information indicating whether a unit/block is partitioned in a ternary tree structure, the partitioning direction of a ternary tree structure (horizontal direction or vertical direction), a prediction scheme (intra prediction or inter prediction), an intra-prediction mode/direction, a reference sample filtering method, a prediction block filtering method, a prediction block boundary filtering method, a filter tap for filtering, a filter coefficient for filtering, an inter-prediction mode, motion information, a motion vector, a reference picture index, an inter-prediction direction, an inter-prediction indicator, a reference picture list, a reference image, a motion vector predictor, a motion vector prediction candidate, a motion vector candidate list, information indicating whether a merge mode is used, a merge candidate, a merge candidate list, information indicating whether a skip mode is used, the type of an interpolation filter, the tap of an interpolation filter, the filter coefficient of an interpolation filter, the magnitude of a motion vector, accuracy of motion vector representation, a transform type, a transform size, information indicating whether a primary transform is used, information indicating whether an additional (secondary) transform is used, a primary transform index, a secondary transform index, information indicating the presence or absence of a residual signal, a coded block pattern, a coded block flag, a quantization parameter, a quantization matrix, information about an intra-loop filter, information indicating whether an intra-loop filter is applied, the coefficient of an intra-loop filter, the tap of an intra-loop filter, the shape/form of an intra-loop filter, information indicating whether a deblocking filter is applied, the coefficient of a deblocking filter, the tap of a deblocking filter, deblocking filter strength, the shape/form of a deblocking filter, information indicating whether an adaptive sample offset is applied, the value of an adaptive sample offset, the category of an adaptive sample offset, the type of an adaptive sample offset, information indicating whether an adaptive in-loop filter is applied, the coefficient of an adaptive in-loop filter, the tap of an adaptive in-loop filter, the shape/form of an adaptive in-loop filter, a binarization/inverse binarization method, a context model, a context model decision method, a context model update method, information indicating whether a regular mode is performed, information whether a bypass mode is performed, a context bin, a bypass bin, a transform coefficient, a transform coefficient level, a transform coefficient level scanning method, an image display/output order, slice identification information, a slice type, slice partition information, tile identification information, a tile type, tile partition information, a picture type, bit depth, information about a luma signal, and information about a chroma signal.

Here, signaling a flag or an index may mean that the encoding apparatus 100 includes an entropy-encoded flag or an entropy-encoded index, generated by performing entropy encoding on the flag or index, in a bitstream, and that the decoding apparatus 200 acquires a flag or an index by performing entropy decoding on the entropy-encoded flag or the entropy-encoded index, extracted from the bitstream.

Since the encoding apparatus 100 performs encoding via inter prediction, the encoded target image may be used as a reference image for additional image(s) to be subsequently processed. Therefore, the encoding apparatus 100 may reconstruct or decode the encoded target image and store the reconstructed or decoded image as a reference image in the reference picture buffer 190. For decoding, dequantization and inverse transform on the encoded target image may be processed.

The quantized level may be inversely quantized by the dequantization unit 160, and may be inversely transformed by the inverse transform unit 170. The coefficient that has been inversely quantized and/or inversely transformed may be added to the prediction block by the adder 175. The inversely quantized and/or inversely transformed coefficient and the prediction block are added, and then a reconstructed block may be generated. Here, the inversely quantized and/or inversely transformed coefficient may denote a coefficient on which one or more of dequantization and inverse transform are performed, and may also denote a reconstructed residual block.

The reconstructed block may be subjected to filtering through the filter unit 180. The filter unit 180 may apply one or more of a deblocking filter, a Sample Adaptive Offset (SAO) filter, and an Adaptive Loop Filter (ALF) to the reconstructed block or a reconstructed picture. The filter unit 180 may also be referred to as an "in-loop filter".

The deblocking filter may eliminate block distortion occurring at the boundaries between blocks. In order to determine whether to apply the deblocking filter, the number of columns or rows which are included in a block and which include pixel(s) based on which it is determined whether to apply the deblocking filter to a target block may be decided on. When the deblocking filter is applied to the target block, the applied filter may differ depending on the strength of the required deblocking filtering. In other words, among different filters, a filter decided on in consideration of the strength of deblocking filtering may be applied to the target block.

The SAO may add a suitable offset to the values of pixels to compensate for coding error. The SAO may perform, for the image to which deblocking is applied, correction that uses an offset in the difference between an original image and the image to which deblocking is applied, on a pixel basis. A method for dividing the pixels included in the image into a certain number of regions, determining a region to which an offset is to be applied, among the divided regions, and applying an offset to the determined region may be used, and a method for applying an offset in consideration of edge information of each pixel may also be used.

The ALF may perform filtering based on a value obtained by comparing a reconstructed image with an original image. After pixels included in an image have been divided into a predetermined number of groups, filters to be applied to the groups may be determined, and filtering may be differentially performed for respective groups. Information related to whether to apply an adaptive loop filter may be signaled for each CU. The shapes and filter coefficients of ALFs to be applied to respective blocks may differ for respective blocks.

The reconstructed block or the reconstructed image subjected to filtering through the filter unit 180 may be stored in the reference picture buffer 190. The reconstructed block subjected to filtering through the filter unit 180 may be a part of a reference picture. In other words, the reference picture may be a reconstructed picture composed of reconstructed blocks subjected to filtering through the filter unit 180. The stored reference picture may be subsequently used for inter prediction.

Figure 2:
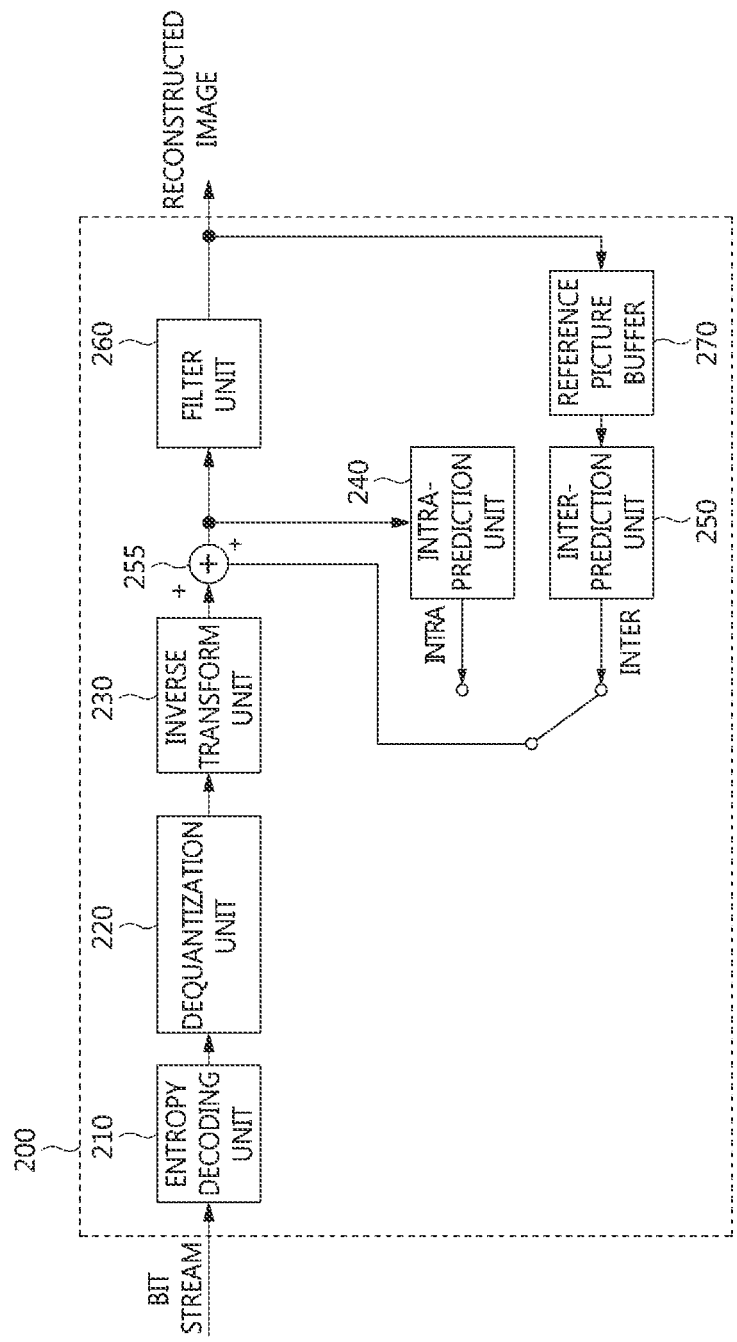
FIG. 2 is a block diagram illustrating the configuration of an embodiment of a decoding apparatus to which the present disclosure is applied.

FIG. 2 is a block diagram illustrating the configuration of an embodiment of a decoding apparatus to which the present disclosure is applied.

A decoding apparatus 200 may be a decoder, a video decoding apparatus or an image decoding apparatus.

Referring to FIG. 2, the decoding apparatus 200 may include an entropy decoding unit 210, a dequantization (inverse quantization) unit 220, an inverse transform unit 230, an intra-prediction unit 240, an inter-prediction unit 250, an adder 255, a filter unit 260, and a reference picture buffer 270.

The decoding apparatus 200 may receive a bitstream output from the encoding apparatus 100. The decoding apparatus 200 may receive a bitstream stored in a computer-readable storage medium, and may receive a bitstream that is streamed through a wired/wireless transmission medium.

The decoding apparatus 200 may perform decoding on the bitstream in an intra mode and/or an inter mode. Further, the decoding apparatus 200 may generate a reconstructed image or a decoded image via decoding, and may output the reconstructed image or decoded image.

For example, switching to an intra mode or an inter mode based on the prediction mode used for decoding may be performed by a switch. When the prediction mode used for decoding is an intra mode, the switch may be operated to switch to the intra mode. When the prediction mode used for decoding is an inter mode, the switch may be operated to switch to the inter mode.

The decoding apparatus 200 may acquire a reconstructed residual block by decoding the input bitstream, and may generate a prediction block. When the reconstructed residual block and the prediction block are acquired, the decoding apparatus 200 may generate a reconstructed block, which is the target to be decoded, by adding the reconstructed residual block to the prediction block.

The entropy decoding unit 210 may generate symbols by performing entropy decoding on the bitstream based on the probability distribution of a bitstream. The generated symbols may include quantized level-format symbols. Here, the entropy decoding method may be similar to the above-described entropy encoding method. That is, the entropy decoding method may be the reverse procedure of the above-described entropy encoding method.

The quantized coefficient may be inversely quantized by the dequantization unit 220. The dequantization unit 220 may generate an inversely quantized coefficient by performing dequantization on the quantized coefficient. Further, the inversely quantized coefficient may be inversely transformed by the inverse transform unit 230. The inverse transform unit 230 may generate a reconstructed residual block by performing an inverse transform on the inversely quantized coefficient. As a result of performing dequantization and the inverse transform on the quantized coefficient, the reconstructed residual block may be generated. Here, the dequantization unit 220 may apply a quantization matrix to the quantized coefficient when generating the reconstructed residual block.

When the intra mode is used, the intra-prediction unit 240 may generate a prediction block by performing spatial prediction that uses the pixel values of previously decoded neighboring blocks around a target block.

The inter-prediction unit 250 may include a motion compensation unit. Alternatively, the inter-prediction unit 250 may be designated as a "motion compensation unit".

When the inter mode is used, the motion compensation unit may generate a prediction block by performing motion compensation that uses a motion vector and a reference image stored in the reference picture buffer 270.

The motion compensation unit may apply an interpolation filter to a partial area of the reference image when the motion vector has a value other than an integer, and may generate a prediction block using the reference image to which the interpolation filter is applied. In order to perform motion compensation, the motion compensation unit may determine which one of a skip mode, a merge mode, an Advanced Motion Vector Prediction (AMVP) mode, and a current picture reference mode corresponds to the motion compensation method used for a PU included in a CU, based on the CU, and may perform motion compensation depending on the determined mode.

The reconstructed residual block and the prediction block may be added to each other by the adder 255. The adder 255 may generate a reconstructed block by adding the reconstructed residual block to the prediction block.

The reconstructed block may be subjected to filtering through the filter unit 260. The filter unit 260 may apply at least one of a deblocking filter, an SAO filter, and an ALF to the reconstructed block or the reconstructed picture.

The reconstructed block subjected to filtering through the filter unit 260 may be stored in the reference picture buffer 270. The reconstructed block subjected to filtering through the filter unit 260 may be a part of a reference picture. In other words, the reference image may be an image composed of reconstructed blocks subjected to filtering through the filter unit 260. The stored reference image may be subsequently used for inter prediction.

Figure 3:
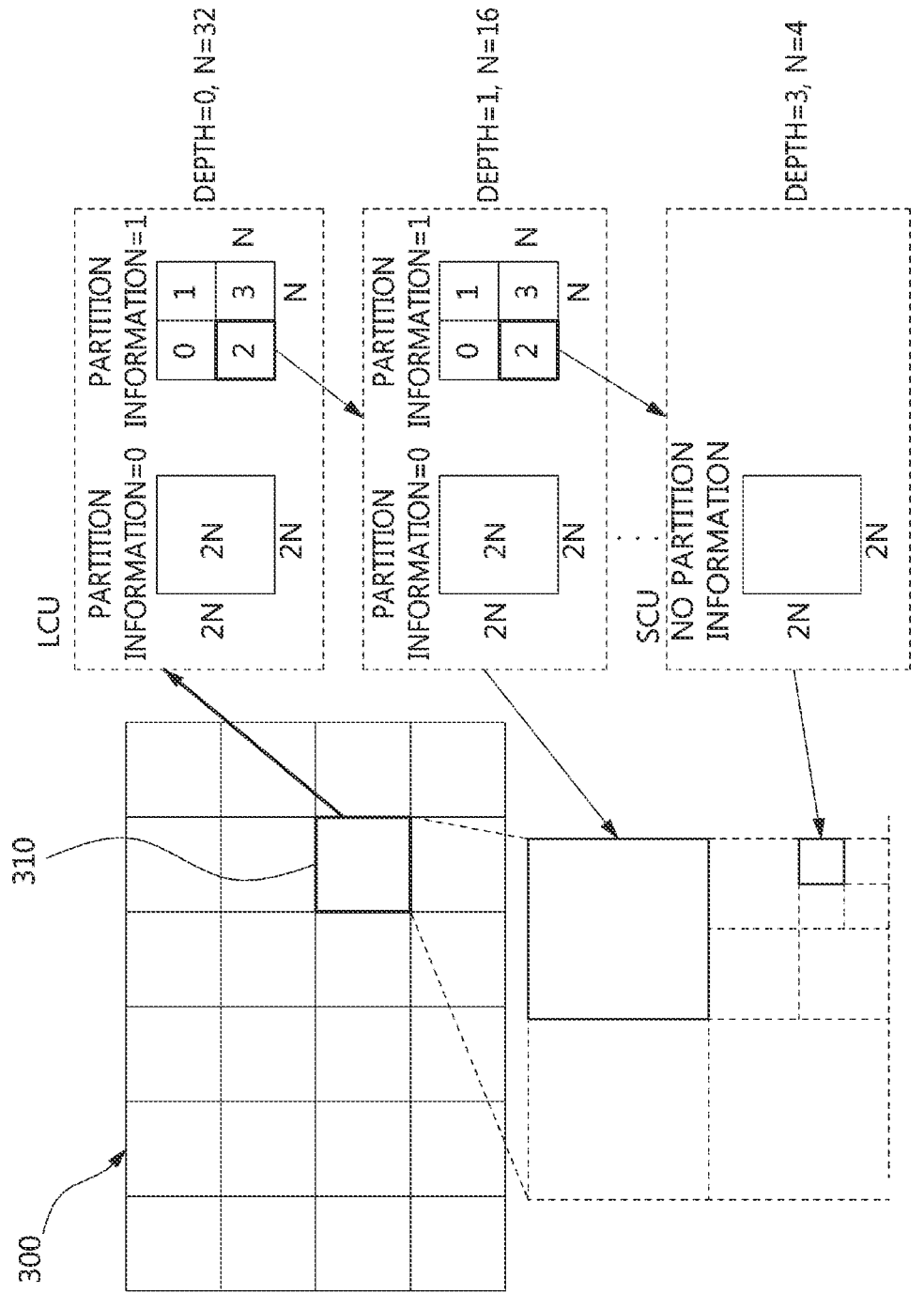
FIG. 3 is a diagram schematically illustrating the partition structure of an image when the image is encoded and decoded.

FIG. 3 is a diagram schematically illustrating the partition structure of an image when the image is encoded and decoded.

FIG. 3 may schematically illustrate an example in which a single unit is partitioned into multiple sub-units.

In order to efficiently partition the image, a Coding Unit (CU) may be used in encoding and decoding. The term "unit" may be used to collectively designate 1) a block including image samples and 2) a syntax element. For example, the "partitioning of a unit" may mean the "partitioning of a block corresponding to a unit".

A CU may be used as a base unit for image encoding/decoding. A CU may be used as a unit to which one mode selected from an intra mode and an inter mode in image encoding/decoding is applied. In other words, in image encoding/decoding, which one of an intra mode and an inter mode is to be applied to each CU may be determined.

Further, a CU may be a base unit in prediction, transform, quantization, inverse transform, dequantization, and encoding/decoding of transform coefficients.

Referring to FIG. 3, an image 200 may be sequentially partitioned into units corresponding to a Largest Coding Unit (LCU), and the partition structure of the image 300 may be determined according to the LCU. Here, the LCU may be used to have the same meaning as a Coding Tree Unit (CTU).

The partitioning of a unit may mean the partitioning of a block corresponding to the unit. Block partition information may include depth information about the depth of a unit. The depth information may indicate the number of times the unit is partitioned and/or the degree to which the unit is partitioned. A single unit may be hierarchically partitioned into sub-units while having depth information based on a tree structure. Each of partitioned sub-units may have depth information. The depth information may be information indicating the size of a CU. The depth information may be stored for each CU. Each CU may have depth information.

The partition structure may mean the distribution of Coding Units (CUs) to efficiently encode the image in an LCU 310. Such a distribution may be determined depending on whether a single CU is to be partitioned into multiple CUs. The number of CUs generated by partitioning may be a positive integer of 2 or more, including 2, 4, 8, 16, etc. The horizontal size and the vertical size of each of CUs generated by the partitioning may be less than the horizontal size and the vertical size of a CU before being partitioned, depending on the number of CUs generated by partitioning.

Each partitioned CU may be recursively partitioned into four CUs in the same way. Via the recursive partitioning, at least one of the horizontal size and the vertical size of each partitioned CU may be reduced compared to at least one of the horizontal size and the vertical size of the CU before being partitioned.

The partitioning of a CU may be recursively performed up to a predefined depth or a predefined size. For example, the depth of an LCU may be 0, and the depth of a Smallest Coding Unit (SCU) may be a predefined maximum depth. Here, as described above, the LCU may be the CU having the maximum coding unit size, and the SCU may be the CU having the minimum coding unit size.

Partitioning may start at the LCU 310, and the depth of a CU may be increased by 1 whenever the horizontal and/or vertical sizes of the CU are reduced by partitioning.

For example, for respective depths, a CU that is not partitioned may have a size of 2N×N. Further, in the case of a CU that is partitioned, a CU having a size of 2N×2N may be partitioned into four CUs, each having a size of N×N. The value of N may be halved whenever the depth is increased by 1.

Referring to FIG. 3, an LCU having a depth of 0 may have 64×64 pixels or 64×64 blocks. 0 may be a minimum depth. An SCU having a depth of 3 may have 8×8 pixels or 8×8 blocks. 3 may be a maximum depth. Here, a CU having 64×64 blocks, which is the LCU, may be represented by a depth of 0. A CU having 32×32 blocks may be represented by a depth of 1. A CU having 16×16 blocks may be represented by a depth of 2. A CU having 8×8 blocks, which is the SCU, may be represented by a depth of 3.

Information about whether the corresponding CU is partitioned may be represented by the partition information of the CU. The partition information may be 1-bit information. All CUs except the SCU may include partition information. For example, the value of the partition information of a CU that is not partitioned may be 0. The value of the partition information of a CU that is partitioned may be 1.

For example, when a single CU is partitioned into four CUs, the horizontal size and vertical size of each of four CUs generated by partitioning may be half the horizontal size and the vertical size of the CU before being partitioned. When a CU having a 32×32 size is partitioned into four CUs, the size of each of four partitioned CUs may be 16×16. When a single CU is partitioned into four CUs, it may be considered that the CU has been partitioned in a quad-tree structure.

For example, when a single CU is partitioned into two CUs, the horizontal size or the vertical size of each of two CUs generated by partitioning may be half the horizontal size or the vertical size of the CU before being partitioned. When a CU having a 32×32 size is vertically partitioned into two CUs, the size of each of two partitioned CUs may be 16×32. When a single CU is partitioned into two CUs, it may be considered that the CU has been partitioned in a binary-tree structure.

Both of quad-tree partitioning and binary-tree partitioning are applied to the LCU 310 of FIG. 3.

Figure 4:
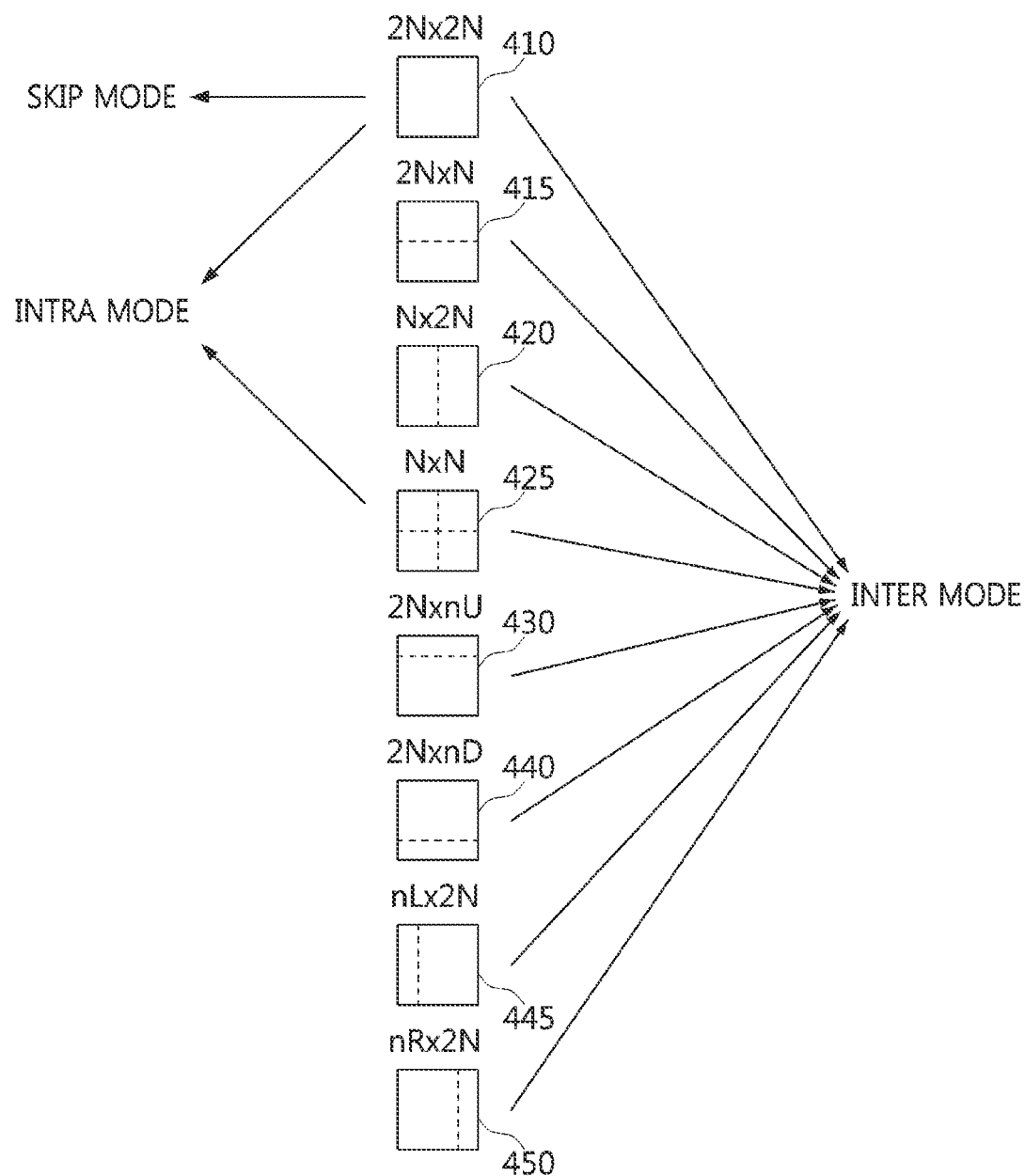
FIG. 4 is a diagram illustrating the form of a Prediction Unit (PU) that a Coding Unit (CU) can include.

FIG. 4 is a diagram illustrating the form of a Prediction Unit (PU) that a Coding Unit (CU) can include.

When, among CUs partitioned from an LCU, a CU, which is not partitioned any further, may be divided into one or more Prediction Units (PUs). Such division is also referred to as "partitioning".

A PU may be a base unit for prediction. A PU may be encoded and decoded in any one of a skip mode, an inter mode, and an intra mode. A PU may be partitioned into various shapes depending on respective modes. For example, the target block, described above with reference to FIG. 1, and the target block, described above with reference to FIG. 2, may each be a PU.

In a skip mode, partitioning may not be present in a CU. In the skip mode, a 2N×2N mode 410, in which the sizes of a PU and a CU are identical to each other, may be supported without partitioning.

In an inter mode, 8 types of partition shapes may be present in a CU. For example, in the inter mode, the 2N×2N mode 410, a 2N×N mode 415, an N×2N mode 420, an N×N mode 425, a 2N×nU mode 430, a 2N×nD mode 435, an nL×2N mode 440, and an nR×2N mode 445 may be supported.

In an intra mode, the 2N×2N mode 410 and the N×N mode 425 may be supported.

In the 2N×2N mode 410, a PU having a size of 2N×2N may be encoded. The PU having a size of 2N×2N may mean a PU having a size identical to that of the CU. For example, the PU having a size of 2N×2N may have a size of 64×64, 32×32, 16×16 or 8×8.

In the N×N mode 425, a PU having a size of N×N may be encoded.

For example, in intra prediction, when the size of a PU is 8×8, four partitioned PUs may be encoded. The size of each partitioned PU may be 4×4.

When a PU is encoded in an intra mode, the PU may be encoded using any one of multiple intra-prediction modes. For example, HEVC technology may provide 35 intra-prediction modes, and the PU may be encoded in any one of the 35 intra-prediction modes.

Which one of the 2N×2N mode 410 and the N×N mode 425 is to be used to encode the PU may be determined based on rate-distortion cost.

The encoding apparatus 100 may perform an encoding operation on a PU having a size of 2N×2N. Here, the encoding operation may be the operation of encoding the PU in each of multiple intra-prediction modes that can be used by the encoding apparatus 100. Through the encoding operation, the optimal intra-prediction mode for a PU having a size of 2N×2N may be derived. The optimal intra-prediction mode may be an intra-prediction mode in which a minimum rate-distortion cost occurs upon encoding the PU having a size of 2N×2N, among multiple intra-prediction modes that can be used by the encoding apparatus 100.

Further, the encoding apparatus 100 may sequentially perform an encoding operation on respective PUs obtained from N×N partitioning. Here, the encoding operation may be the operation of encoding a PU in each of multiple intra-prediction modes that can be used by the encoding apparatus 100. By means of the encoding operation, the optimal intra-prediction mode for the PU having a size of N×N may be derived. The optimal intra-prediction mode may be an intra-prediction mode in which a minimum rate-distortion cost occurs upon encoding the PU having a size of N×N, among multiple intra-prediction modes that can be used by the encoding apparatus 100.

The encoding apparatus 100 may determine which of a PU having a size of 2N×2N and PUs having sizes of N×N to be encoded based on a comparison of a rate-distortion cost of the PU having a size of 2N×2N and a rate-distortion costs of the PUs having sizes of N×N.

Figure 5:
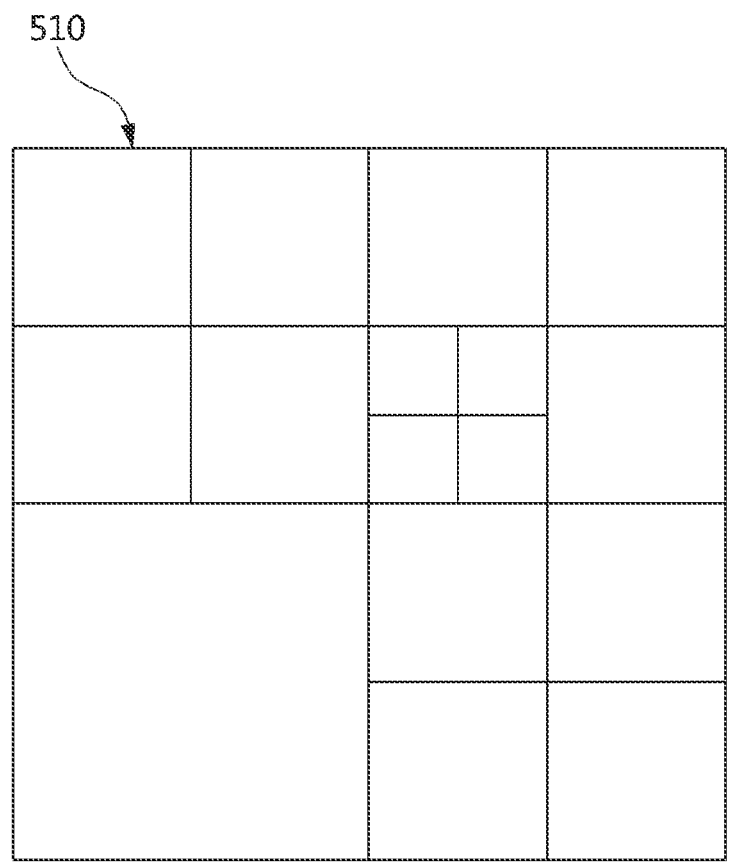
FIG. 5 is a diagram illustrating the form of a Transform Unit (TU) that can be included in a CU.

FIG. 5 is a diagram illustrating the form of a Transform Unit (TU) that can be included in a CU.

A Transform Unit (TU) may have a base unit that is used for a procedure, such as transform, quantization, inverse transform, dequantization, entropy encoding, and entropy decoding, in a CU. A TU may have a square shape or a rectangular shape.

Among CUs partitioned from the LCU, a CU which is not partitioned into CUs any further may be partitioned into one or more TUs. Here, the partition structure of a TU may be a quad-tree structure. For example, as shown in FIG. 5, a single CU 510 may be partitioned one or more times depending on the quad-tree structure. By means of this partitioning, the single CU 510 may be composed of TUs having various sizes.

In the encoding apparatus 100, a Coding Tree Unit (CTU) having a size of 64×64 may be partitioned into multiple smaller CUs by a recursive quad-tree structure. A single CU may be partitioned into four CUs having the same size. Each CU may be recursively partitioned, and may have a quad-tree structure.

A CU may have a given depth. When the CU is partitioned, CUs resulting from partitioning may have a depth increased from the depth of the partitioned CU by 1.

For example, the depth of a CU may have a value ranging from 0 to 3. The size of the CU may range from a size of 64×64 to a size of 8×8 depending on the depth of the CU.

By the recursive partitioning of a CU, an optimal partitioning method that incurs a minimum rate-distortion cost may be selected.

Figure 6:
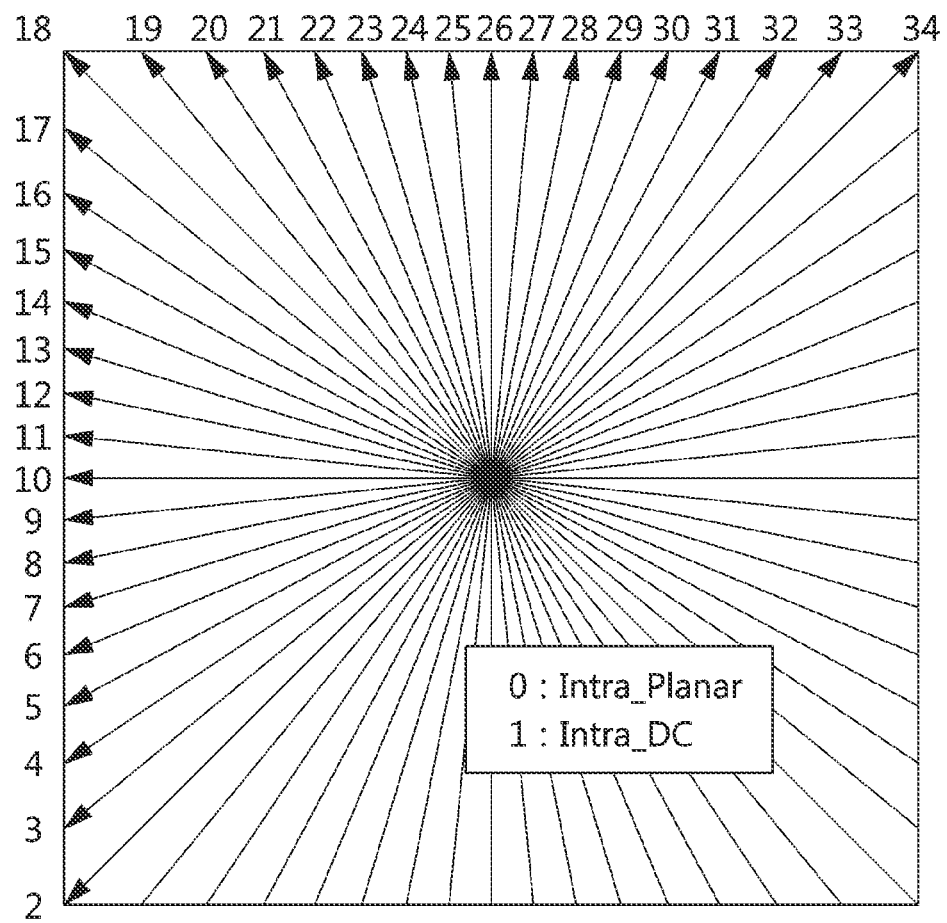
FIG. 6 is a diagram for explaining an embodiment of an intra-prediction procedure.

FIG. 6 is a diagram for explaining an embodiment of an intra-prediction process.

Arrows radially extending from the center of the graph in FIG. 6 indicate the prediction directions of intra-prediction modes. Further, numbers appearing near the arrows indicate examples of mode values assigned to intra-prediction modes or to the prediction directions of the intra-prediction modes.

Intra encoding and/or decoding may be performed using reference samples of blocks neighboring a target block. The neighboring blocks may be neighboring reconstructed blocks. For example, intra encoding and/or decoding may be performed using the values of reference samples which are included in each neighboring reconstructed block or the coding parameters of the neighboring reconstructed block.

The encoding apparatus 100 and/or the decoding apparatus 200 may generate a prediction block by performing intra prediction on a target block based on information about samples in a target image. When intra prediction is performed, the encoding apparatus 100 and/or the decoding apparatus 200 may generate a prediction block for the target block by performing intra prediction based on information about samples in the target image. When intra prediction is performed, the encoding apparatus 100 and/or the decoding apparatus 200 may perform directional prediction and/or non-directional prediction based on at least one reconstructed reference sample.

A prediction block may be a block generated as a result of performing intra prediction. A prediction block may correspond to at least one of a CU, a PU, and a TU.

The unit of a prediction block may have a size corresponding to at least one of a CU, a PU, and a TU. The prediction block may have a square shape having a size of 2N×2N or N×N. The size of N×N may include sizes of 4×4, 8×8, 16×16, 32×32, 64×64, or the like.

Alternatively, a prediction block may a square block having a size of 2×2, 4×4, 8×8, 16×16, 32×32, 64×64 or the like or a rectangular block having a size of 2×8, 4×8, 2×16, 4×16, 8×16, or the like.

Intra prediction may be performed in consideration of the intra-prediction mode for the target block. The number of intra-prediction modes that the target block can have may be a predefined fixed value, and may be a value determined differently depending on the attributes of a prediction block. For example, the attributes of the prediction block may include the size of the prediction block, the type of prediction block, etc.

For example, the number of intra-prediction modes may be fixed at 35 regardless of the size of a prediction block. Alternatively, the number of intra-prediction modes may be, for example, 3, 5, 9, 17, 34, 35, or 36.

The intra-prediction modes may be non-directional modes or directional modes. For example, the intra-prediction modes may include two non-directional modes and 33 directional modes, as shown in FIG. 6.

The two non-directional modes may include a DC mode and a planar mode.

The directional modes may be prediction modes having a specific direction or a specific angle.

The intra-prediction modes may each be represented by at least one of a mode number, a mode value, and a mode angle. The number of intra-prediction modes may be M. The value of M may be 1 or more. In other words, the number of intra-prediction modes may be M, which includes the number of non-directional modes and the number of directional modes.

The number of intra-prediction modes may be fixed to M regardless of the size of a block. Alternatively, the number of intra-prediction modes may differ depending on the size of a block and/or the type of color component. For example, the number of prediction modes may differ depending on whether a color component is a luma signal or a chroma signal. For example, the larger the size of the block, the greater the number of intra-prediction modes. Alternatively, the number of intra-prediction modes corresponding to a luma component block may be greater than the number of intra-prediction modes corresponding to a chroma component block.

For example, in a vertical mode having a mode value of 26, prediction may be performed in a vertical direction based on the pixel value of a reference sample. For example, in a horizontal mode having a mode value of 10, prediction may be performed in a horizontal direction based on the pixel value of a reference sample.

Even in directional modes other than the above-described mode, the encoding apparatus 100 and the decoding apparatus 200 may perform intra prediction on a target unit using reference samples depending on angles corresponding to the directional modes.

Intra-prediction modes located on a right side with respect to the vertical mode may be referred to as 'vertical-right modes'. Intra-prediction modes located below the horizontal mode may be referred to as 'horizontal-below modes'. For example, in FIG. 6, the intra-prediction modes in which a mode value is one of 27, 28, 29, 30, 31, 32, 33, and 34 may be vertical-right modes 613. Intra-prediction modes in which a mode value is one of 2, 3, 4, 5, 6, 7, 8, and 9 may be horizontal-below modes 616.

The non-directional mode may include a DC mode and a planar mode. For example, a mode value of the DC mode may be 1. A mode value of the planar mode may be 0.

The directional mode may include an angular mode. Among the plurality of the intra prediction modes, remaining modes except for the DC mode and the planar mode may be directional modes.

When the intra-prediction mode is a DC mode, a prediction block may be generated based on the average of pixel values of a plurality of reference pixels. For example, a value of a pixel of a prediction block may be determined based on the average of pixel values of a plurality of reference pixels.

The number of above-described intra-prediction modes and the mode values of respective intra-prediction modes are merely exemplary. The number of above-described intra-prediction modes and the mode values of respective intra-prediction modes may be defined differently depending on the embodiments, implementation and/or requirements.

In order to perform intra prediction on a target block, the step of checking whether samples included in a reconstructed neighboring block can be used as reference samples of a target block may be performed. When a sample that cannot be used as a reference sample of the target block is present among samples in the neighboring block, a value generated via copying and/or interpolation that uses at least one sample value, among the samples included in the reconstructed neighboring block, may replace the sample value of the sample that cannot be used as the reference sample. When the value generated via copying and/or interpolation replaces the sample value of the existing sample, the sample may be used as the reference sample of the target block.

In intra prediction, a filter may be applied to at least one of a reference sample and a prediction sample based on at least one of the intra-prediction mode and the size of the target block.

When the intra-prediction mode is a planar mode, a sample value of a prediction target block may be generated using a weighted sum of an above reference sample of the target block, a left reference sample of the target block, an above-right reference sample of the target block, and a below-left reference sample of the target block depending on the location of the prediction target sample in the prediction block when the prediction block of the target block is generated.

When the intra-prediction mode is a DC mode, the average of reference samples above the target block and the reference samples to the left of the target block may be used when the prediction block of the target block is generated.

When the intra-prediction mode is a directional mode, a prediction block may be generated using the above reference samples, left reference samples, above-right reference sample and/or below-left reference sample of the target block.

In order to generate the above-described prediction sample, real-number-based interpolation may be performed.

The intra-prediction mode of the target block may perform prediction from intra prediction of a neighboring block adjacent to the target block, and the information used for prediction may be entropy-encoded/decoded.

For example, when the intra-prediction modes of the target block and the neighboring block are identical to each other, it may be signaled, using a predefined flag, that the intra-prediction modes of the target block and the neighboring block are identical.

For example, an indicator for indicating an intra-prediction mode identical to that of the target block, among intra-prediction modes of multiple neighboring blocks, may be signaled.

When the intra-prediction modes of the target block and the neighboring block are different from each other, the intra-prediction mode information of the target block may be entropy-encoded/decoded based on the intra-prediction mode of the neighboring block.

Figure 7:
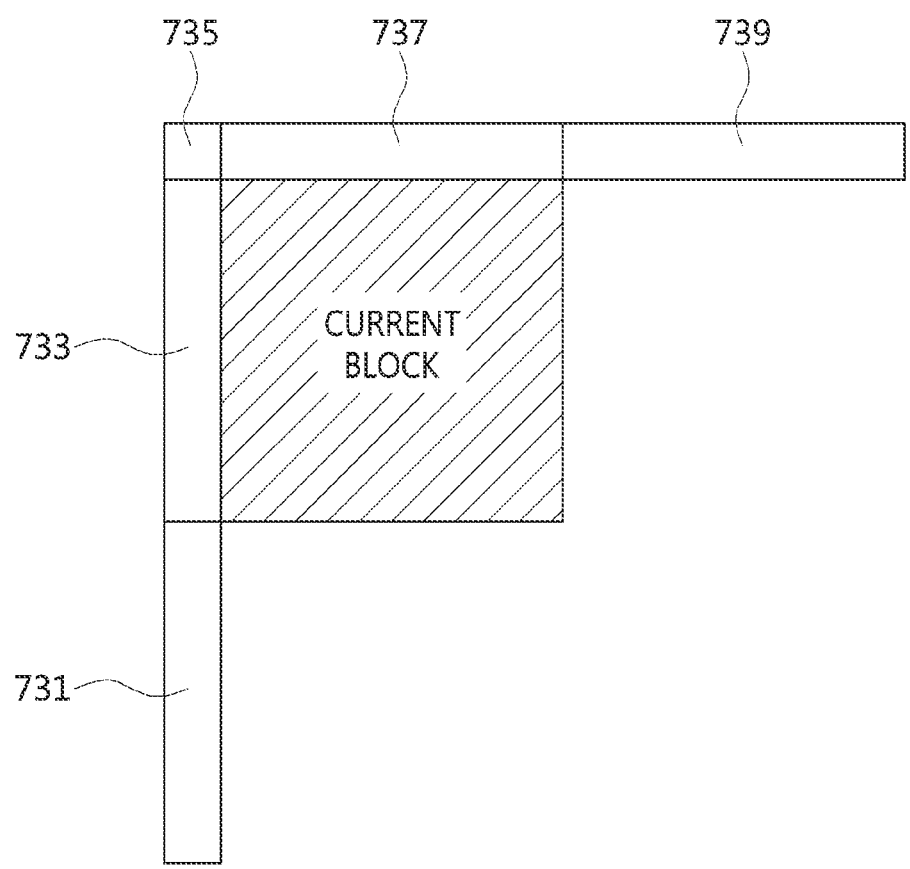
FIG. 7 is a diagram for explaining the locations of reference samples used in an intra-prediction procedure.

FIG. 7 is a diagram for explaining the locations of reference samples used in an intra-prediction procedure.

FIG. 7 illustrates the locations of reference samples used for intra prediction of a target block. Referring to FIG. 7, reconstructed reference samples used for intra prediction of the target block may include below-left reference samples 731, left reference samples 733, an above-left corner reference sample 735, above reference samples 737, and above-right reference samples 739.

For example, the left reference samples 733 may mean reconstructed reference pixels adjacent to the left side of the target block. The above reference samples 737 may mean reconstructed reference pixels adjacent to the top of the target block. The above-left corner reference sample 735 may mean a reconstructed reference pixel located at the above-left corner of the target block. The below-left reference samples 731 may mean reference samples located below a left sample line composed of the left reference samples 733, among samples located on the same line as the left sample line. The above-right reference samples 739 may mean reference samples located to the right of an above sample line composed of the above reference samples 737, among samples located on the same line as the above sample line.

When the size of a target block is N×N, the numbers of the below-left reference samples 731, the left reference samples 733, the above reference samples 737, and the above-right reference samples 739 may each be N.

By performing intra prediction on the target block, a prediction block may be generated. The generation of the prediction block may include the determination of the values of pixels in the prediction block. The sizes of the target block and the prediction block may be equal.

The reference samples used for intra prediction of the target block may vary depending on the intra-prediction mode of the target block. The direction of the intra-prediction mode may represent a dependence relationship between the reference samples and the pixels of the prediction block. For example, the value of a specified reference sample may be used as the values of one or more specified pixels in the prediction block. In this case, the specified reference sample and the one or more specified pixels in the prediction block may be the sample and pixels which are positioned in a straight line in the direction of an intra-prediction mode. In other words, the value of the specified reference sample may be copied as the value of a pixel located in a direction reverse to the direction of the intra-prediction mode. Alternatively, the value of a pixel in the prediction block may be the value of a reference sample located in the direction of the intra-prediction mode with respect to the location of the pixel.

In an example, when the intra-prediction mode of a target block is a vertical mode having a mode value of 26, the above reference samples 737 may be used for intra prediction. When the intra-prediction mode is the vertical mode, the value of a pixel in the prediction block may be the value of a reference sample vertically located above the location of the pixel. Therefore, the above reference samples 737 adjacent to the top of the target block may be used for intra prediction. Furthermore, the values of pixels in one row of the prediction block may be identical to those of the above reference samples 737.

In an example, when the intra-prediction mode of a target block is a horizontal mode having a mode value of 10, the left reference samples 733 may be used for intra prediction. When the intra-prediction mode is the horizontal mode, the value of a pixel in the prediction block may be the value of a reference sample horizontally located left to the location of the pixel. Therefore, the left reference samples 733 adjacent to the left of the target block may be used for intra prediction. Furthermore, the values of pixels in one column of the prediction block may be identical to those of the left reference samples 733.

In an example, when the mode value of the intra-prediction mode of the current block is 18, at least some of the left reference samples 733, the above-left corner reference sample 735, and at least some of the above reference samples 737 may be used for intra prediction. When the mode value of the intra-prediction mode is 18, the value of a pixel in the prediction block may be the value of a reference sample diagonally located at the above-left corner of the pixel.

Further, At least a part of the above-right reference samples 739 may be used for intra prediction in a case that a intra prediction mode having a mode value of 27, 28, 29, 30, 31, 32, 33 or 34 is used.

Further, At least a part of the below-left reference samples 731 may be used for intra prediction in a case that a intra prediction mode having a mode value of 2, 3, 4, 5, 6, 7, 8 or 9 is used.

Further, the above-left corner reference sample 735 may be used for intra prediction in a case that a intra prediction mode of which a mode value is a value ranging from 11 to 25.

The number of reference samples used to determine the pixel value of one pixel in the prediction block may be either 1, or 2 or more.

As described above, the pixel value of a pixel in the prediction block may be determined depending on the location of the pixel and the location of a reference sample indicated by the direction of the intra-prediction mode. When the location of the pixel and the location of the reference sample indicated by the direction of the intra-prediction mode are integer positions, the value of one reference sample indicated by an integer position may be used to determine the pixel value of the pixel in the prediction block.

When the location of the pixel and the location of the reference sample indicated by the direction of the intra-prediction mode are not integer positions, an interpolated reference sample based on two reference samples closest to the location of the reference sample may be generated. The value of the interpolated reference sample may be used to determine the pixel value of the pixel in the prediction block. In other words, when the location of the pixel in the prediction block and the location of the reference sample indicated by the direction of the intra-prediction mode indicate the location between two reference samples, an interpolated value based on the values of the two samples may be generated.

The prediction block generated via prediction may not be identical to an original target block. In other words, there may be a prediction error which is the difference between the target block and the prediction block, and there may also be a prediction error between the pixel of the target block and the pixel of the prediction block.

Hereinafter, the terms "difference", "error", and "residual" may be used to have the same meaning, and may be used interchangeably with each other.

For example, in the case of directional intra prediction, the longer the distance between the pixel of the prediction block and the reference sample, the greater the prediction error that may occur. Such a prediction error may result in discontinuity between the generated prediction block and neighboring blocks.

In order to reduce the prediction error, filtering for the prediction block may be used. Filtering may be configured to adaptively apply a filter to an area, regarded as having a large prediction error, in the prediction block. For example, the area regarded as having a large prediction error may be the boundary of the prediction block. Further, an area regarded as having a large prediction error in the prediction block may differ depending on the intra-prediction mode, and the characteristics of filters may also differ depending thereon.

Figure 8:
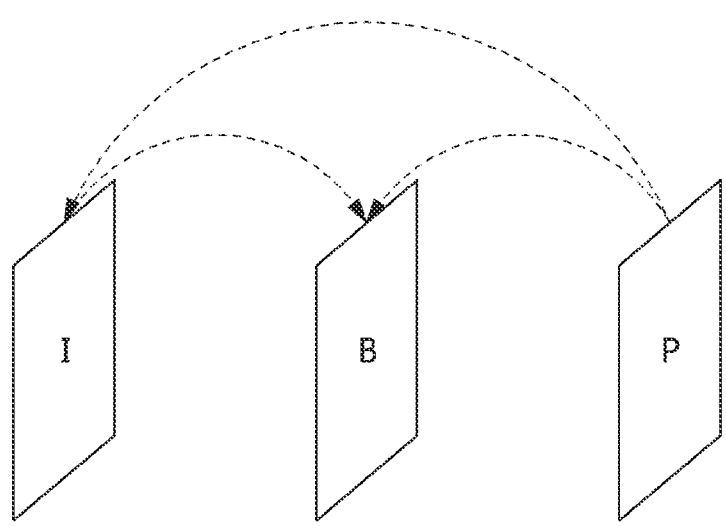
FIG. 8 is a diagram for explaining an embodiment of an inter-prediction procedure.

FIG. 8 is a diagram for explaining an embodiment of an inter prediction procedure.

The rectangles shown in FIG. 8 may represent images (or pictures). Further, in FIG. 8, arrows may represent prediction directions. That is, each image may be encoded and/or decoded depending on the prediction direction.

Images may be classified into an Intra Picture (I picture), a Uni-prediction Picture or Predictive Coded Picture (P picture), and a Bi-prediction Picture or Bi-predictive Coded Picture (B picture) depending on the encoding type. Each picture may be encoded depending on the encoding type thereof.

When a target image that is the target to be encoded is an I picture, the target image may be encoded using data contained in the image itself without inter prediction that refers to other images. For example, an I picture may be encoded only via intra prediction.

When a target image is a P picture, the target image may be encoded via inter prediction, which uses reference pictures existing in one direction. Here, the one direction may be a forward direction or a backward direction.

When a target image is a B picture, the image may be encoded via inter prediction that uses reference pictures existing in two directions, or may be encoded via inter prediction that uses reference pictures existing in one of a forward direction and a backward direction. Here, the two directions may be the forward direction and the backward direction.

A P picture and a B picture that are encoded and/or decoded using reference pictures may be regarded as images in which inter prediction is used.

Below, inter prediction in an inter mode according to an embodiment will be described in detail.

Inter prediction may be performed using motion information.

In an inter mode, the encoding apparatus 100 may perform inter prediction and/or motion compensation on a target block. The decoding apparatus 200 may perform inter prediction and/or motion compensation, corresponding to inter prediction and/or motion compensation performed by the encoding apparatus 100, on a target block.

Motion information of the target block may be individually derived by the encoding apparatus 100 and the decoding apparatus 200 during the inter prediction. The motion information may be derived using motion information of a reconstructed neighboring block, motion information of a col block, and/or motion information of a block adjacent to the col block.

For example, the encoding apparatus 100 or the decoding apparatus 200 may perform prediction and/or motion compensation by using motion information of a spatial candidate and/or a temporal candidate as motion information of the target block. The target block may mean a PU and/or a PU partition.

A spatial candidate may be a reconstructed block which is spatially adjacent to the target block.

A temporal candidate may be a reconstructed block corresponding to the target block in a previously reconstructed co-located picture (col picture).

In inter prediction, the encoding apparatus 100 and the decoding apparatus 200 may improve encoding efficiency and decoding efficiency by utilizing the motion information of a spatial candidate and/or a temporal candidate. The motion information of a spatial candidate may be referred to as 'spatial motion information'. The motion information of a temporal candidate may be referred to as 'temporal motion information'.

Below, the motion information of a spatial candidate may be the motion information of a PU including the spatial candidate. The motion information of a temporal candidate may be the motion information of a PU including the temporal candidate. The motion information of a candidate block may be the motion information of a PU including the candidate block.

Inter prediction may be performed using a reference picture.

The reference picture may be at least one of a picture previous to a target picture and a picture subsequent to the target picture. The reference picture may be an image used for the prediction of the target block.

In inter prediction, a region in the reference picture may be specified by utilizing a reference picture index (or refIdx) for indicating a reference picture, a motion vector, which will be described later, etc. Here, the region specified in the reference picture may indicate a reference block.

Inter prediction may select a reference picture, and may also select a reference block corresponding to the target block from the reference picture. Further, inter prediction may generate a prediction block for the target block using the selected reference block.

The motion information may be derived during inter prediction by each of the encoding apparatus 100 and the decoding apparatus 200.

A spatial candidate may be a block 1) which is present in a target picture, 2) which has been previously reconstructed via encoding and/or decoding, and 3) which is adjacent to the target block or is located at the corner of the target block. Here, the "block located at the corner of the target block" may be either a block vertically adjacent to a neighboring block that is horizontally adjacent to the target block, or a block horizontally adjacent to a neighboring block that is vertically adjacent to the target block. Further, "block located at the corner of the target block" may have the same meaning as "block adjacent to the corner of the target block". The meaning of "block located at the corner of the target block" may be included in the meaning of "block adjacent to the target block".

For example, a spatial candidate may be a reconstructed block located to the left of the target block, a reconstructed block located above the target block, a reconstructed block located at the below-left corner of the target block, a reconstructed block located at the above-right corner of the target block, or a reconstructed block located at the above-left corner of the target block.

Each of the encoding apparatus 100 and the decoding apparatus 200 may identify a block present at the location spatially corresponding to the target block in a col picture. The location of the target block in the target picture and the location of the identified block in the col picture may correspond to each other.

Each of the encoding apparatus 100 and the decoding apparatus 200 may determine a col block present at the predefined relative location for the identified block to be a temporal candidate. The predefined relative location may be a location present inside and/or outside the identified block.

For example, the col block may include a first col block and a second col block. When the coordinates of the identified block are (xP, yP) and the size of the identified block is represented by (nPSW, nPSH), the first col block may be a block located at coordinates (xP+nPSW, yP+nPSH). The second col block may be a block located at coordinates (xP+(nPSW>>1), yP+(nPSH>>1)). The second col block may be selectively used when the first col block is unavailable.

The motion vector of the target block may be determined based on the motion vector of the col block. Each of the encoding apparatus 100 and the decoding apparatus 200 may scale the motion vector of the col block. The scaled motion vector of the col block may be used as the motion vector of the target block. Further, a motion vector for the motion information of a temporal candidate stored in a list may be a scaled motion vector.

The ratio of the motion vector of the target block to the motion vector of the col block may be identical to the ratio of a first distance to a second distance. The first distance may be the distance between the reference picture and the target picture of the target block. The second distance may be the distance between the reference picture and the col picture of the col block.

The scheme for deriving motion information may change depending on the inter-prediction mode of a target block. For example, as inter-prediction modes applied for inter prediction, an Advanced Motion Vector Predictor (AMVP) mode, a merge mode, a skip mode, a current picture reference mode, etc. may be present. The merge mode may also be referred to as a "motion merge mode". Individual modes will be described in detail below.

1) AMVP Mode

When an AMVP mode is used, the encoding apparatus 100 may search a neighboring region of a target block for a similar block. The encoding apparatus 100 may acquire a prediction block by performing prediction on the target block using motion information of the found similar block. The encoding apparatus 100 may encode a residual block, which is the difference between the target block and the prediction block.

1-1) Creation of List of Prediction Motion Vector Candidates

When an AMVP mode is used as the prediction mode, each of the encoding apparatus 100 and the decoding apparatus 200 may create a list of prediction motion vector candidates using the motion vector of a spatial candidate, the motion vector of a temporal candidate, and a zero vector. The prediction motion vector candidate list may include one or more prediction motion vector candidates. At least one of the motion vector of a spatial candidate, the motion vector of a temporal candidate, and a zero vector may be determined and used as a prediction motion vector candidate.

Hereinafter, the terms "prediction motion vector (candidate)" and "motion vector (candidate)" may be used to have the same meaning, and may be used interchangeably with each other.

Hereinafter, the terms "prediction motion vector candidate" and "AMVP candidate" may be used to have the same meaning, and may be used interchangeably with each other.

Hereinafter, the terms "prediction motion vector candidate list" and "AMVP candidate list" may be used to have the same meaning, and may be used interchangeably with each other.

Spatial motion candidates may include a reconstructed spatial neighboring block. In other words, the motion vector of the reconstructed neighboring block may be referred to as a "spatial prediction motion vector candidate".

Temporal motion candidates may include a col block and a block adjacent to the col block. In other words, the motion vector of the col block or the motion vector of the block adjacent to the col block may be referred to as a "temporal prediction motion vector candidate".

The zero vector may be a (0, 0) motion vector.

The prediction motion vector candidates may be motion vector predictors for predicting a motion vector. Also, in the encoding apparatus 100, each prediction motion vector candidate may be an initial search location for a motion vector.

1-2) Search for Motion Vectors That Use List of Prediction Motion Vector Candidates The encoding apparatus 100 may determine the motion vector to be used to encode a target block within a search range using a list of prediction motion vector candidates. Further, the encoding apparatus 100 may determine a prediction motion vector candidate to be used as the prediction motion vector of the target block, among prediction motion vector candidates present in the prediction motion vector candidate list.

The motion vector to be used to encode the target block may be a motion vector that can be encoded at minimum cost.

Further, the encoding apparatus 100 may determine whether to use the AMVP mode to encode the target block.

1-3) Transmission of Inter-Prediction Information

The encoding apparatus 100 may generate a bitstream including inter-prediction information required for inter prediction. The decoding apparatus 200 may perform inter prediction on the target block using the inter-prediction information of the bitstream.

The inter-prediction information may contain 1) mode information indicating whether an AMVP mode is used, 2) a prediction motion vector index, 3) a Motion Vector Difference (MVD), 4) a reference direction, and 5) a reference picture index.

Hereinafter, the terms "prediction motion vector index" and "AMVP index" may be used to have the same meaning, and may be used interchangeably with each other. Further, the inter-prediction information may contain a residual signal.

The decoding apparatus 200 may acquire a prediction motion vector index, an MVD, a reference direction, and a reference picture index from the bitstream through entropy decoding when mode information indicates that the AMVP mode is used.

The prediction motion vector index may indicate a prediction motion vector candidate to be used for the prediction of a target block, among prediction motion vector candidates included in the prediction motion vector candidate list.

1-4) Inter Prediction in AMVP Mode That Uses Inter-Prediction Information

The decoding apparatus 200 may derive prediction motion vector candidates using a prediction motion vector candidate list, and may determine the motion information of a target block based on the derived prediction motion vector candidates.

The decoding apparatus 200 may determine a motion vector candidate for the target block, among the prediction motion vector candidates included in the prediction motion vector candidate list, using a prediction motion vector index. The decoding apparatus 200 may select a prediction motion vector candidate, indicated by the prediction motion vector index, from among prediction motion vector candidates included in the prediction motion vector candidate list, as the prediction motion vector of the target block.

The motion vector to be actually used for inter prediction of the target block may not match the prediction motion vector. In order to indicate the difference between the motion vector to be actually used for inter prediction of the target block and the prediction motion vector, an MVD may be used. The encoding apparatus 100 may derive a prediction motion vector similar to the motion vector to be actually used for inter prediction of the target block so as to use an MVD that is as small as possible.

An MVD may be the difference between the motion vector of the target block and the prediction motion vector. The encoding apparatus 100 may calculate an MVD and may entropy-encode the MVD.

The MVD may be transmitted from the encoding apparatus 100 to the decoding apparatus 200 through a bitstream. The decoding apparatus 200 may decode the received MVD. The decoding apparatus 200 may derive the motion vector of the target block by summing the decoded MVD and the prediction motion vector. In other words, the motion vector of the target block derived by the decoding apparatus 200 may be the sum of the entropy-decoded MVD and the motion vector candidate.

The reference direction may indicate a list of reference pictures to be used for prediction of the target block. For example, the reference direction may indicate one of a reference picture list L0 and a reference picture list L1.

The reference direction merely indicates the reference picture list to be used for prediction of the target block, and may not mean that the directions of reference pictures are limited to a forward direction or a backward direction. In other words, each of the reference picture list L0 and the reference picture list L1 may include pictures in a forward direction and/or a backward direction.

That the reference direction is unidirectional may mean that a single reference picture list is used. That the reference direction is bidirectional may mean that two reference picture lists are used. In other words, the reference direction may indicate one of the case where only the reference picture list L0 is used, the case where only the reference picture list L1 is used, and the case where two reference picture lists are used.

The reference picture index may indicate a reference picture to be used for prediction of a target block, among reference pictures in the reference picture list. The reference picture index may be entropy-encoded by the encoding apparatus 100. The entropy-encoded reference picture index may be signaled to the decoding apparatus 200 by the encoding apparatus 100 through a bitstream.

When two reference picture lists are used to predict the target block, a single reference picture index and a single motion vector may be used for each of the reference picture lists. Further, when two reference picture lists are used to predict the target block, two prediction blocks may be specified for the target block. For example, the (final) prediction block of the target block may be generated using the average or weighted sum of the two prediction blocks for the target block.

The motion vector of the target block may be derived by the prediction motion vector index, the MVD, the reference direction, and the reference picture index.

The decoding apparatus 200 may generate a prediction block for the target block based on the derived motion vector and the reference picture index. For example, the prediction block may be a reference block, indicated by the derived motion vector, in the reference picture indicated by the reference picture index.

Since the prediction motion vector index and the MVD are encoded without the motion vector itself of the target block being encoded, the number of bits transmitted from the encoding apparatus 100 to the decoding apparatus 200 may be decreased, and encoding efficiency may be improved.

For the target block, the motion information of reconstructed neighboring blocks may be used. In a specific inter-prediction mode, the encoding apparatus 100 may not separately encode the actual motion information of the target block. The motion information of the target block is not encoded, and additional information that enables the motion information of the target block to be derived using the motion information of reconstructed neighboring blocks may be encoded instead. As the additional information is encoded, the number of bits transmitted to the decoding apparatus 200 may be decreased, and encoding efficiency may be improved.

For example, as inter-prediction modes in which the motion information of the target block is not directly encoded, there may be a skip mode and/or a merge mode. Here, each of the encoding apparatus 100 and the decoding apparatus 200 may use an identifier and/or an index that indicates a unit, the motion information of which is to be used as the motion information of the target unit, among reconstructed neighboring units.

2) Merge Mode

As a scheme for deriving the motion information of a target block, there is merging. The term "merging" may mean the merging of the motion of multiple blocks. "Merging" may mean that the motion information of one block is also applied to other blocks. In other words, a merge mode may be a mode in which the motion information of the target block is derived from the motion information of a neighboring block.

When a merge mode is used, the encoding apparatus 100 may predict the motion information of a target block using the motion information of a spatial candidate and/or the motion information of a temporal candidate. The spatial candidate may include a reconstructed spatial neighboring block that is spatially adjacent to the target block. The spatially adjacent block may include a left adjacent block and an above adjacent block. The temporal candidate may include a col block. The terms "spatial candidate" and "spatial merge candidate" may be used to have the same meaning, and may be used interchangeably with each other. The terms "temporal candidate" and "temporal merge candidate" may be used to have the same meaning, and may be used interchangeably with each other.

The encoding apparatus 100 may acquire a prediction block via prediction. The encoding apparatus 100 may encode a residual block, which is the difference between the target block and the prediction block.

2-1) Creation of Merge Candidate List

When the merge mode is used, each of the encoding apparatus 100 and the decoding apparatus 200 may create a merge candidate list using the motion information of a spatial candidate and/or the motion information of a temporal candidate. The motion information may include 1) a motion vector, 2) a reference picture index, and 3) a reference direction. The reference direction may be unidirectional or bidirectional.

The merge candidate list may include merge candidates. The merge candidates may be motion information. In other words, the merge candidate list may be a list in which pieces of motion information are stored.

The merge candidates may be pieces of motion information of temporal candidates and/or spatial candidates. Further, the merge candidate list may include new merge candidates generated by a combination of merge candidates that are already present in the merge candidate list. In other words, the merge candidate list may include new motion information generated by a combination of pieces of motion information previously present in the merge candidate list.

The merge candidates may be specific modes deriving inter prediction information. The merge candidate may be information indicating a specific mode deriving inter prediction information. Inter prediction information of a target block may be derived according to a specific mode which the merge candidate indicates. Furthermore, the specific mode may include a process of deriving a series of inter prediction information. This specific mode may be an inter prediction information derivation mode or a motion information derivation mode.

The inter prediction information of the target block may be derived according to the mode indicated by the merge candidate selected by the merge index among the merge candidates in the merge candidate list.

For example, the motion information derivation modes in the merge candidate list may be at least one of 1) motion information derivation mode for a sub-block unit and 2) an affine motion information derivation mode. Furthermore, the merge candidate list may include motion information of a zero vector. The zero vector may also be referred to as a "zero-merge candidate".

In other words, pieces of motion information in the merge candidate list may be at least one of 1) motion information of a spatial candidate, 2) motion information of a temporal candidate, 3) motion information generated by a combination of pieces of motion information previously present in the merge candidate list, and 4) a zero vector.

Motion information may include 1) a motion vector, 2) a reference picture index, and 3) a reference direction. The reference direction may also be referred to as an "inter-prediction indicator". The reference direction may be unidirectional or bidirectional. The unidirectional reference direction may indicate L0 prediction or L1 prediction.

The merge candidate list may be created before prediction in the merge mode is performed.

The number of merge candidates in the merge candidate list may be predefined. Each of the encoding apparatus 100 and the decoding apparatus 200 may add merge candidates to the merge candidate list depending on the predefined scheme and predefined priorities so that the merge candidate list has a predefined number of merge candidates. The merge candidate list of the encoding apparatus 100 and the merge candidate list of the decoding apparatus 200 may be made identical to each other using the predefined scheme and the predefined priorities.

Merging may be applied on a CU basis or a PU basis. When merging is performed on a CU basis or a PU basis, the encoding apparatus 100 may transmit a bitstream including predefined information to the decoding apparatus 200. For example, the predefined information may contain 1) information indicating whether to perform merging for individual block partitions, and 2) information about a block with which merging is to be performed, among blocks that are spatial candidates and/or temporal candidates for the target block.

2-2) Search for Motion Vector That Uses Merge Candidate List

The encoding apparatus 100 may determine merge candidates to be used to encode a target block. For example, the encoding apparatus 100 may perform prediction on the target block using merge candidates in the merge candidate list, and may generate residual blocks for the merge candidates. The encoding apparatus 100 may use a merge candidate that incurs the minimum cost in prediction and in the encoding of residual blocks to encode the target block.

Further, the encoding apparatus 100 may determine whether to use a merge mode to encode the target block.

2-3) Transmission of Inter-Prediction Information

The encoding apparatus 100 may generate a bitstream that includes inter-prediction information required for inter prediction. The encoding apparatus 100 may generate entropy-encoded inter-prediction information by performing entropy encoding on inter-prediction information, and may transmit a bitstream including the entropy-encoded inter-prediction information to the decoding apparatus 200. Through the bitstream, the entropy-encoded inter-prediction information may be signaled to the decoding apparatus 200 by the encoding apparatus 100.

The decoding apparatus 200 may perform inter prediction on the target block using the inter-prediction information of the bitstream.

The inter-prediction information may contain 1) mode information indicating whether a merge mode is used and 2) a merge index.

Further, the inter-prediction information may contain a residual signal.

The decoding apparatus 200 may acquire the merge index from the bitstream only when the mode information indicates that the merge mode is used.

The mode information may be a merge flag. The unit of the mode information may be a block. Information about the block may include mode information, and the mode information may indicate whether a merge mode is applied to the block.

The merge index may indicate a merge candidate to be used for the prediction of the target block, among merge candidates included in the merge candidate list. Alternatively, the merge index may indicate a block with which the target block is to be merged, among neighboring blocks spatially or temporally adjacent to the target block.

The encoding apparatus 100 may select the merge candidate having the highest encoding performance from among merge candidates included in a merge candidate list, and may set the value of a merge index so that the merge index indicates the selected merge candidate.

2-4) Inter Prediction of Merge Mode That Uses Inter-Prediction Information

The decoding apparatus 200 may perform prediction on the target block using the merge candidate indicated by the merge index, among merge candidates included in the merge candidate list.

The motion vector of the target block may be specified by the motion vector, reference picture index, and reference direction of the merge candidate indicated by the merge index.

3) Skip Mode

A skip mode may be a mode in which the motion information of a spatial candidate or the motion information of a temporal candidate is applied to the target block without change. Also, the skip mode may be a mode in which a residual signal is not used. In other words, when the skip mode is used, a reconstructed block may be a prediction block.

The difference between the merge mode and the skip mode lies in whether or not a residual signal is transmitted or used. That is, the skip mode may be similar to the merge mode except that a residual signal is not transmitted or used.

When the skip mode is used, the encoding apparatus 100 may transmit information about a block, the motion information of which is to be used as the motion information of the target block, among blocks that are spatial candidates or temporal candidates, to the decoding apparatus 200 through a bitstream. The encoding apparatus 100 may generate entropy-encoded information by performing entropy encoding on the information, and may signal the entropy-encoded information to the decoding apparatus 200 through a bitstream.

Further, when the skip mode is used, the encoding apparatus 100 may not transmit other syntax information, such as an MVD, to the decoding apparatus 200. For example, when the skip mode is used, the encoding apparatus 100 may not signal a syntax element related to at least one of an MVC, a coded block flag, and a transform coefficient level to the decoding apparatus 200.

3-1) Creation of Merge Candidate List

The skip mode may also use a merge candidate list. In other words, a merge candidate list may be used both in the merge mode and in the skip mode. In this aspect, the merge candidate list may also be referred to as a "skip candidate list" or a "merge/skip candidate list".

Alternatively, the skip mode may use an additional candidate list different from that of the merge mode. In this case, in the following description, a merge candidate list and a merge candidate may be replaced with a skip candidate list and a skip candidate, respectively.

The merge candidate list may be created before prediction in the skip mode is performed.

3-2) Search for Motion Vector That Uses Merge Candidate List

The encoding apparatus 100 may determine the merge candidates to be used to encode a target block. For example, the encoding apparatus 100 may perform prediction on the target block using the merge candidates in a merge candidate list. The encoding apparatus 100 may use a merge candidate that incurs the minimum cost in prediction to encode the target block.

Further, the encoding apparatus 100 may determine whether to use a skip mode to encode the target block.

3-3) Transmission of Inter-Prediction Information

The encoding apparatus 100 may generate a bitstream that includes inter-prediction information required for inter prediction. The decoding apparatus 200 may perform inter prediction on the target block using the inter-prediction information of the bitstream.

The inter-prediction information may include 1) mode information indicating whether a skip mode is used, and 2) a skip index.

The skip index may be identical to the above-described merge index.

When the skip mode is used, the target block may be encoded without using a residual signal. The inter-prediction information may not contain a residual signal. Alternatively, the bitstream may not include a residual signal.

The decoding apparatus 200 may acquire a skip index from the bitstream only when the mode information indicates that the skip mode is used. As described above, a merge index and a skip index may be identical to each other. The decoding apparatus 200 may acquire the skip index from the bitstream only when the mode information indicates that the merge mode or the skip mode is used.

The skip index may indicate the merge candidate to be used for the prediction of the target block, among the merge candidates included in the merge candidate list.

3-4) Inter Prediction in Skip Mode That Uses Inter-Prediction Information

The decoding apparatus 200 may perform prediction on the target block using a merge candidate indicated by a skip index, among the merge candidates included in a merge candidate list.

The motion vector of the target block may be specified by the motion vector, reference picture index, and reference direction of the merge candidate indicated by the skip index.

4) Current Picture Reference Mode

The current picture reference mode may denote a prediction mode that uses a previously reconstructed region in a target picture to which a target block belongs.

A vector for specifying the previously reconstructed region may be defined. Whether the target block has been encoded in the current picture reference mode may be determined using the reference picture index of the target block.

A flag or index indicating whether the target block is a block encoded in the current picture reference mode may be signaled by the encoding apparatus 100 to the decoding apparatus 200. Alternatively, whether the target block is a block encoded in the current picture reference mode may be inferred through the reference picture index of the target block.

When the target block is encoded in the current picture reference mode, the target picture may be added to a fixed location or an arbitrary location in a reference picture list for the target block.

For example, the fixed location may be either a location where the reference picture index is 0 or the last location.

When the target picture is added to an arbitrary location in the reference picture list, an additional reference picture index indicating such an arbitrary location may be signaled by the encoding apparatus 100 to the decoding apparatus 200.

In the above-described AMVP mode, merge mode, and skip mode, motion information to be used for the prediction of a target block may be specified, among pieces of motion information in the list, using the index of the list.

In order to improve encoding efficiency, the encoding apparatus 100 may signal only the index of an element that incurs the minimum cost in inter prediction of the target block, among elements in the list. The encoding apparatus 100 may encode the index, and may signal the encoded index.

Therefore, the above-described lists (i.e. the prediction motion vector candidate list and the merge candidate list) must be able to be derived by the encoding apparatus 100 and the decoding apparatus 200 using the same scheme based on the same data. Here, the same data may include a reconstructed picture and a reconstructed block. Further, in order to specify an element using an index, the order of the elements in the list must be fixed.

Figure 9:
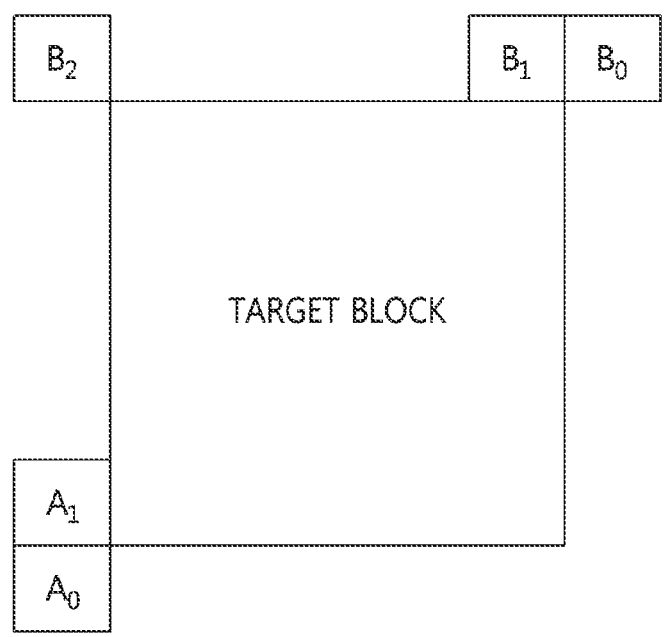
FIG. 9 illustrates spatial candidates according to an embodiment.

FIG. 9 illustrates spatial candidates according to an embodiment.

In FIG. 9, the locations of spatial candidates are illustrated.

The large block in the center of the drawing may denote a target block. Five small blocks may denote spatial candidates.

The coordinates of the target block may be (xP, yP), and the size of the target block may be represented by (nPSW, nPSH).

Spatial candidate $A_0$ may be a block adjacent to the below-left corner of the target block. $A_0$ may be a block that occupies pixels located at coordinates (xP−1, yP+nPSH+1).

Spatial candidate $A_1$ may be a block adjacent to the left of the target block. $A_1$ may be a lowermost block, among blocks adjacent to the left of the target block. Alternatively, $A_1$ may be a block adjacent to the top of $A_0$. $A_1$ may be a block that occupies pixels located at coordinates (xP−1, yP+nPSH).

Spatial candidate $B_0$ may be a block adjacent to the above-right corner of the target block. $B_0$ may be a block that occupies pixels located at coordinates (xP+nPSW+1, yP−1).

Spatial candidate $B_1$ may be a block adjacent to the top of the target block. $B_1$ may be a rightmost block, among blocks adjacent to the top of the target block. Alternatively, $B_1$ may be a block adjacent to the left of $B_0$. $B_1$ may be a block that occupies pixels located at coordinates (xP+nPSW, yP−1).

Spatial candidate $B_2$ may be a block adjacent to the above-left corner of the target block. $B_2$ may be a block that occupies pixels located at coordinates (xP−1, yP−1).

Determination of Availability of Spatial Candidate and Temporal Candidate

In order to include the motion information of a spatial candidate or the motion information of a temporal candidate in a list, it must be determined whether the motion information of the spatial candidate or the motion information of the temporal candidate is available.

Hereinafter, a candidate block may include a spatial candidate and a temporal candidate.

For example, the determination may be performed by sequentially applying the following steps 1) to 4).

Step 1) When a PU including a candidate block is out of the boundary of a picture, the availability of the candidate block may be set to "false". The expression "availability is set to false" may have the same meaning as "set to be unavailable".

Step 2) When a PU including a candidate block is out of the boundary of a slice, the availability of the candidate block may be set to "false". When the target block and the candidate block are located in different slices, the availability of the candidate block may be set to "false".

Step 3) When a PU including a candidate block is out of the boundary of a tile, the availability of the candidate block may be set to "false". When the target block and the candidate block are located in different tiles, the availability of the candidate block may be set to "false".

Step 4) When the prediction mode of a PU including a candidate block is an intra-prediction mode, the availability of the candidate block may be set to "false". When a PU including a candidate block does not use inter prediction, the availability of the candidate block may be set to "false".

Figure 10:
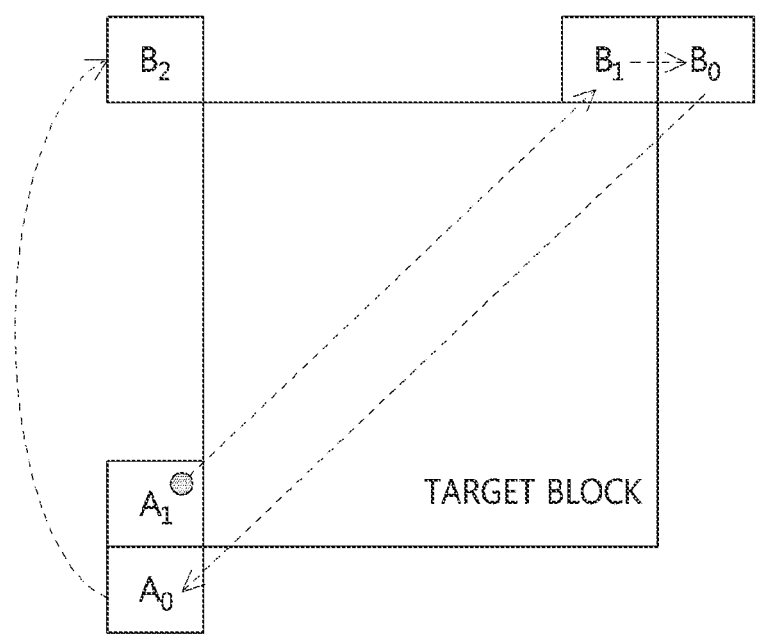
FIG. 10 illustrates the order of addition of motion information of spatial candidates to a merge list according to an embodiment.

FIG. 10 illustrates the order of addition of motion information of spatial candidates to a merge list according to an embodiment.

As shown in FIG. 10, when pieces of motion information of spatial candidates are added to a merge list, the order of $A_1$, $B_1$, $B_0$, $A_0$, and $B_2$ may be used. That is, pieces of motion information of available spatial candidates may be added to the merge list in the order of $A_1$, $B_1$, $B_0$, $A_0$, and $B_2$.

Method for Deriving Merge List in Merge Mode and Skip Mode

As described above, the maximum number of merge candidates in the merge list may be set. The set maximum number is indicated by "N". The set number may be transmitted from the encoding apparatus 100 to the decoding apparatus 200. The slice header of a slice may include N. In other words, the maximum number of merge candidates in the merge list for the target block of the slice may be set by the slice header. For example, the value of N may be basically 5.

Pieces of motion information (i.e., merge candidates) may be added to the merge list in the order of the following steps 1) to 4).

Step 1) Among spatial candidates, available spatial candidates may be added to the merge list. Pieces of motion information of the available spatial candidates may be added to the merge list in the order illustrated in FIG. 10. Here, when the motion information of an available spatial candidate overlaps other motion information already present in the merge list, the motion information may not be added to the merge list. The operation of checking whether the corresponding motion information overlaps other motion information present in the list may be referred to in brief as an "overlap check".

The maximum number of pieces of motion information that are added may be N.

Step 2) When the number of pieces of motion information in the merge list is less than N and a temporal candidate is available, the motion information of the temporal candidate may be added to the merge list. Here, when the motion information of the available temporal candidate overlaps other motion information already present in the merge list, the motion information may not be added to the merge list.

Step 3) When the number of pieces of motion information in the merge list is less than N and the type of a target slice is "B", combined motion information generated by combined bidirectional prediction (bi-prediction) may be added to the merge list.

The target slice may be a slice including a target block.

The combined motion information may be a combination of L0 motion information and L1 motion information. L0 motion information may be motion information that refers only to a reference picture list L0. L1 motion information may be motion information that refers only to a reference picture list L1.

In the merge list, one or more pieces of L0 motion information may be present. Further, in the merge list, one or more pieces of L1 motion information may be present.

The combined motion information may include one or more pieces of combined motion information. When the combined motion information is generated, L0 motion information and L1 motion information, which are to be used for generation, among the one or more pieces of L0 motion information and the one or more pieces of L1 motion information, may be predefined. One or more pieces of combined motion information may be generated in a predefined order via combined bidirectional prediction, which uses a pair of different pieces of motion information in the merge list. One of the pair of different pieces of motion information may be L0 motion information and the other of the pair may be L1 motion information.

For example, combined motion information that is added with the highest priority may be a combination of L0 motion information having a merge index of 0 and L1 motion information having a merge index of 1. When motion information having a merge index of 0 is not L0 motion information or when motion information having a merge index of 1 is not L1 motion information, the combined motion information may be neither generated nor added. Next, the combined motion information that is added with the next priority may be a combination of L0 motion information, having a merge index of 1, and L1 motion information, having a merge index of 0. Subsequent detailed combinations may conform to other combinations of video encoding/decoding fields.

Here, when the combined motion information overlaps other motion information already present in the merge list, the combined motion information may not be added to the merge list.

Step 4) When the number of pieces of motion information in the merge list is less than N, motion information of a zero vector may be added to the merge list.

The zero-vector motion information may be motion information for which the motion vector is a zero vector.

The number of pieces of zero-vector motion information may be one or more. The reference picture indices of one or more pieces of zero-vector motion information may be different from each other. For example, the value of the reference picture index of first zero-vector motion information may be 0. The value of the reference picture index of second zero-vector motion information may be 1.

The number of pieces of zero-vector motion information may be identical to the number of reference pictures in the reference picture list.

The reference direction of zero-vector motion information may be bidirectional. Both of the motion vectors may be zero vectors. The number of pieces of zero-vector motion information may be the smaller one of the number of reference pictures in the reference picture list L0 and the number of reference pictures in the reference picture list L1. Alternatively, when the number of reference pictures in the reference picture list L0 and the number of reference pictures in the reference picture list L1 are different from each other, a reference direction that is unidirectional may be used for a reference picture index that may be applied only to a single reference picture list.

The encoding apparatus 100 and/or the decoding apparatus 200 may sequentially add the zero-vector motion information to the merge list while changing the reference picture index.

When zero-vector motion information overlaps other motion information already present in the merge list, the zero-vector motion information may not be added to the merge list.

The order of the above-described steps 1) to 4) is merely exemplary, and may be changed. Further, some of the above steps may be omitted depending on predefined conditions.

Method for Deriving Prediction Motion Vector Candidate List in AMVP Mode

The maximum number of prediction motion vector candidates in a prediction motion vector candidate list may be predefined. The predefined maximum number is indicated by N. For example, the predefined maximum number may be 2.

Pieces of motion information (i.e. prediction motion vector candidates) may be added to the prediction motion vector candidate list in the order of the following steps 1) to 3).

Step 1) Available spatial candidates, among spatial candidates, may be added to the prediction motion vector candidate list. The spatial candidates may include a first spatial candidate and a second spatial candidate.

The first spatial candidate may be one of $A_0$, $A_1$, scaled $A_0$, and scaled $A_1$. The second spatial candidate may be one of $B_0$, $B_1$, $B_2$, scaled $B_0$, scaled $B_1$, and scaled $B_2$.

Pieces of motion information of available spatial candidates may be added to the prediction motion vector candidate list in the order of the first spatial candidate and the second spatial candidate. In this case, when the motion information of an available spatial candidate overlaps other motion information already present in the prediction motion vector candidate list, the motion information may not be added to the prediction motion vector candidate list. In other words, when the value of N is 2, if the motion information of a second spatial candidate is identical to the motion information of a first spatial candidate, the motion information of the second spatial candidate may not be added to the prediction motion vector candidate list.

The maximum number of pieces of motion information that are added may be N.

Step 2) When the number of pieces of motion information in the prediction motion vector candidate list is less than N and a temporal candidate is available, the motion information of the temporal candidate may be added to the prediction motion vector candidate list. In this case, when the motion information of the available temporal candidate overlaps other motion information already present in the prediction motion vector candidate list, the motion information may not be added to the prediction motion vector candidate list.

Step 3) When the number of pieces of motion information in the prediction motion vector candidate list is less than N, zero-vector motion information may be added to the prediction motion vector candidate list.

The zero-vector motion information may include one or more pieces of zero-vector motion information. The reference picture indices of the one or more pieces of zero-vector motion information may be different from each other.

The encoding apparatus 100 and/or the decoding apparatus 200 may sequentially add pieces of zero-vector motion information to the prediction motion vector candidate list while changing the reference picture index.

When zero-vector motion information overlaps other motion information already present in the prediction motion vector candidate list, the zero-vector motion information may not be added to the prediction motion vector candidate list.

The description of the zero-vector motion information, made above in connection with the merge list, may also be applied to zero-vector motion information. A repeated description thereof will be omitted.

The order of the above-described steps 1) to 3) is merely exemplary, and may be changed. Further, some of the steps may be omitted depending on predefined conditions.

Figure 11:
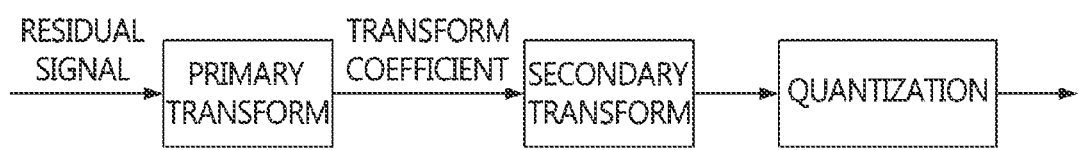
FIG. 11 illustrates a transform and quantization process according to an example.

FIG. 11 illustrates a transform and quantization process according to an example.

As illustrated in FIG. 11, quantized levels may be generated by performing a transform and/or quantization process on a residual signal.

A residual signal may be generated as the difference between an original block and a prediction block. Here, the prediction block may be a block generated via intra prediction or inter prediction.

The transform may include at least one of a primary transform and a secondary transform. A transform coefficient may be generated by performing the primary transform on the residual signal, and a secondary transform coefficient may be generated by performing the secondary transform on the transform coefficient.

The primary transform may be performed using at least one of predefined multiple transform methods. For example, the predefined multiple transform methods may include a Discrete Cosine Transform (DCT), a Discrete Sine Transform (DST), a Karhunen-Loeve Transform (KLT), etc.

The secondary transform may be performed on the transform coefficient generated by performing the primary transform.

Transform methods applied to the primary transform and/or the secondary transform may be determined based on at least one of coding parameters for a target block and/or a neighboring block. Alternatively, transform information indicating transform methods may be signaled by the encoding apparatus to the decoding apparatus 200.

The quantized levels may be generated by performing quantization on the result, generated by performing the primary transform and/or the secondary transform, or on the residual signal.

The quantized levels may be scanned based on at least one of up-right diagonal scanning, vertical scanning, and horizontal scanning, depending on at least one of an intra-prediction mode, a block size, and a block form.

For example, coefficients may be changed to 1D vector forms by scanning coefficients of blocks using up-right diagonal scanning. Alternatively, depending on the size of a transform block and/or an intra-prediction mode, vertical scanning, which scans 2D block-format coefficients in a column direction, or horizontal scanning, which scans 2D block-format coefficients in a row direction, may be used instead of the up-right diagonal scanning.

The scanned quantized levels may be entropy-encoded, and a bitstream may include the entropy-encoded quantized levels.

The decoding apparatus 200 may generate quantized levels via entropy decoding on the bitstream. The quantized levels may be aligned in the form of a 2D block via inverse scanning. Here, as the method of inverse scanning, at least one of up-right diagonal scanning, vertical scanning, and horizontal scanning may be performed.

Dequantization may be performed on the quantized levels. A secondary inverse transform may be performed on the result generated by performing dequantization depending on whether to perform the secondary inverse transform. Further, a primary inverse transform may be performed on the result generated by performing the secondary inverse transform depending on whether the primary inverse transform is to be performed. A reconstructed residual signal may be generated by performing the primary inverse transform on the result generated by performing the secondary inverse transform.

Figure 12:
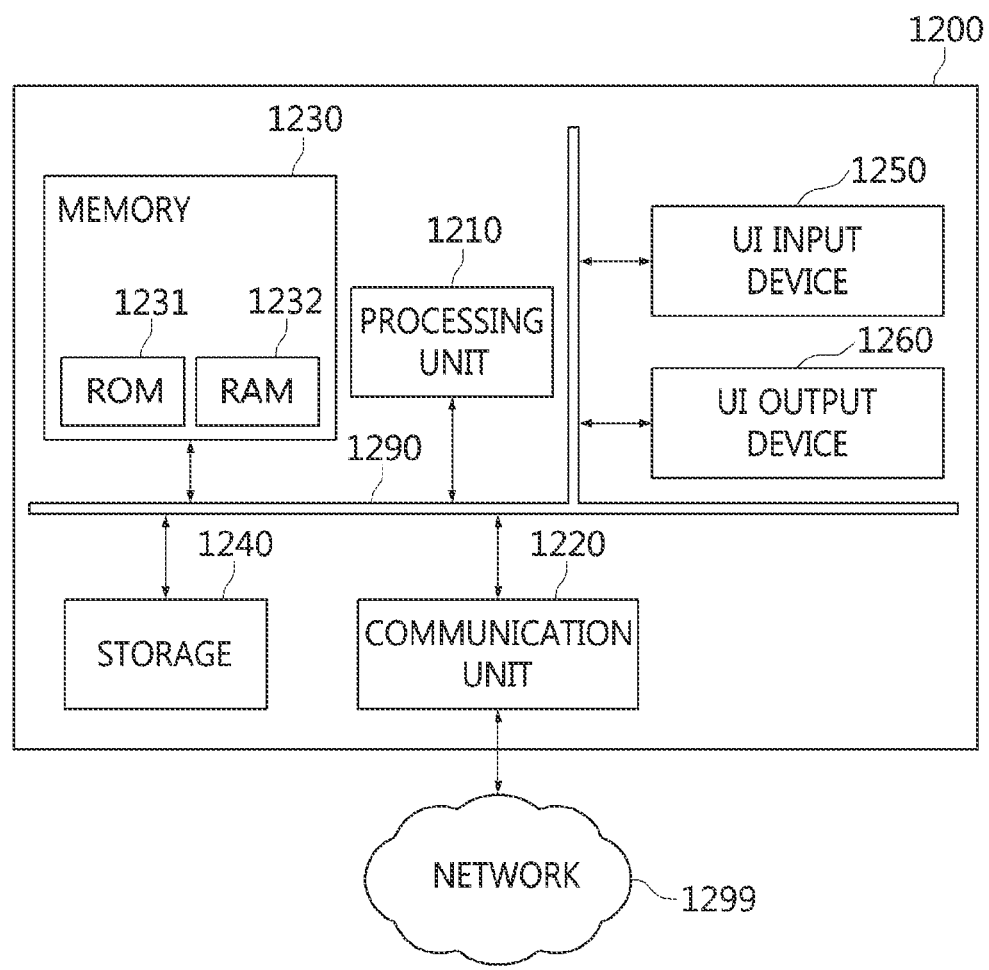
FIG. 12 is a configuration diagram of an encoding apparatus according to an embodiment.

FIG. 12 is a configuration diagram of an encoding apparatus according to an embodiment.

An encoding apparatus 1200 may correspond to the above-described encoding apparatus 100.

The encoding apparatus 1200 may include a processing unit 1210, memory 1230, a user interface (UI) input device 1250, a UI output device 1260, and storage 1240, which communicate with each other through a bus 1290. The encoding apparatus 1200 may further include a communication unit 1220 coupled to a network 1299.

The processing unit 1210 may be a Central Processing Unit (CPU) or a semiconductor device for executing processing instructions stored in the memory 1230 or the storage 1240. The processing unit 1210 may be at least one hardware processor.

The processing unit 1210 may generate and process signals, data or information that are input to the encoding apparatus 1200, are output from the encoding apparatus 1200, or are used in the encoding apparatus 1200, and may perform examination, comparison, determination, etc. related to the signals, data or information. In other words, in embodiments, the generation and processing of data or information and examination, comparison and determination related to data or information may be performed by the processing unit 1210.

The processing unit 1210 may include an inter-prediction unit 110, an intra-prediction unit 120, a switch 115, a subtractor 125, a transform unit 130, a quantization unit 140, an entropy encoding unit 150, a dequantization unit 160, an inverse transform unit 170, an adder 175, a filter unit 180, and a reference picture buffer 190.

At least some of the inter-prediction unit 110, the intra-prediction unit 120, the switch 115, the subtractor 125, the transform unit 130, the quantization unit 140, the entropy encoding unit 150, the dequantization unit 160, the inverse transform unit 170, the adder 175, the filter unit 180, and the reference picture buffer 190 may be program modules, and may communicate with an external device or system. The program modules may be included in the encoding apparatus 1200 in the form of an operating system, an application program module, or other program modules.

The program modules may be physically stored in various types of well-known storage devices. Further, at least some of the program modules may also be stored in a remote storage device that is capable of communicating with the encoding apparatus 1200.

The program modules may include, but are not limited to, a routine, a subroutine, a program, an object, a component, and a data structure for performing functions or operations according to an embodiment or for implementing abstract data types according to an embodiment.

The program modules may be implemented using instructions or code executed by at least one processor of the encoding apparatus 1200.

The processing unit 1210 may execute instructions or code in the inter-prediction unit 110, the intra-prediction unit 120, the switch 115, the subtractor 125, the transform unit 130, the quantization unit 140, the entropy encoding unit 150, the dequantization unit 160, the inverse transform unit 170, the adder 175, the filter unit 180, and the reference picture buffer 190.

A storage unit may denote the memory 1230 and/or the storage 1240. Each of the memory 1230 and the storage 1240 may be any of various types of volatile or nonvolatile storage media. For example, the memory 1230 may include at least one of Read-Only Memory (ROM) 1231 and Random Access Memory (RAM) 1232.

The storage unit may store data or information used for the operation of the encoding apparatus 1200. In an embodiment, the data or information of the encoding apparatus 1200 may be stored in the storage unit.

For example, the storage unit may store pictures, blocks, lists, motion information, inter-prediction information, bitstreams, etc.

The encoding apparatus 1200 may be implemented in a computer system including a computer-readable storage medium.

The storage medium may store at least one module required for the operation of the encoding apparatus 1200. The memory 1230 may store at least one module, and may be configured such that the at least one module is executed by the processing unit 1210.

Functions related to communication of the data or information of the encoding apparatus 1200 may be performed through the communication unit 1220.

For example, the communication unit 1220 may transmit a bitstream to a decoding apparatus 1300, which will be described later.

Figure 13:
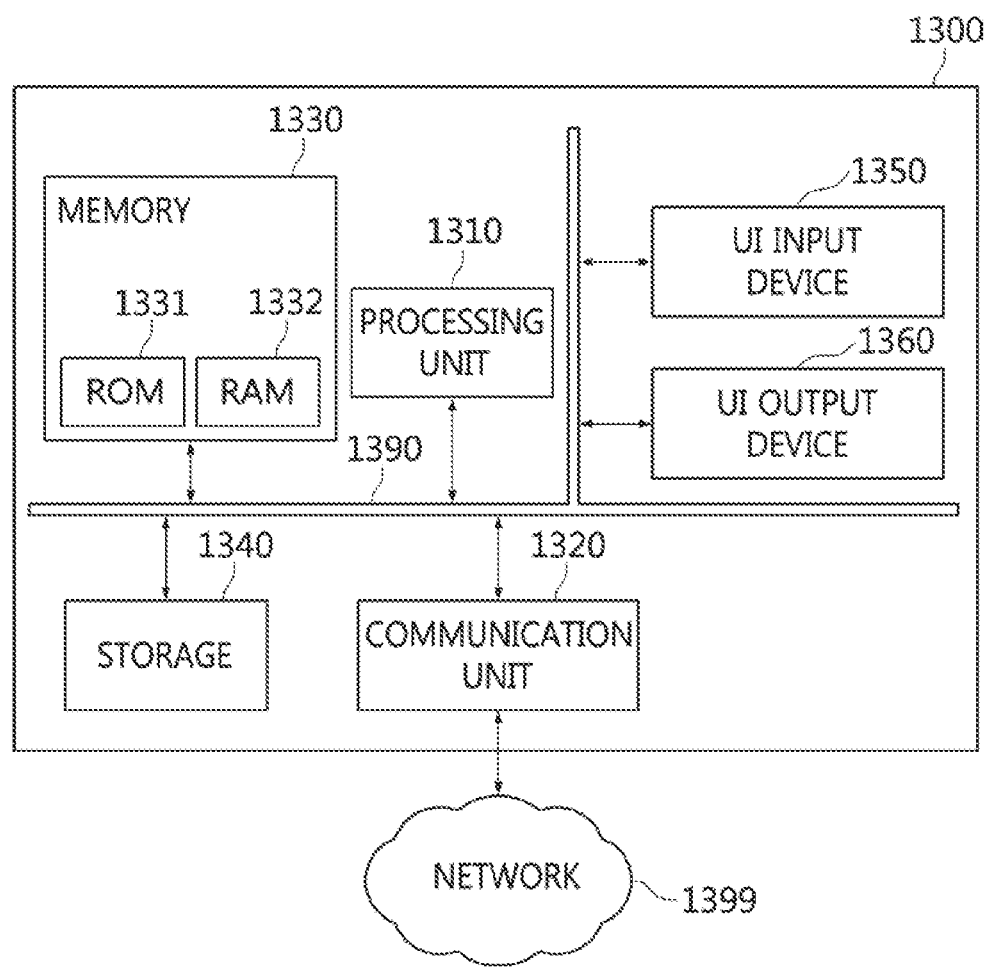
FIG. 13 is a configuration diagram of a decoding apparatus according to an embodiment.

FIG. 13 is a configuration diagram of a decoding apparatus according to an embodiment.

The decoding apparatus 1300 may correspond to the above-described decoding apparatus 200.

The decoding apparatus 1300 may include a processing unit 1310, memory 1330, a user interface (UI) input device 1350, a UI output device 1360, and storage 1340, which communicate with each other through a bus 1390. The decoding apparatus 1300 may further include a communication unit 1320 coupled to a network 1399.

The processing unit 1310 may be a Central Processing Unit (CPU) or a semiconductor device for executing processing instructions stored in the memory 1330 or the storage 1340. The processing unit 1310 may be at least one hardware processor.

The processing unit 1310 may generate and process signals, data or information that are input to the decoding apparatus 1300, are output from the decoding apparatus 1300, or are used in the decoding apparatus 1300, and may perform examination, comparison, determination, etc. related to the signals, data or information. In other words, in embodiments, the generation and processing of data or information and examination, comparison and determination related to data or information may be performed by the processing unit 1310.

The processing unit 1310 may include an entropy decoding unit 210, a dequantization unit 220, an inverse transform unit 230, an intra-prediction unit 240, an inter-prediction unit 250, an adder 255, a filter unit 260, and a reference picture buffer 270.

At least some of the entropy decoding unit 210, the dequantization unit 220, the inverse transform unit 230, the intra-prediction unit 240, the inter-prediction unit 250, the adder 255, the filter unit 260, and the reference picture buffer 270 of the decoding apparatus 200 may be program modules, and may communicate with an external device or system. The program modules may be included in the decoding apparatus 1300 in the form of an operating system, an application program module, or other program modules.

The program modules may be physically stored in various types of well-known storage devices. Further, at least some of the program modules may also be stored in a remote storage device that is capable of communicating with the decoding apparatus 1300.

The program modules may include, but are not limited to, a routine, a subroutine, a program, an object, a component, and a data structure for performing functions or operations according to an embodiment or for implementing abstract data types according to an embodiment.

The program modules may be implemented using instructions or code executed by at least one processor of the decoding apparatus 1300.

The processing unit 1310 may execute instructions or code in the entropy decoding unit 210, the dequantization unit 220, the inverse transform unit 230, the intra-prediction unit 240, the inter-prediction unit 250, the adder 255, the filter unit 260, and the reference picture buffer 270.

A storage unit may denote the memory 1330 and/or the storage 1340. Each of the memory 1330 and the storage 1340 may be any of various types of volatile or nonvolatile storage media. For example, the memory 1330 may include at least one of ROM 1331 and RAM 1332.

The storage unit may store data or information used for the operation of the decoding apparatus 1300. In an embodiment, the data or information of the decoding apparatus 1300 may be stored in the storage unit.

For example, the storage unit may store pictures, blocks, lists, motion information, inter-prediction information, bitstreams, etc.

The decoding apparatus 1300 may be implemented in a computer system including a computer-readable storage medium.

The storage medium may store at least one module required for the operation of the decoding apparatus 1300. The memory 1330 may store at least one module, and may be configured such that the at least one module is executed by the processing unit 1310.

Functions related to communication of the data or information of the decoding apparatus 1300 may be performed through the communication unit 1320.

For example, the communication unit 1320 may receive a bitstream from the encoding apparatus 1200.

In the following embodiments, in encoding and decoding using inter prediction, a method for deriving inter-prediction information of a target block using inter-prediction information of a neighbor block will be described.

In encoding and decoding using inter prediction, inter-prediction information of the target block in a target picture may be searched for in a previously encoded and/or decoded picture so as to remove temporal redundancy from a video.

As the inter-prediction information of the target block is derived using the inter-prediction information of the neighbor block, the amount of information required for inter prediction may be reduced. Here, the amount of information may be the number of bits.

As the method for deriving the inter-prediction information of the target block using the inter-prediction information of a neighbor block, an AMVP mode and a merge mode may be used. In the AMVP mode and the merge mode, an AMVP candidate list and a merge candidate list may be individually configured using temporally adjacent neighbor blocks and spatially adjacent neighbor blocks. Each candidate in such a list may be the inter-prediction information or a portion of the inter-prediction information.

In the configuration of the lists, the lists may be filled with inter-prediction information of available neighbor blocks as candidates.

When there is no inter-prediction information of a neighbor block or when inter-prediction information of a neighbor block cannot be used, the inter-prediction information of the neighbor block cannot be used as a candidate.

The maximum number of candidates in each list may be predefined. When pieces of inter-prediction information of available neighbor blocks cannot fill the predefined maximum number of candidates in the list, zero-vector motion information may be added to the list.

As the correlation between the candidate in the list, that is, inter-prediction information, and the inter-prediction information of the target block is higher, encoding performance may be improved.

In contrast, for candidates having a low correlation with the inter-prediction information of the target block, for example, zero-vector motion information, the number of bits to be signaled may be increased upon deriving inter-prediction information. As the number of bits that are signaled is increased, encoding performance may be deteriorated.

In an embodiment, for a target block having no inter-prediction information, the encoding apparatus 1200 and the decoding apparatus 1300 may generate inter-prediction information for the target block using the inter-prediction information of a neighbor block, and may add the generated inter-prediction information as a candidate to the corresponding list.

In an embodiment, inter-prediction information having a high correlation, rather than inter-prediction information having a low correlation, may be added as a candidate to the list. As the inter-prediction information having a high correlation is added as the candidate to the list, encoding efficiency may be increased.

In an embodiment, each of the encoding apparatus 1200 and the decoding apparatus 1300 may configure a list for the target block using multiple pieces of inter-prediction information of multiple neighbor blocks. The multiple neighbor blocks may include temporal neighbor blocks and spatial neighbor blocks. Each of the encoding apparatus 1200 and the decoding apparatus 1300 may add inter-prediction information having a higher correlation with the inter-prediction information of the target block to the list using the multiple pieces of inter-prediction information of the multiple neighbor blocks. By the use and addition of inter-prediction information, the number of bits for an index or the like indicating inter-prediction information may be decreased, and encoding performance may be improved.

In an embodiment, when there is no inter-prediction information of the target block, each of the encoding apparatus 1200 and the decoding apparatus 1300 may generate inter-prediction information of the target block by combining pieces of inter-prediction information of the neighbor blocks of the target block. Each of the encoding apparatus 1200 and the decoding apparatus 1300 may add the generated inter-prediction information as a candidate to the list. Instead of inter-prediction information having a low correlation with the inter-prediction information of the target block, for example, zero-vector motion information, inter-prediction information having a high correlation with the inter-prediction information of the target block is added as a candidate to the list, thus enabling more efficient encoding to be performed in the derivation of inter-prediction information.

During a procedure for recursively splitting a CU, the CU may be split into four square blocks of the same size or two blocks of the same size. When the CU is split into two partition blocks, the CU may be horizontally or vertically split. Alternatively, the CU may be split into three partition blocks, and may be horizontally or vertically split. For example, when the CU is vertically split, the ratio of the widths of partition blocks generated from splitting may be 1:2:1. Similarly, when the CU is horizontally split, the ratio of the heights of the partition blocks may be 1:2:1.

Splitting of a block in inter prediction may represent that the encoding efficiency that is obtained when inter prediction is performed using pieces of motion information of respective partition blocks generated from splitting is higher than the encoding efficiency that is obtained when inter prediction is performed using one piece of motion information of an unsplit block. In other words, when a block is split, there is a strong possibility that two or four partition blocks will have different pieces of motion information.

When the target block is a block split from an upper block, the motion information of another partition block in the upper block may be used when motion information of a spatial neighbor block in a merge mode is derived for the target block. In other words, the motion information of the target block may be derived in the same manner as the motion information of the other partition block. In this case, (even if partition blocks are generated by splitting from the upper block) two partition blocks have the same motion information, and thus encoding performance may be decreased.

Each of the encoding apparatus 1200 and the decoding apparatus 1300 may assign a smaller number of bits to a candidate having higher priority, among the candidates in the list. The assigned bits may be the value of an index indicating the corresponding candidate. In other words, an index indicating a candidate having higher priority may be signaled using a smaller number of bits than that of an index indicating a candidate having lower priority.

Each of the encoding apparatus 1200 and the decoding apparatus 1300 may be configured to assign higher priority to a candidate expected or estimated to have higher encoding performance upon configuring the list.

Here, the assignment of higher priority may mean that 1) a smaller number of bits are assigned, 2) a smaller index is allocated, or 3) a candidate is included in the list with higher priority to precede other candidates in the list.

Also, each of the encoding apparatus 1200 and the decoding apparatus 1300 may be configured to assign lower priority to a candidate expected or estimated to have lower encoding performance upon configuring the list.

Here, the assignment of lower priority may mean that 1) a larger number of bits are assigned, 2) a larger index is allocated, 3) a candidate is included in the list with lower priority to follow other candidates in the list, or 4) a candidate is not included in the list. By means of such list configuration, encoding performance may be improved.

When a list is configured using the motion information of a spatial neighbor block for a partition CU, each of the encoding apparatus 1200 and the decoding apparatus 1300 may include the motion information of the spatial neighbor block in the list with lower priority if the spatial neighbor block is a block split from an upper CU including the partition CU. Alternatively, the encoding apparatus 1200 may not include the motion information of the spatial neighbor block in the list if the spatial neighbor block is a block split from the upper CU including the partition CU.

In other words, each of the encoding apparatus 1200 and the decoding apparatus 1300 may not include motion information that is highly likely to have low encoding performance in the list, and may assign lower priority to motion information that is highly likely to have low encoding performance. By means of such exclusion and assignment, each of the encoding apparatus 1200 and the decoding apparatus 1300 prevents motion information expected or estimated to have low encoding performance from being selected or decreases the possibility of such motion information being selected, thus improving encoding performance.

Figure 14:
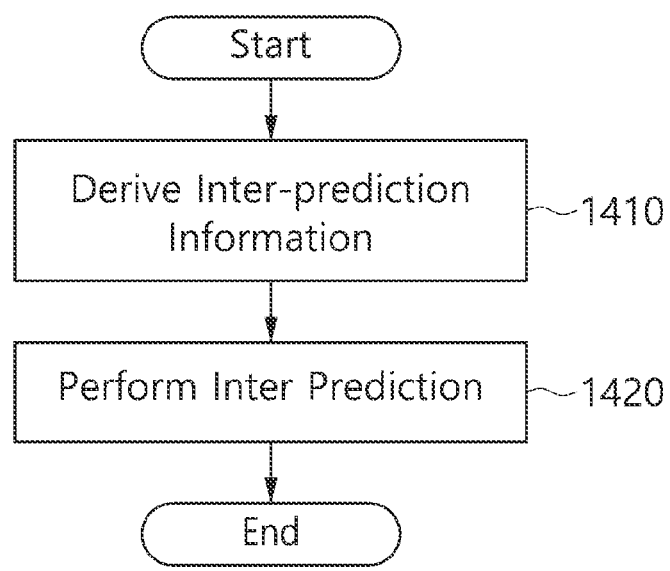
FIG. 14 is a flowchart illustrating an inter-prediction method according to an embodiment.

FIG. 14 is a flowchart of an inter-prediction method according to an embodiment.

The inter-prediction method may be performed by the encoding apparatus 1200 and/or the decoding apparatus 1300.

For example, the encoding apparatus 1200 may perform the inter-prediction method according to the embodiment so as to compare the efficiencies of multiple prediction methods for a target block, and may perform the inter-prediction method according to the embodiment so as to generate a reconstructed block for the target block.

The target block may be any one of the above-described various blocks. For example, the target block may be a Coding Unit (CU), a Prediction Unit (PU) or a Transform Unit (TU).

For example, the decoding apparatus 1300 may perform the inter-prediction method according to the embodiment so as to generate a reconstructed block for the target block.

Below, a processing unit may be the processing unit 1210 of the encoding apparatus 1200 and/or the processing unit 1310 of the decoding apparatus 1300.

At step 1410, the processing unit may derive inter-prediction information for the target block.

The inter-prediction information may include 1) a motion vector, 2) a reference picture list, 3) a reference picture index, 4) a merge flag, 5) a merge index, 6) an Advanced Motion Vector Prediction (AMVP) index, 7) an illumination compensation (IC) flag, and 8) an Overlapped Block Motion Compensation (OBMC) flag.

The IC flag may be a flag indicating whether IC is to be applied.

The OBMC flag may be a flag indicating whether OBMC is to be applied.

The processing unit may derive inter-prediction information using at least one method.

The at least one method may include 1) a merge mode, 2) an AMVP mode, 3) a method for deriving inter-prediction information on a sub-block basis, and 4) a method for deriving inter-prediction information in the decoding apparatus 1300.

The processing unit may derive inter-prediction information using at least one piece of information.

The at least one piece of information may include 1) inter-prediction information of a spatial neighbor block, 2) inter-prediction information of a temporal neighbor block, 3) combined inter-prediction information, 4) a uniform candidate list, 5) an adaptive candidate list depending on a block shape, and 6) an adaptive candidate list depending on a block-splitting state.

At step 1420, the processing unit may perform inter prediction for the target block using the derived inter-prediction information.

Inter prediction may include motion compensation and/or motion correction.

The processing unit may perform inter prediction using at least one of compensation and/or correction.

The at least one of compensation and/or correction may include 1) motion compensation, 2) IC, 3) OBMC, 4) Bidirectional Optical flow (BIO), 5) affine space motion compensation, and 6) motion vector correction in the decoding apparatus 1300.

Derivation of Inter-Prediction Information Using Merge Mode

The processing unit may derive inter-prediction information using a merge mode. In an embodiment, the merge mode may be replaced with an AMVP mode or a specific inter-prediction mode that uses a list or the like. In other words, the derivation of inter-prediction information using the merge mode, described in the embodiment, may also be applied to the derivation of inter-prediction information that uses the AMVP mode or the specific inter-prediction mode.

The processing unit may configure a merge candidate list. The number of merge candidates in the merge candidate list may be N. N may be a positive integer. For example, a merge candidate may be inter-prediction information, and may include a motion vector and a reference picture list.

The processing unit may configure the merge candidate list using one or more of inter-prediction information of a spatial neighbor block, inter-prediction information of a temporal neighbor block, and combined inter-prediction information. Here, the processing unit may add the pieces of inter-prediction information to the merge candidate list in a specific sequence.

The processing unit may add the pieces of inter-prediction information of neighbor blocks as merge candidates to the merge candidate list when the merge candidate list is configured. Here, the processing unit may add the pieces of inter-prediction information of neighbor blocks to the merge candidate list in the specific sequence of the neighbor blocks. The processing unit may not add the inter-prediction information of a neighbor block to the merge candidate list 1) when inter-prediction information of the neighbor block is not present or 2) when inter-prediction information of the neighbor block is identical to inter-prediction information present in the merge candidate list (i.e., when the inter-prediction information of the neighbor block is already included in the merge candidate list). In other words, when pieces of inter-prediction information of two neighbor blocks are identical to each other, inter-prediction information of the neighbor block having the lower priority may not be added to the merge candidate list.

When inter-prediction information of one of neighbor blocks is not added to the merge candidate list, the processing unit may add combined inter-prediction information, instead of the inter-prediction information that is not added, to the merge candidate list. For example, when inter-prediction information of a specific neighbor block is not present or when the inter-prediction information of the specific neighbor block is identical to inter-prediction information in the merge candidate list, the processing unit may derive combined inter-prediction information for the specific neighbor block, and may add the derived combined inter-prediction information to the merge candidate list.

The processing unit may generate combined inter-prediction information by combining two or more of pieces of inter-prediction information for neighbor blocks of the target block with each other.

The processing unit may configure an inter-prediction information palette. The inter-prediction information palette may be a list having N pieces of inter-prediction information. N may be a positive integer. Here, the processing unit may 1) add the inter-prediction mode of a target block to the inter-prediction information palette and 2) manage the inter-prediction mode in the inter-prediction information palette depending on the specific sequence and method. For example, when the inter-prediction information palette is filled up with information, the processing unit may manage the inter-prediction information palette in a First-In First-Out (FIFO) manner.

When the inter-prediction information of the target block is identical to inter-prediction information present in the inter-prediction information palette (that is, when the inter-prediction information of the target block is already included in the inter-prediction information palette), the processing unit may not add the inter-prediction information of the target block to the inter-prediction information palette.

When the inter-prediction information of the target block is identical to inter-prediction information present in the inter-prediction information palette, the processing unit may move the inter-prediction information of the inter-prediction information palette, which is identical to the inter-prediction information of the target block, to the location of first inter-prediction information in the inter-prediction information palette. In other words, the processing unit may assign a specific priority, such as the highest priority, to the inter-prediction information of the inter-prediction information palette, which is identical to the inter-prediction information of the target block, and may adjust the locations of pieces of inter-prediction information present in the inter-prediction information palette based on the assigned priorities.

The processing unit may initialize the inter-prediction information palettes for all blocks in a target picture to the unit of each picture. In other words, the blocks in the target picture may share a single inter-prediction information palette with each other.

The processing unit may use inter-prediction information present in the inter-prediction information palette as inter-prediction information of a temporal neighbor block.

Figure 15:
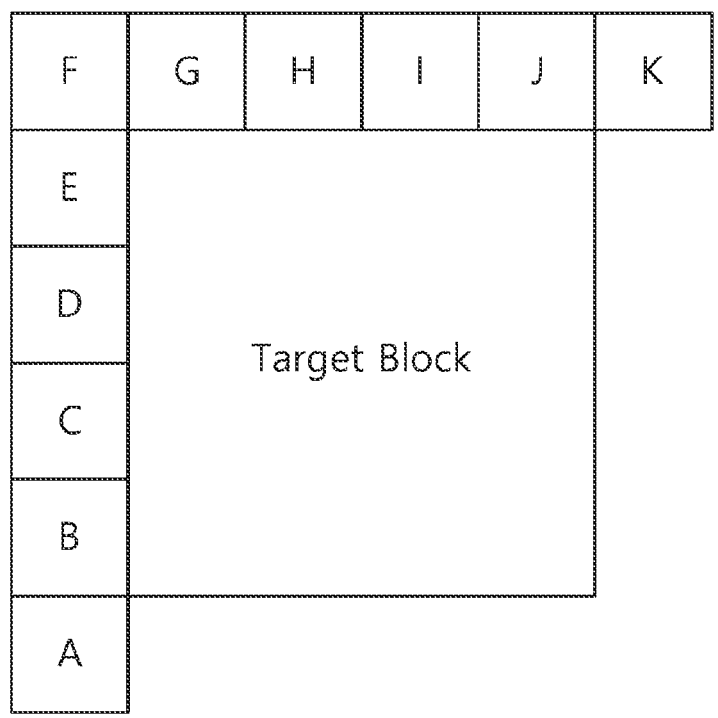
FIG. 15 illustrates spatial neighbor blocks of a target block according to an example.

FIG. 15 illustrates spatial neighbor blocks of a target block according to an example.

In FIG. 15, A to K may indicate respective spatial neighbor blocks.

The inter-prediction information of a spatial neighbor block may be inter-prediction information of a block present at any one of locations corresponding to A to K of FIG. 15.

Hereinafter, the term "inter-prediction information of block X" may be understood to be "inter-prediction information corresponding to the location of X".

For example, the size of the neighbor block may be M×N. M and N may each be at least one of 2, 4, 8, 16, 32, 64, and 128.

Left neighbor blocks may be neighbor blocks adjacent to the left of the target block, and may be one or more of block A, block B, block C, block D, and block E.

Above neighbor blocks may be neighbor blocks adjacent to the top of the target block, and may be one or more of block G, block H, block I, block J, and block K.

An above-left neighbor block may be a neighbor block that is adjacent to an above-left corner of the target block, and may be block F.

Such a spatial neighbor block may be a block that is adjacent to the boundary of the target block or that is not adjacent thereto.

Figure 16:
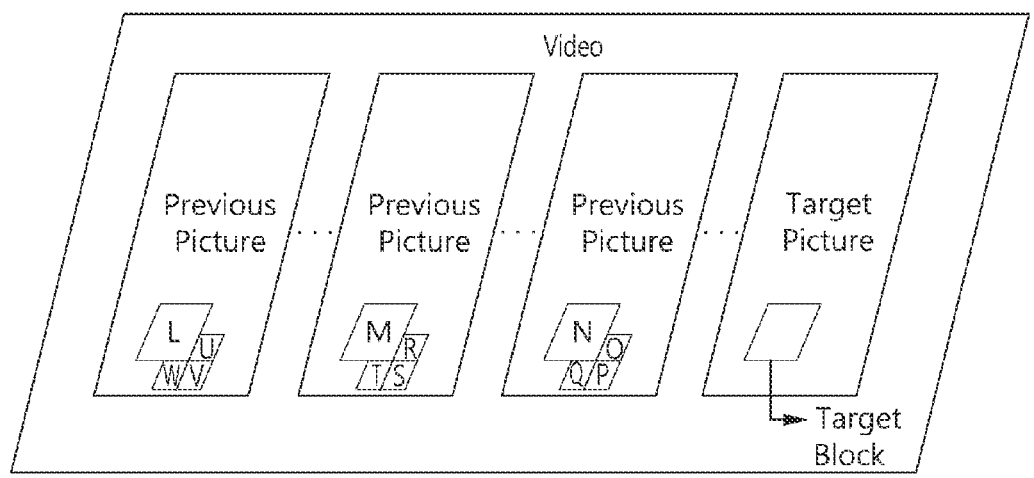
FIG. 16 illustrates temporal neighbor blocks of a target block according to an example.

FIG. 16 illustrates temporal neighbor blocks of a target block according to an example.

In FIG. 16, L to W may denote respective temporal neighbor blocks.

The temporal neighbor blocks may be blocks in a previous picture. The previous picture may be a previously reconstructed col picture. The previous picture may be a picture on which encoding or decoding has been performed before the target picture is encoded or decoded.

The previous picture may be a picture having a Picture Order Count (POC) larger than that of the target picture.

The location of a temporal neighbor block in the previous picture may be identical to that of a target block in the target picture. Alternatively, the location of the temporal neighbor block in the previous picture may correspond to that of the target block in the target picture. Alternatively, the location of the temporal neighbor block in the previous picture may correspond to at least one of the location of a below-right portion of the target block, a central portion of the target block, and a specific location of the target block.

Alternatively, the temporal neighbor block may be a block adjacent to a col block. For example, the temporal neighbor block may be a block adjacent to a below-right vertex of the col block.

Alternatively, the temporal neighbor block may be a temporally previous block in the target picture. The temporally previous block may be a block on which encoding or decoding has been performed before the target block is encoded or decoded.

The temporal neighbor block may be a specific neighbor block that is referred to in a procedure for configuring a merge candidate list. Here, the specific neighbor block may be a neighbor block corresponding to inter-prediction information included in the merge candidate list.

The inter-prediction information of the temporal neighbor block may be inter-prediction information of a block disposed at a specific location in the previous picture. Here, the specific location may be the location of the target block in the target picture.

The inter-prediction information of the temporal neighbor block may be inter-prediction information of a block disposed at a specific location in the target picture. Here, the specific location may be the location of a spatial neighbor block of the target block in the target picture.

Figure 17:
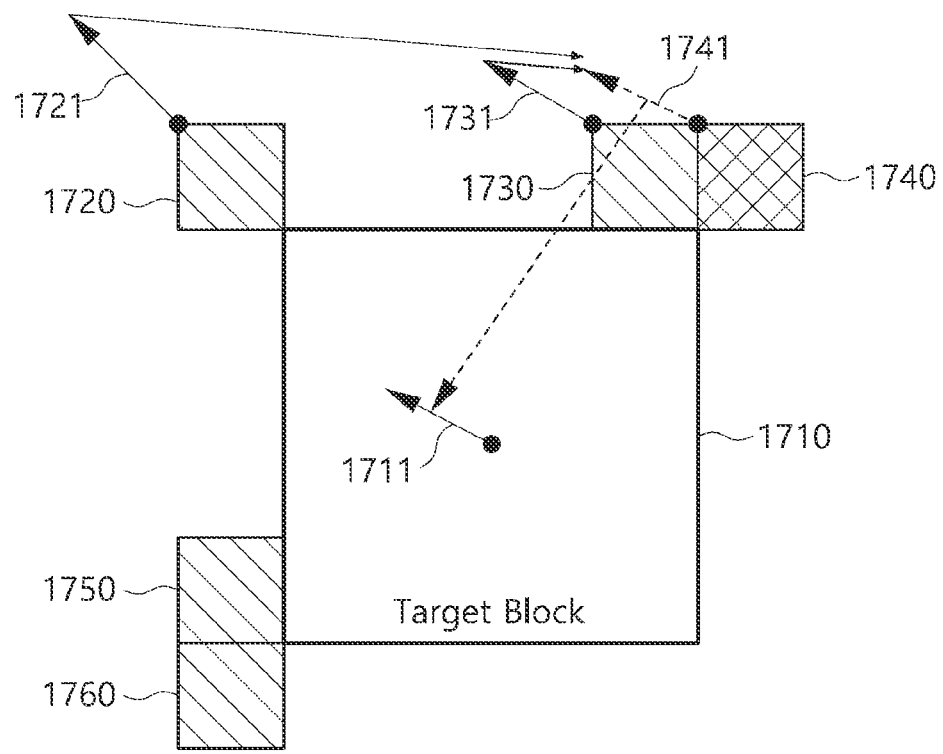
FIG. 17 illustrates the generation of combined inter-prediction information of an above-right neighbor block according to an example.

Configuration of Merge Candidate List Using Combined Inter-Prediction Information FIG. 17 illustrates the generation of combined inter-prediction information of an above-right neighbor block according to an example.

Figure 18:
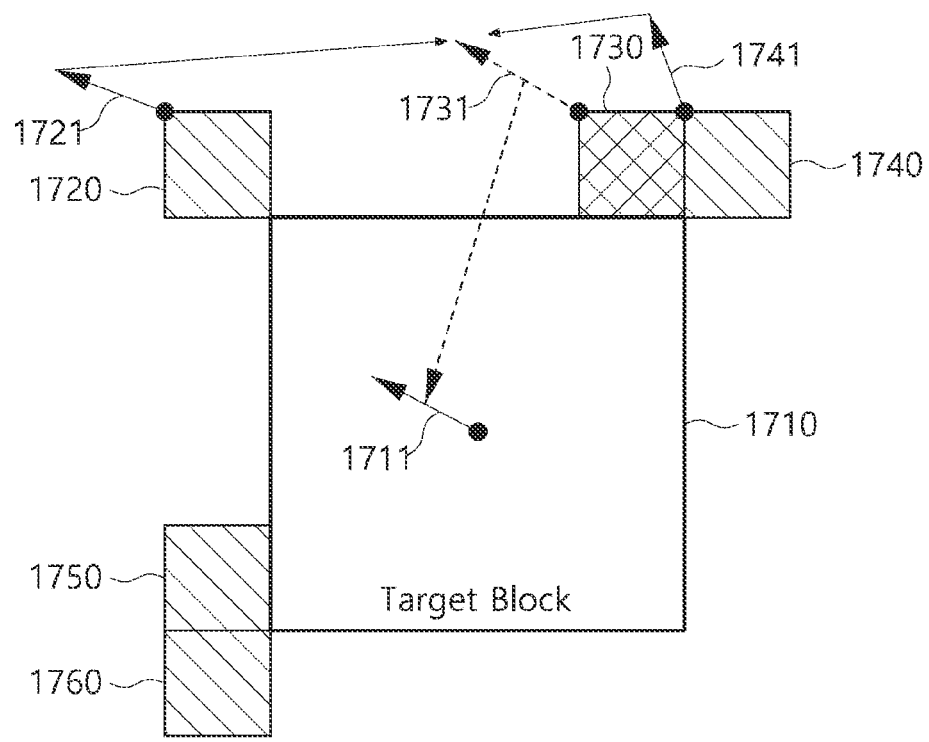
FIG. 18 illustrates the generation of combined inter-prediction information of an above neighbor block according to an example.

FIG. 18 illustrates the generation of combined inter-prediction information of an above neighbor block according to an example.

The processing unit may configure a merge candidate list using combined inter-prediction information. The combined inter-prediction information may replace the inter-prediction information or motion information of a neighbor block, and may then be added, as a new merge candidate, to the merge candidate list.

The processing unit may generate combined inter-prediction information by combining multiple pieces of inter-prediction information related to the target block. For example, the inter-prediction information related to the target block may be inter-prediction information for a neighbor block of the target block. The inter-prediction information related to the target block may be neighbor inter-prediction information. The neighbor inter-prediction information may be the inter-prediction information of a neighbor block.

The combined inter-prediction information may contain motion information. The motion information of the combined inter-prediction information may contain at least one of a reference picture list, a reference picture index, an inter-prediction indicator, a motion vector, a motion vector candidate, a motion vector candidate list, and a Picture Order Count (POC).

In an embodiment, the term "inter-prediction information" may be replaced with "motion information" and "motion vector", and "combined inter-prediction information" may be replaced with "combined motion information" and "combined motion vector".

The processing unit may select neighbor inter-prediction information to be used from among multiple pieces of neighbor inter-prediction information when generating partial information of the combined inter-prediction information.

For example, the processing unit may use partial information of the selected neighbor inter-prediction information as the partial information of the combined inter-prediction information. In other words, the processing unit may assign the value of the partial information of the selected neighbor inter-prediction information to the partial information of the combined inter-prediction information.

For example, the partial information may be either an IC flag or an OBMC flag.

For example, the processing unit may generate partial information of the combined inter-prediction information using neighbor inter-prediction information selected in relation to the combination of motion vectors from among multiple pieces of neighbor inter-prediction information.

For example, the processing unit may generate partial information of the combined inter-prediction information using neighbor inter-prediction information that is a reference of scaling for a combination of motion vectors from among multiple pieces of neighbor inter-prediction information.

For example, referring to FIG. 15, when combined inter-prediction information for block F is generated using pieces of inter-prediction information of block B and block J, an IC flag and/or an OBMC flag of block B or block J may be used as the IC flag and/or OBMC flag of block F.

The processing unit may generate the motion vector of combined inter-prediction information by combining the motion vectors of the pieces of neighbor motion information. The neighbor motion information may be the motion information of a neighbor block. Also, a neighbor motion vector may be the motion vector of a neighbor block.

For example, the neighbor motion information may be the motion information of blocks, such as spatial neighbor blocks A to K illustrated in FIG. 15 and the temporal neighbor blocks L to W illustrated in FIG. 16.

The neighbor motion information may be the motion information of each block that is not adjacent to the target block. The block that is not adjacent to the target block may be a block adjacent to the neighbor block of the target block.

The neighbor motion information may be the motion information of the block having the above-described specific relationship with the target block, and the block having the specific relationship may also be a block that is not adjacent to the target block. For example, the block having the specific relationship may be a block that is adjacent to the neighbor block of the target block. The neighbor block may be interposed between the block having the specific relationship and the target block.

The combined inter-prediction information may be the result obtained by selecting one from among pieces of motion information of the multiple neighbor blocks. Here, one of the pieces of motion information may be selected as the combined inter-prediction information according to a specified condition. For example, the combined inter-prediction information may be the result of calculation, selection, combination, and transformation that use the pieces of motion information of multiple neighbor blocks.

For example, the combined inter-prediction information may be the motion information of a neighbor block for which the difference between the POC of the target picture and the POC of a reference picture for the neighbor block is the smallest.

For example, the combined inter-prediction information may be specific motion information present in a merge candidate list.

The combined inter-prediction information may be the result obtained by selecting and combining one or more from among multiple pieces of neighbor motion information. Here, the combined inter-prediction information may be selected according to the specified condition.

For example, the motion vector of the combined inter-prediction information may be the motion vector of a specific neighbor block among multiple neighbor blocks. Here, the specific neighbor block may be a neighbor block for which the difference between the POC of the target picture and the POC of the reference picture for the neighbor block is the smallest, among the multiple neighbor blocks. The motion vector of the combined inter-prediction information may be the result of a formula that uses multiple neighbor motion vectors. The neighbor motion vector may be the motion vector of a neighbor block. The neighbor motion vector of the neighbor block may include multiple motion vectors.

When the combined inter-prediction information is generated, the processing unit may generate unidirectional combined inter-prediction information or bidirectional combined inter-prediction information. Here, the unidirectional combined inter-prediction information may be forward (L0) inter-prediction information or backward (L1) inter-prediction information, and the bidirectional combined inter-prediction information may be forward and backward inter-prediction information.

The unidirectional combined inter-prediction information may be the combination of 1) pieces of bidirectional inter-prediction information of the neighbor block, 2) pieces of unidirectional prediction information of the neighbor block, and 3) pieces of L0 or L1 inter-prediction information in pieces of combined inter-prediction information.

For example, the processing unit may generate L0 (L1) directional inter-prediction information by combining two or more temporal neighbor blocks, and may add the generated unidirectional prediction information to the merge candidate list.

For example, the combined inter-prediction information may be the result of the combination of pieces of L0 (L1) directional inter-prediction information of two previous blocks and L0 (L1) directional inter-prediction information of one temporal neighbor block, and may then be added to the merge candidate list.

For example, the combined inter-prediction information may be the result of the combination of pieces of L0 (L1) directional inter-prediction information of two specific neighbor blocks referred to in a merge candidate list configuration procedure, and may be added to the merge candidate list.

The bidirectional combined inter-prediction information may be a combination of the above-described forward inter-prediction information and backward inter-prediction information.

The motion vector of the combined inter-prediction information may be the combination of neighbor motion vectors. For example, the neighbor motion information may be the combination of pieces of motion information of multiple neighbor blocks A to W. For example, the motion vector of the combined inter-prediction information may be the average value, maximum value, minimum value or median value of the multiple neighbor motion vectors, and may be the combination of one or more of the average value, maximum value, minimum value, and median value.

The average value may be obtained by dividing the sum of combined motion vectors by the number of combined motion vectors. For example, the average value of motion vector (4, 6) and motion vector (6, 10) may be (5, 8).

For example, the motion vector of the combined inter-prediction information may be a weighted average of multiple neighbor motion vectors, or may be a combination that uses variation between the multiple neighbor motion vectors.

For example, as illustrated in FIG. 17, for a target block 1710, there may be an above-left neighbor block 1720, an above neighbor block 1730, an above-right neighbor block 1740, a left neighbor block 1750, and a below-left neighbor block 1760. By the combination of the motion information 1721 of the above-left neighbor block 1720 and the motion information 1731 of the above neighbor block 1730, combined inter-prediction information corresponding to the motion information 1741 of the above-right block 1740 may be generated. Such combined inter-prediction information may be used as the motion information 1711 of the target block 1710.

For example, as illustrated in FIG. 18, by the combination of the motion information 1721 of the above-left neighbor block 1720 and the motion information 1741 of the above-right neighbor block 1740, combined inter-prediction information corresponding to the motion information 1731 of the above neighbor block 1730 may be generated. Such combined inter-prediction information may be used as the motion information 1711 of the target block 1710.

As described above, the motion vector of the combined inter-prediction information may be the result of a weighted combination of neighbor motion vectors. A higher weight may be allocated to the motion vector of a neighbor block having a higher correlation with the target block.

The motion vector of the combined inter-prediction information may be the result of a weighted combination of neighbor motion vectors based on a block size (i.e. weighted combination based on block size). The weighted combination based on block size may be represented by the following Equation 2:

$$\frac{MV_{Left} \times \text{width} + MV_{Above} \times \text{height}}{\text{width} + \text{height}} \quad \text{[Equation 2]}$$

$MV_{Left}$ may be the left neighbor motion vector of the target block. The left neighbor motion vector of the target block may be the motion vector of a neighbor block adjacent to the left of the target block.

"Width" may denote the width of the target block, and may be a weight for the left neighbor motion vector of the target block.

$MV_{Above}$ may be the above neighbor motion vector of the target block. The above neighbor motion vector of the target block may be the motion vector of a neighbor block adjacent to the top of the target block.

"Height" may denote the height of the target block, and may be a weight for the above neighbor motion vector of the target block.

The motion vector of the combined inter-prediction information may be the result of a weighted combination of neighbor motion vectors based on POC (i.e. weighted combination based on POC).

For example, as the POC of a reference picture for neighbor motion information is closer to the POC of the target picture, the weight for the neighbor motion vector may be greater.

The combination using variation may be the generation of inter-prediction information of a block previous to the combined blocks or a block subsequent to the combined blocks using the variation between two or more motion vectors.

For example, referring to FIG. 15, the processing unit may derive the motion vector of block K through a combination that uses variation between the motion vector of block I and the motion vector of block J. The motion vector of block K may be obtained by adding the difference between the motion vector of block J and the motion vector of block I to the motion vector of block J.

Alternatively, the motion vector of the combined inter-prediction information may be the result of an extrapolation-based combination of neighbor motion vectors.

For example, the extrapolation-based combination of two neighbor motion vectors may be represented by the following Equation 3:

$$2 \times MV_0 - MV_1 \qquad \text{[Equation 3]}$$

$MV_0$ may be a first neighbor motion vector. $MV_1$ may be a second neighbor motion vector.

Scaling may be applied to inter-prediction information that is used to generate combined inter-prediction information.

For example, when neighbor motion information indicates bidirectional prediction, the processing unit may scale the motion vector of L0 based on the motion vector of L1. The processing unit may generate combined inter-prediction information by combining the scaled motion vector of L0 with the motion vector of L1.

For example, when neighbor motion information indicates bidirectional prediction, the processing unit may scale the motion vector of L1 based on the motion vector of L0. The processing unit may generate combined inter-prediction information by combining the scaled motion vector of L1 with the motion vector of L0, and may add the generated combined inter-prediction information to the merge candidate list.

When reference pictures for multiple pieces of neighbor motion information that are used to generate combined inter-prediction information are different from each other, the processing unit may change inter-prediction information by applying scaling to the inter-prediction information.

For example, referring to FIG. 15, when neighbor blocks used for combination are block B and block J, and reference pictures for block B and block J are different from each other, the processing unit may scale the motion vector of block J depending on the temporal distance between the block B and the reference picture for the block B.

For example, referring to FIG. 15, when neighbor blocks used for combination are block B and block J, and reference pictures for block B and block J are different from each other, the processing unit may scale the motion vector of block B depending on the temporal distance between the block J and the reference picture of the block J.

In scaling, the processing unit may select neighbor motion information that is a reference for scaling.

The processing unit may select neighbor motion information that is a reference for scaling based on POC. The processing unit may select, as reference motion information, motion information for which the POC of a reference picture for motion information is closer to the POC of the target picture from among multiple pieces of neighbor motion information.

When the combined inter-prediction information is generated, the processing unit may determine whether to perform combination based on a specified condition.

When the combined inter-prediction information is generated, the processing unit may determine whether to perform combination based on similarity between pieces of inter-prediction information or pieces of motion information that are used for combination. For example, when similarity is less than a predefined threshold value, the processing unit may not perform combination. Alternatively, when similarity is greater than a predefined threshold value, the processing unit may not perform combination.

Here, the similarity may indicate the value or result of a formula that uses pieces of motion information.

The processing unit may generate combined inter-prediction information by combining pieces of neighbor motion information based on the directions of reference pictures for the neighbor motion information. For example, the processing unit may generate combined inter-prediction information by combining neighbor motion vectors in the same direction.

As described above, the processing unit may generate combined inter-prediction information by combining pieces of inter-prediction information of multiple blocks. Here, each of the multiple blocks may be a block that satisfies the specified condition.

In each block illustrated in FIG. 15, inter-prediction information of a specific block may be replaced with combined inter-prediction information. The processing unit may derive first inter-prediction information for the location to the left of a specific block and derive second inter-prediction information for the location to the right of the specific block, and may generate combined inter-prediction information by combining the first inter-prediction information with the second inter-prediction information. The generated combined inter-prediction information may replace the inter-prediction information of the specific block. Here, the inter-prediction information for the location to the left of the specific block may be inter-prediction information of a block located to the left of the specific block. Here, the inter-prediction information for the location to the right of the specific block may be inter-prediction information of a block located to the right of the specific block. Further, such derivation, combination, and generation may also be applied to a portion of inter-prediction information, such as motion information and motion vectors.

For example, when the first inter-prediction information for the left location is derived, if the inter-prediction information of only one block located to the left of the specific block is available, the processing unit may use the available inter-prediction information for combination.

For example, when the second inter-prediction information for the right location is derived, if the inter-prediction information of only one block located to the right of the specific block is available, the processing unit may use the available inter-prediction information for combination.

For example, when multiple pieces of inter-prediction information of multiple blocks located to the left of the specific block are available, the processing unit may derive first inter-prediction information by combining the available multiple pieces of inter-prediction information.

For example, when multiple pieces of inter-prediction information located to the right of the specific block are available, the processing unit may derive second inter-prediction information by combining the available multiple pieces of inter-prediction information.

For example, when the first inter-prediction information for the left location is derived, if multiple pieces of inter-prediction information of multiple blocks located to the left of the specific block are available, the processing unit may select, as the first inter-prediction information, specific inter-prediction information from among the multiple pieces of inter-prediction information, and may use the selected inter-prediction information for the generation of combined inter-prediction information.

For example, if multiple pieces of inter-prediction information of multiple blocks located to the left of the specific block are available, the processing unit may select the block having the shortest temporal distance from the target picture from among the multiple blocks. The processing unit may select the inter-prediction information of the selected block as the first inter-prediction information. The temporal distance between pictures may be the difference between the sequential positions at which the pictures are displayed.

For example, when the second inter-prediction information for the right location is derived, if multiple pieces of inter-prediction information of multiple blocks located to the right of the specific block are available, the processing unit may select, as the second inter-prediction information, specific inter-prediction information from among the multiple pieces of inter-prediction information, and may use the selected inter-prediction information for the generation of combined inter-prediction information.

For example, if multiple pieces of inter-prediction information of multiple blocks located to the right of the specific block are available, the processing unit may select the block having the shortest temporal distance from the target picture from among the multiple blocks. The processing unit may select the inter-prediction information of the selected block as the second inter-prediction information.

For example, in the individual blocks illustrated in FIG. 15, when multiple pieces of inter-prediction information of multiple blocks located to the left of the specific block are available, the processing unit may generate combined inter-prediction information by combining the multiple pieces of inter-prediction information. The generated combined inter-prediction information may replace the inter-prediction information of the specific block. Further, when multiple pieces of inter-prediction information of multiple blocks located to the right of the specific block are available, the processing unit may generate combined inter-prediction information by combining the multiple pieces of inter-prediction information.

For example, in a specific block among block N, block O, block P, and block Q of FIG. 16, when pieces of inter-prediction information of multiple co-located blocks in different multiple previous pictures are available, the processing unit may generate combined inter-prediction information by combining the pieces of available inter-prediction information. The generated combined inter-prediction information may replace the inter-prediction information of the specific block. Such a co-located block may be a col block for the specific block. In other words, the locations of the co-located blocks in different previous pictures may be identical to those of the specific block in the previous pictures.

For example, combined inter-prediction information for block N may be the combination of pieces of inter-prediction information for the co-located blocks L and M. For example, combined inter-prediction information for block O may be the combination of pieces of inter-prediction information for the co-located blocks U and R. For example, combined inter-prediction information for block P may be the combination of pieces of inter-prediction information for the co-located blocks V and S. For example, combined inter-prediction information for block Q may be the combination of pieces of inter-prediction information for the co-located blocks W and T.

For example, the processing unit may generate combined inter-prediction information by combining one or more pieces of inter-prediction information of one or more spatial neighbor blocks with one or more pieces of inter-prediction information of one or more temporal neighbor blocks.

Figure 19:
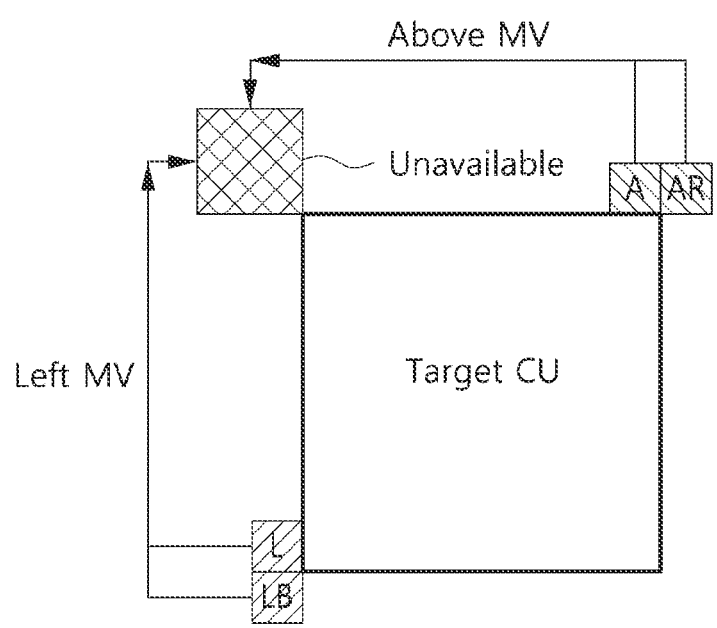
FIG. 19 illustrates the generation of combined inter-prediction information of a neighbor block according to an example.

FIG. 19 illustrates the generation of combined inter-prediction information of neighbor blocks according to an example.

In FIG. 19, a target CU may indicate a target block.

In FIG. 19, block AL, block A, block AR, block L, and block LB may be the above-left neighbor block, above neighbor block, above-right neighbor block, left neighbor block, and below-left neighbor block of a target block, respectively.

The above neighbor block may refer to a rightmost (or leftmost) block, among multiple neighbor blocks above the target block. The left neighbor block may refer to a lowermost (or uppermost) block, among multiple neighbor blocks to the left of the target block.

The block A and the block AR may be understood to be multiple blocks that are adjacent to the top of the target block or are located above the target block. The block L and the block LB may be understood to be multiple blocks that are adjacent to the left of the target block or are located to the left of the target block.

The processing unit may generate first neighbor inter-prediction information by combining the pieces of inter-prediction information of the block A and the block AR, wherein the pieces of inter-prediction information may be understood to be above inter-prediction information or above motion vectors. The processing unit may generate second neighbor inter-prediction information by combining pieces of inter-prediction information of the block L and the block LB. These pieces of inter-prediction information may be understood to be left inter-prediction information or left motion vectors. The processing unit may generate combined inter-prediction information by combining the first neighbor inter-prediction information with the second neighbor inter-prediction information.

When the inter-prediction information of the block AL is not available, the processing unit may replace the inter-prediction information of the block AL with the generated combined inter-prediction information. Alternatively, the processing unit may add the combined inter-prediction information generated for the block AL as a new merge candidate to a merge candidate list.

When the above-described first neighbor inter-prediction information, second neighbor inter-prediction information, and combined inter-prediction information are acquired, the foregoing combination methods and combination methods that will be described below may be used.

When only one of pieces of inter-prediction information of the block A and the block AR is available, the processing unit may use available inter-prediction information, among the pieces of inter-prediction information, as the first neighbor inter-prediction information. Further, when only one of pieces of inter-prediction information of the block L and the block LB is available, the processing unit may use the available inter-prediction information, among the pieces of inter-prediction information, as the second neighbor inter-prediction information.

The processing unit may select any one of the pieces of inter-prediction information of the block A and the block AR, and may use the selected inter-prediction information as the first neighbor inter-prediction information. The processing unit may select any one of the pieces of inter-prediction information of the block L and the block LB, and may use the selected inter-prediction information as the second neighbor inter-prediction information.

The processing unit may select inter-prediction information having a POC closer to the POC of the target picture, among pieces of inter-prediction information of the block A and the block AR, as the first neighbor inter-prediction information. Here, the POC of the inter-prediction information may be a POC for the motion information of the inter-prediction information.

The processing unit may select inter-prediction information having a POC closer to the POC of the target picture, among pieces of inter-prediction information of the block L and the block LB, as the second neighbor inter-prediction information.

Figure 20:
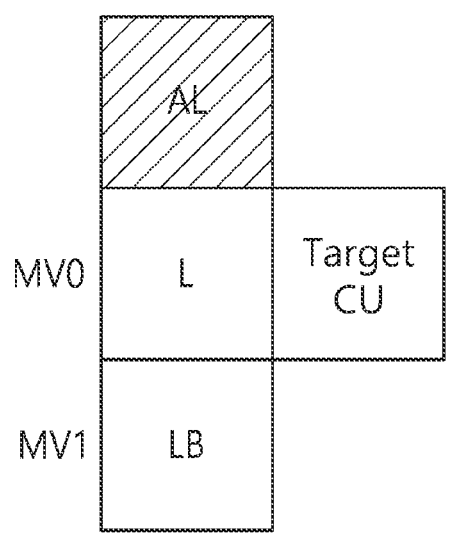
FIG. 20 illustrates the generation of inter-prediction information of block AL according to an example.

FIG. 20 illustrates the generation of inter-prediction information of block AL according to an example.

MV0 and MV1 may refer to respective motion vectors used for combined inter-prediction information.

The processing unit may generate combined inter-prediction information by combining pieces of inter-prediction information of block L and block LB. The combined inter-prediction information may replace the inter-prediction information of the block AL, and may be added as a merge candidate to a merge candidate list for a target block.

Figure 21:
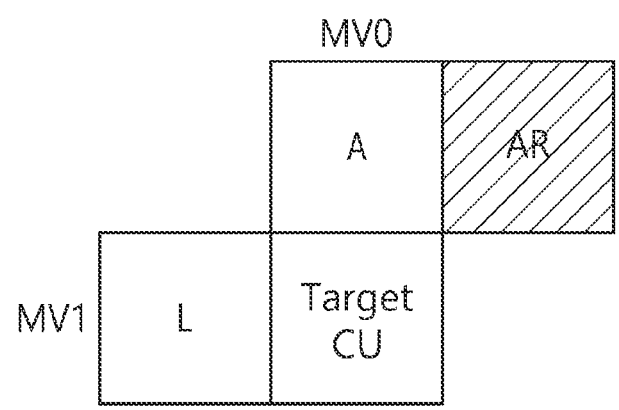
FIG. 21 illustrates the generation of inter-prediction information of block AR according to an example.

FIG. 21 illustrates the generation of inter-prediction information of block AR according to an example.

The processing unit may generate combined inter-prediction information by combining pieces of inter-prediction information of block A and block L. The combined inter-prediction information may replace the inter-prediction information of the block AR, and may be added as a merge candidate to a merge candidate list for a target block. For example, the foregoing combination may be extrapolation-based combination.

Figure 22:
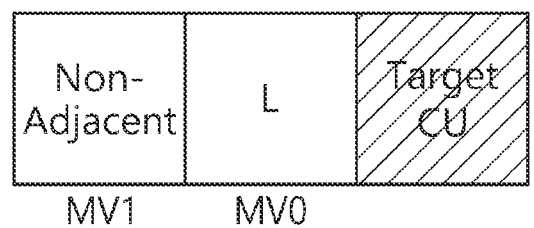
FIG. 22 illustrates the generation of inter-prediction information of a target CU according to an example.

FIG. 22 illustrates the generation of inter-prediction information of a target CU according to an example.

The processing unit may generate combined inter-prediction information by combining pieces of inter-prediction information of block L and a non-adjacent block. The combined inter-prediction information may be added as a merge candidate to a merge candidate list for a target block. For example, the foregoing combination may be extrapolation-based combination.

Generation of Combined Inter-Prediction Information Using Inter-Prediction Information in Merge Candidate List The processing unit may generate combined inter-prediction information by combining M pieces of inter-prediction information in a merge candidate list, and may use the generated combined inter-prediction information for inter prediction, or may add the generated combined inter-prediction information to the merge candidate list.

Here, the directions of motion vectors of multiple pieces of inter-prediction information that are combined may be identical to each other.

Here, M may be an integer of 2 or more, and may be less than or equal to the number of pieces of inter-prediction information in the merge candidate list.

For example, combinations that can be used when three pieces of inter-prediction information are present in the merge candidate list and the value of M is 2 may be (first inter-prediction information, second inter-prediction information), (first inter-prediction information, third inter-prediction information), and (second inter-prediction information, third inter-prediction information), and the processing unit may generate combined inter-prediction information by combining the pieces of inter-prediction information depending on these combinations.

For example, a combination that can be used when four pieces of inter-prediction information are present in the merge candidate list and the value of M is 4 may be (first inter-prediction information, second inter-prediction information, third inter-prediction information, and fourth inter-prediction information), and the processing unit may generate combined inter-prediction information by combining the pieces of inter-prediction information depending on the combination.

Configuration of Merge Candidate List

As described above, the processing unit may add pieces of inter-prediction information of neighbor blocks as merge candidates to a merge candidate list when the merge candidate list is configured. Here, the processing unit may add the pieces of inter-prediction information of neighbor blocks to the merge candidate list in the specific sequence of the neighbor blocks.

Referring back to FIG. 15, the processing unit may use pieces of inter-prediction information of specific spatial neighbor blocks as merge candidates when configuring a merge candidate list. The specific spatial neighbor blocks may be block A, block B, block F, block J, and block K.

The processing unit may add 1) combined inter-prediction information, 2) a sub-block-based motion information derivation mode (e.g. Alternative Temporal Motion Vector Prediction (ATMVP) mode, a Spatial-Temporal Motion Vector Prediction (STMVP) mode, etc.), and 3) an affine space motion information derivation mode to the merge candidate list in a specific sequence.

For example, the processing unit may configure the merge candidate list in the sequence of (B, J, K, A, ATMVP, F, combined inter-prediction information).

For example, the processing unit may configure the merge candidate list in the sequence of (B, J, K, A, first combined inter-prediction information, ATMVP, F, second combined inter-prediction information). Here, the first combined inter-prediction information and the second combined inter-prediction information may be different from each other in neighbor blocks to be referred to for the generation thereof, the number of neighbor blocks, and the directionality of combined inter-prediction information.

Below, "(α, β, γ, δ, ε)" may indicate the sequence of blocks, and may represent that the block of a symbol appearing earlier in the parentheses is processed earlier than the block of a symbol appearing later. The expression that a merge candidate list is configured in the sequence of "(α, β, γ, δ, ε)" may mean that, in the configuration of the merge candidate list, the task for configuring the merge candidate list is performed in the sequence of block α, block β, block γ, block δ, and block ε, and may also mean that the blocks are processed in the sequence of the listed blocks.

Here, the processing unit may perform the following tasks 1) to 5) on each of the blocks in the sequence of the blocks.

1) The processing unit may determine whether to add the inter-prediction information of the corresponding block to the merge candidate list.

2) If it is determined to add the inter-prediction information of the block to the merge candidate list, the processing unit may add the inter-prediction information of the block to the merge candidate list.

3) (If it is determined not to add the inter-prediction information of the block to the merge candidate list), the processing unit may determine whether to derive combined inter-prediction information for the corresponding block.

4) If it determined to derive combined inter-prediction information, the processing unit may derive the combined inter-prediction information.

5) The processing unit may determine whether to add the combined inter-prediction information to the merge candidate list.

6) If it is determined to add the combined inter-prediction information to the merge candidate list, the processing unit may add the combined inter-prediction information to the merge candidate list.

When tasks 1) to 5) are performed on one block, task 1) may be performed on a subsequent block.

For example, the processing unit may configure a merge candidate list in the sequence of (B, J, K, A, F).

For example, the processing unit may configure a merge candidate list in the sequence of (J, B, A, K, F).

Figure 23:
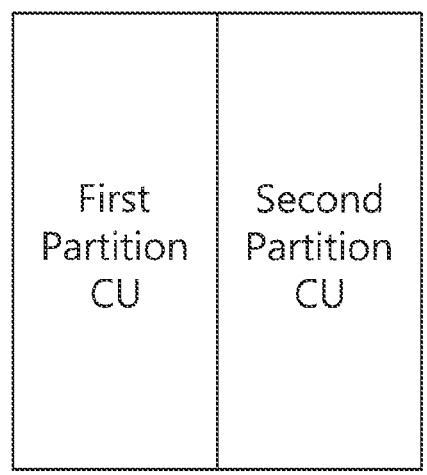
FIG. 23 illustrates the case where a CU of which the width and height are the same is vertically split.

FIG. 23 illustrates the case where a CU of which the width and height are the same is vertically split.

Figure 24:
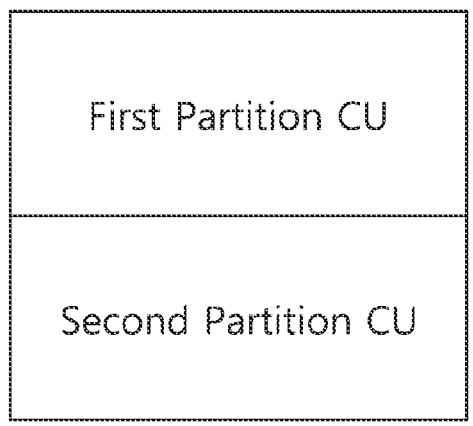
FIG. 24 illustrates the case where a CU of which the width and height are the same is horizontally split.

FIG. 24 illustrates the case where a CU of which the width and height are the same is horizontally split.

Figure 25:
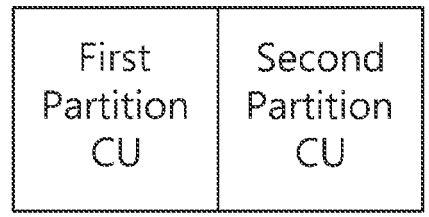
FIG. 25 illustrates the case where a CU having a width greater than a height is vertically split.

FIG. 25 illustrates the case where a CU having a width greater than a height is vertically split.

Figure 26:
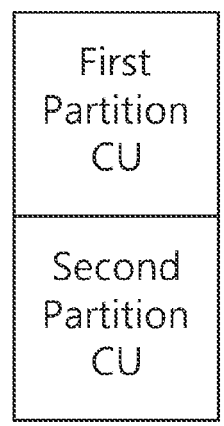
FIG. 26 illustrates the case where a CU having a height greater than a width is horizontally split.

FIG. 26 illustrates the case where a CU having a height greater than a width is horizontally split.

The comparison between the width and the height and the direction of splitting may be used to determine the sequence of neighbor blocks.

The processing unit may determine a scheme for configuring the merge candidate list based on the shape of a target block.

The scheme for configuring the merge candidate list may include the sequence of neighbor blocks needed to configure the merge list. The sequence of neighbor blocks may be the sequence of an availability test for pieces of inter-prediction information of neighbor blocks and the addition of the pieces of inter-prediction information.

When the height of the target block is greater than the width of the target block, the processing unit may configure a merge candidate list in the sequence of (J, B, K, A, F), whereas when the height of the target block is less than or equal to the width of the target block, the processing unit may configure the merge candidate list in the sequence of (B, J, K, A, F).

When the height of the target block is greater than the width of the target block, the processing unit may configure a merge candidate list in the sequence of (J, B, A, K, F), whereas when the height of the target block is less than or equal to the width of the target block, the processing unit may configure the merge candidate list in the sequence of (B, J, K, A, F).

For example, when the height of the target block is greater than the width of target block, the processing unit may configure the merge candidate list in the sequence of (J, K, B, A, F), when the height of the target block is less than the width of the target block, the processing unit may configure the merge candidate list in the sequence of (B, A, J, K, F), and when the height and width of the target block are equal to each other, the processing unit may configure the merge candidate list in the sequence of (B, J, K, A, F).

For example, when the height of the target block is greater than the width of the target block, the processing unit may configure a merge candidate list using pieces of inter-prediction information of spatial neighbor blocks located above the target block. When the height of the target block is greater than the width of the target block, the processing unit may configure a merge candidate list in the sequence of (F, G, H, I, J, K).

For example, when the height of the target block is less than the width of the target block, the processing unit may configure a merge candidate list using pieces of inter-prediction information of spatial neighbor blocks located to the left of the target block. When the height of the target block is less than the width of the target block, the processing unit may configure a merge candidate list in the sequence of (A, B, C, D, E, F).

The processing unit may determine a scheme for configuring a merge candidate list based on the state of splitting of the target block.

The state of splitting may mean the direction of splitting. The splitting state of the target block may be the type or direction of splitting that is used to generate the target block. Alternatively, the splitting state of the target block may be the type or direction of splitting that is applied to the upper block of the target block.

For example, when the target block is obtained as a result of vertical splitting, the processing unit may configure a merge candidate list in the sequence of (J, B, K, A, F), whereas when the target block is not obtained as a result of vertical splitting, the processing unit may configure the merge candidate list in the sequence of (B, J, K, A, F).

For example, when the target block is obtained as a result of vertical splitting, the processing unit may configure a merge candidate list in the sequence of (J, B, A, K, F), whereas when the target block is not obtained as a result of vertical splitting, the processing unit may configure the merge candidate list in the sequence of (B, J, K, A, F).

For example, depending on which one of vertical splitting, horizontal splitting, and quad-splitting has been used to obtain the target block, the processing unit may select one of different sequences of neighbor blocks, and may configure a merge candidate list in the selected sequence.

For example, when the target block is obtained as a result of vertical splitting, the processing unit may configure a merge candidate list in the sequence of (J, K, B, A, F). When the target block is obtained as a result of horizontal splitting, the processing unit may configure a merge candidate list in the sequence of (B, A, J, K, F). When the target block is obtained as a result of quad-splitting, the processing unit may configure a merge candidate list in the sequence of (B, J, K, A, F).

For example, when the target block is obtained as a result of vertical splitting, the processing unit may configure a merge candidate list using pieces of inter-prediction information of spatial neighbor blocks located above the target block. When the target block is obtained as a result of vertical splitting, the processing unit may configure a merge candidate list in the sequence of (F, G, H, I, J, K).

For example, when the target block is obtained as a result of horizontal splitting, the processing unit may configure a merge candidate list using pieces of inter-prediction information of spatial neighbor blocks located to the left of the target block. When the target block is obtained as a result of horizontal splitting, the processing unit may configure a merge candidate list in the sequence of (A, B, C, D, E, F).

The processing unit may determine a scheme for configuring a merge candidate list based both on the shape of the target block and on the splitting state of the target block.

For example, when the height of the target block is greater than the width of the target block or when the height and width of the target block are equal to each other, and when the target block is obtained as a result of vertical splitting, the processing unit may configure a merge candidate list in the sequence of (J, B, K, A, F). In other cases, the processing unit may configure the merge candidate list in the sequence of (B, J, K, A, F).

For example, when the height of the target block is greater than the width of the target block or the height and width of the target block are equal to each other, and when the target block is obtained as a result of vertical splitting, the processing unit may configure a merge candidate list in the sequence of (J, B, A, K, F). In other cases, the processing unit may configure the merge candidate list in the sequence of (B, J, K, A, F).

For example, when the height of the target block is greater than the width of the target block or when the height and width of the target block are equal to each other, and when the target block is obtained as a result of vertical splitting, the processing unit may configure a merge candidate list in the sequence of (J, K, B, A, F). When the height of the target block is less than the width of the target block or when the target block is obtained as a result of horizontal splitting, the processing unit may configure a merge candidate list in the sequence of (B, A, J, K, F). When the height and width of the target block are equal to each other and when the target block is obtained as a result of quad-splitting, the processing unit may configure a merge candidate list in the sequence of (B, J, K, A, F).

For example, when the height of the target block is greater than the width of the target block, or the height and width of the target block are equal to each other, and when the target block is obtained as a result of vertical splitting, the processing unit may configure a merge candidate list using pieces of inter-prediction information of spatial neighbor blocks located above the target block. When the height of the target block is greater than the width of the target block, or the height and width of the target block are equal to each other, and when the target block is obtained as a result of vertical splitting, the processing unit may configure a merge candidate list in the sequence of (F, G, H, I, J, K).

For example, when the height of the target block is less than the width of the target block or when the target block is obtained as a result of horizontal splitting, the processing unit may configure a merge candidate list using pieces of inter-prediction information of spatial neighbor blocks located to the left of the target block. When the height of the target block is less than the width of the target block or when the target block is obtained as a result of horizontal splitting, the processing unit may configure a merge candidate list in the sequence of (A, B, C, D, E, F).

The processing unit may determine a scheme for configuring a merge candidate list based on the location of the target block.

The location of the target block may be the relative location thereof in an upper block. By splitting the upper block, multiple partition blocks may be generated, and the target block may be one of the multiple partition blocks. The location of the target block may be the location of the target block in the upper block or the location of the target block among the multiple partition blocks. Splitting may be binary splitting or quad-splitting.

For example, in FIG. 23, the processing unit may apply a uniform configuration method to a merge candidate list for a first partition CU and apply an adaptive configuration method to a merge candidate list for a second partition CU.

The processing unit may determine a scheme for configuring a merge candidate list based on whether there is combined inter-prediction information. In the configuration of a merge candidate list, the processing unit may adjust the priority of combined inter-prediction information when there is combined inter-prediction information. Here, the priority may refer to the location of combined inter-prediction information in the merge candidate list, the index of the combined inter-prediction information or the sequence of addition of the combined inter-prediction information to the merge candidate list.

For example, when the merge candidate list is configured in the sequence of (B, J, K, A, F), if block B has combined inter-prediction information, the processing unit may configure the merge candidate list in the sequence of (J, K, A, F, B). In other words, the processing unit may assign the lowest priority to the combined inter-prediction information. Alternatively, in the configuration of a merge candidate list, the processing unit may add the combined inter-prediction information to a location in the merge candidate list subsequent to pieces of inter-prediction information. In other words, the processing unit may add the combined inter-prediction information to the merge candidate list with lower priority to follow pieces of inter-prediction information of neighbor blocks.

For example, when the merge candidate list is configured in the sequence of (B, J, K, N, F) and block N has a temporal neighbor block, if block F has combined inter-prediction information, the processing unit may configure a merge candidate list in the sequence of (B, J, K, F, N). In other words, the processing unit may assign priority that is lower than those of pieces of inter-prediction information of spatial neighbor blocks and is higher than that of inter-prediction information of the temporal neighbor block to the combined inter-prediction information.

Alternatively, in the configuration of a merge candidate list, the processing unit may add combined inter-prediction information to a location in the merge candidate list that is subsequent to inter-prediction information of a spatial neighbor block and is previous to inter-prediction information of a temporal neighbor block. Alternatively, the processing unit may assign combined inter-prediction information a priority that is higher than that of inter-prediction information of a temporal neighbor block. Alternatively, in the configuration of a merge candidate list, the processing unit may add combined inter-prediction information to a location in the merge candidate list that is previous to inter-prediction information of a temporal neighbor block.

For example, when there are multiple pieces of combined inter-prediction information, the sequence of the multiple pieces of combined inter-prediction information may be maintained without change depending on the above-described sequence determination scheme.

The processing unit may determine a method for configuring a merge candidate list based on the depth of a target block. The depth of the target block may be at least one of a Quad-Tree (QT) depth based on QT splitting and a Binary tree (BT) depth based on BT splitting.

For example, the processing unit may determine a scheme for configuring a merge candidate list based on whether the depth of a target block falls within a specific range.

For example, when the BT depth of the target block is less than or equal to n, the processing unit may configure a merge candidate list using at least one of the above-described scheme for configuring the merge candidate list based on the shape of the target block and the above-described scheme for configuring the merge candidate list based on the splitting state of the target block. For example, n may be 1.

In an embodiment, when the QT depth of the target block is equal to or greater than n and the BT depth thereof is less than or equal to m, the processing unit may configure a merge candidate list using at least one of the above-described scheme for configuring the merge candidate list based on the shape of the target block and the above-described scheme for configuring the merge candidate list based on the splitting state of the target block. For example, n may be 3, and m may be 1.

The processing unit may determine a scheme for configuring a merge candidate list based on the location of the target block and the depth of the target block.

For example, when the BT depth of the target block is less than or equal to n and the target block is a block located in a lower portion, among partition blocks generated by horizontal splitting, the processing unit may configure a merge candidate list using at least one of the above-described scheme for configuring the merge candidate list based on the shape of the target block and the above-described scheme for configuring the merge candidate list based on the splitting state of the target block. Here, n may be 1.

Configuration of AMVP Candidate List

The processing unit may derive inter-prediction information of a target block using an AMVP mode.

The processing unit may configure an AMVP candidate list. The number of AMVP candidates in the AMVP candidate list may be N. N may be a positive integer. For example, the AMVP candidate list may include two AMVP candidates.

For example, such an AMVP candidate may be inter-prediction information or motion information. Alternatively, the AMVP candidate may include a motion vector or a reference picture list.

The processing unit may configure an AMVP candidate list using one or more of inter-prediction information of a spatial neighbor block, inter prediction information of a temporal neighbor block, and combined inter-prediction information.

The processing unit may derive one AMVP candidate from inter-prediction information of a neighbor block to the left of a target block, and may derive one AMVP candidate from inter-prediction information of a neighbor block above the target block. When the AMVP candidate list is not filled up with candidates, the processing unit may derive an additional AMVP candidate from inter-prediction information of the temporal neighbor block.

The processing unit may derive an AMVP candidate using pieces of inter-prediction information of neighbor blocks in the specific sequence of the neighbor blocks, and may add the derived AMVP candidate to the AMVP candidate list. Here, the AMVP candidate list may be differently configured in the sequence of neighbor blocks, and the prediction efficiency and coding efficiency of encoding and decoding that use the AMVP candidate list may vary depending on the sequence of neighbor blocks.

The processing unit may derive an AMVP candidate in the specific sequence of left neighbor blocks. Here, the derivation of the AMVP candidate in the specific sequence of neighbor blocks may mean that the AMVP candidate is derived using pieces of inter-prediction information of neighbor blocks selected in the specific sequence.

In the derivation of an AMVP candidate in the specific sequence of neighbor blocks, when inter-prediction information of a neighbor block at the current sequential position is available, the processing unit may derive an AMVP candidate using the inter-prediction information of the neighbor block at the current sequential position. When inter-prediction information of the neighbor block at the current sequential position is unavailable, the processing unit may derive an AMVP candidate using inter-prediction information of a neighbor block at a subsequent sequential position. In other words, the processing unit may derive an AMVP candidate using inter-prediction information of a preceding neighbor block that appears first and has available inter-prediction information, among neighbor blocks.

The fact that inter-prediction information of a neighbor block is unavailable may mean that at least one of the following cases 1) to 3) is satisfied.

1) The case where inter-prediction information of a neighbor block is not present 2) The case where a neighbor block and a target block are included in different slices, tiles, or pictures 3) The case where an AMVP candidate derived using inter-prediction information is identical to another AMVP candidate already included in an AMVP list, that is, the case where an AMVP candidate derived using the inter-prediction information is a duplicate AMVP candidate For example, the processing unit may derive an AMVP candidate in the sequence of (A, B) upon deriving an AMVP candidate using left neighbor blocks. In other words, when the inter-prediction information of block A is available, an AMVP candidate derived by the inter-prediction information of block A may be may be included in the AMVP list, and when the inter-prediction information of block A is unavailable and the inter-prediction information of block B is available, an AMVP candidate derived by the inter prediction information of block B may be included in the AMVP list.

For example, the processing unit may derive an AMVP candidate in the sequence of (B, A) upon deriving an AMVP candidate using left neighbor blocks.

For example, the processing unit may derive an AMVP candidate in the sequence of (A, B, C, D, E) upon deriving an AMVP candidate using left neighbor blocks.

The processing unit may derive an AMVP candidate in the specific sequence of above neighbor blocks.

For example, the processing unit may derive an AMVP candidate in the sequence of (K, J, F) upon deriving an AMVP candidate using above neighbor blocks.

For example, the processing unit may derive an AMVP candidate in the sequence of (K, F, J) upon deriving an AMVP candidate using above neighbor blocks.

When inter-prediction information of a neighbor block is not present or is unavailable, the processing unit may use, instead of the inter-prediction information of the neighbor block, combined inter-prediction information in order to derive an AMVP candidate.

When configuring an AMVP candidate list using the inter-prediction information of a spatial neighbor block, the processing unit may determine a scheme for configuring an AMVP candidate list based on the shape of a target block.

For example, when the height of the target block is greater than the width of the target block, the processing unit may configure an AMVP list using at least one of the following schemes 1) to 3).

1) The processing unit may derive one AMVP candidate from inter-prediction information of an above neighbor block of a target block, and may then derive one AMVP candidate from inter-prediction information of a left neighbor block of the target block.

2) The processing unit may configure an AMVP candidate list using only pieces of inter-prediction information of above neighbor blocks of the target block.

3) The processing unit may configure an AMVP candidate list in the sequence of (J, B, K, A, F) or the sequence of (J, B, A, K, F).

For example, when the height of the target block is less than the width of the target block, the processing unit may configure an AMVP list using at least one of the following schemes 4) to 6).

4) The processing unit may derive one AMVP candidate from inter-prediction information of a left neighbor block of the target block, and may then derive one AMVP candidate from inter-prediction information of an above neighbor block of the target block.

5) The processing unit may configure an AMVP candidate list using only pieces of inter-prediction information of left neighbor blocks of the target block.

6) The processing unit may configure an AMVP candidate list in the sequence of (B, J, K, A, F) or the sequence of (B, A, J, K, F).

For example, when the height of the target block is equal to the width of the target block, the processing unit may configure an AMVP candidate list using at least one of the following schemes 7) and 8).

7) The processing unit may configure an AMVP candidate list using at least one of the above-described schemes 1) to 6).

8) The processing unit may configure an AMVP candidate list using pieces of inter-prediction information of left neighbor blocks of the target block and pieces of inter-prediction information of above neighbor blocks of the target block.

The processing unit may determine a scheme for configuring an AMVP candidate list based on the splitting state of the target block.

For example, when the target block is obtained as a result of vertical splitting, the processing unit may derive one AMVP candidate from inter-prediction information of an above neighbor block of the target block, and may then derive one AMVP candidate from inter-prediction information of a left neighbor block of the target block.

For example, when the target block is obtained as a result of horizontal splitting, the processing unit may derive one AMVP candidate from inter-prediction information of a left neighbor block of the target block, and may then derive one AMVP candidate from inter-prediction information of an above neighbor block of the target block.

For example, the processing unit may configure an AMVP candidate list using the above-described scheme for determining a merge candidate list based on the splitting state of the target block.

The processing unit may determine a scheme for configuring an AMVP candidate list based both on the shape of the target block and on the splitting state of the target block.

For example, when the height of the target block is greater than the width of the target block or the height and width of the target block are equal to each other, and when the target block is obtained as a result of vertical splitting, the processing unit may derive one AMVP candidate from the inter-prediction information of the above neighbor block for the target block, and may then derive one AMVP candidate from the inter-prediction information of the left neighbor block or the above neighbor block for the target block.

For example, when the height of a target block is less than the width of the target block or the height and width of the target block are equal to each other and when the target block is obtained as a result of horizontal splitting, the processing unit may derive one AMVP candidate from inter-prediction information of the left neighbor block for the target block, and may then derive one AMVP candidate from the inter-prediction information of the left neighbor block or the above neighbor block for the target block.

The processing unit may determine a scheme for configuring an AMVP candidate list based on the location of the target block.

The location of the target block may be the relative location thereof in an upper block. By splitting the upper block, multiple partition blocks may be generated, and the target block may be one of the multiple partition blocks. The location of the target block may be the location of the target block in the upper block or the location of the target block among the multiple partition blocks. Splitting may be binary splitting or quad-splitting.

For example, in FIG. 23, the processing unit may apply a uniform configuration method to an AMVP candidate list for a first partition CU and apply an adaptive configuration method to an AMVP candidate list for a second partition CU.

The processing unit may determine a method for configuring an AMVP candidate list based on the depth of a target block. The depth of the target block may be at least one of a Quad-Tree (QT) depth based on QT splitting and a Binary tree (BT) depth based on BT splitting.

For example, the processing unit may determine a scheme for configuring an AMVP candidate list based on whether the depth of a target block falls within a specific range.

For example, when the BT depth of the target block is less than or equal to n, the processing unit may configure an AMVP candidate list using at least one of the above-described scheme for configuring the AMVP candidate list based on the shape of the target block and the above-described scheme for configuring the AMVP candidate list based on the splitting state of the target block. For example, n may be 1.

For example, when the QT depth of the target block is equal to or greater than n and the BT depth thereof is less than or equal to m, the processing unit may configure the AMVP candidate list using at least one of the above-described scheme for configuring an AMVP candidate list based on the shape of the target block and the above-described scheme for configuring an AMVP candidate list based on the splitting state of the target block. For example, n may be 3, and m may be 1.

The processing unit may determine a scheme for configuring an AMVP candidate list based on the location of the target block and the depth of the target block.

For example, when the BT depth of the target block is less than or equal to n and the target block is a block located in a lower portion, among partition blocks generated by horizontal splitting, the processing unit may configure an AMVP candidate list using at least one of the above-described scheme for configuring the AMVP candidate list based on the shape of the target block and the above-described scheme for configuring the AMVP candidate list based on the splitting state of the target block. Here, n may be 1.

The details described in the above-described configurations of the merge candidate list and the AMVP candidate list may be applied to each other. For example, features described in relation to the derivation and addition of one of a merge candidate and an AMVP candidate may also be applied to the derivation and addition of the other candidate. Repetitive descriptions will be omitted here.

Derivation of Inter-Prediction Information of Target Block Using Sub-Block

When deriving inter-prediction information of a target block, the processing unit may use inter-prediction information of a sub-block of the target block. In other words, the processing unit may use inter-prediction information corresponding to the unit of a sub-block when deriving the inter-prediction information of the target block.

The processing unit may split the target block into multiple sub-blocks, and may derive inter-prediction information of each of the multiple sub-blocks. For example, the processing unit may split the target block into N sub-blocks, and may derive N pieces of inter-prediction information for the N sub-blocks. N may be a positive integer.

Figure 27:
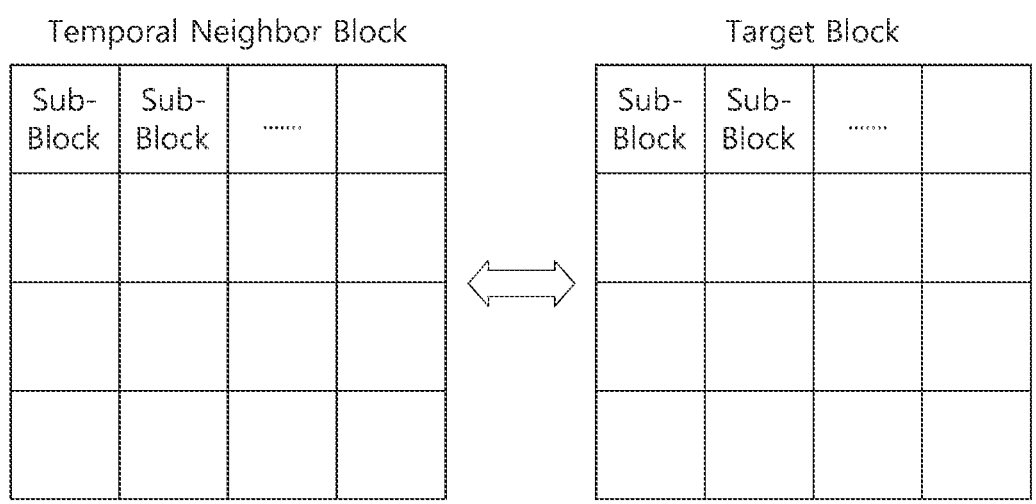
FIG. 27 illustrates sub-blocks of a temporal neighbor block and sub-blocks of a target block according to an example.

FIG. 27 illustrates sub-blocks of a temporal neighbor block and sub-blocks of a target block according to an example.

When inter-prediction information of a temporal neighbor block is available, the processing unit may partition the temporal neighbor block into multiple sub-blocks, and may derive pieces of inter-prediction information of multiple sub-blocks of the target block using pieces of inter-prediction information of the multiple sub-blocks of the temporal neighbor block.

The processing unit may derive the pieces of inter-prediction information of the sub-blocks of the target block using the pieces of inter-prediction information of the sub-blocks of the temporal neighbor block. Here, the location of a sub-block of the target block within the target block and the location of a sub-block of the temporal neighbor block within the temporal neighbor block may be identical to each other.

For example, the processing unit may partition temporal neighbor block N, illustrated in FIG. 16, into 4×4 temporal sub-blocks, and may derive pieces of inter-prediction information of 4×4 sub-blocks of the target block using the inter-prediction information of each temporal sub-block.

For example, the processing unit may partition temporal neighbor block N, illustrated in FIG. 16, into 2N×N temporal sub-blocks, and may derive pieces of inter-prediction information of 2N×N sub-blocks of the target block using the inter-prediction information of each temporal sub-block.

Figure 28:
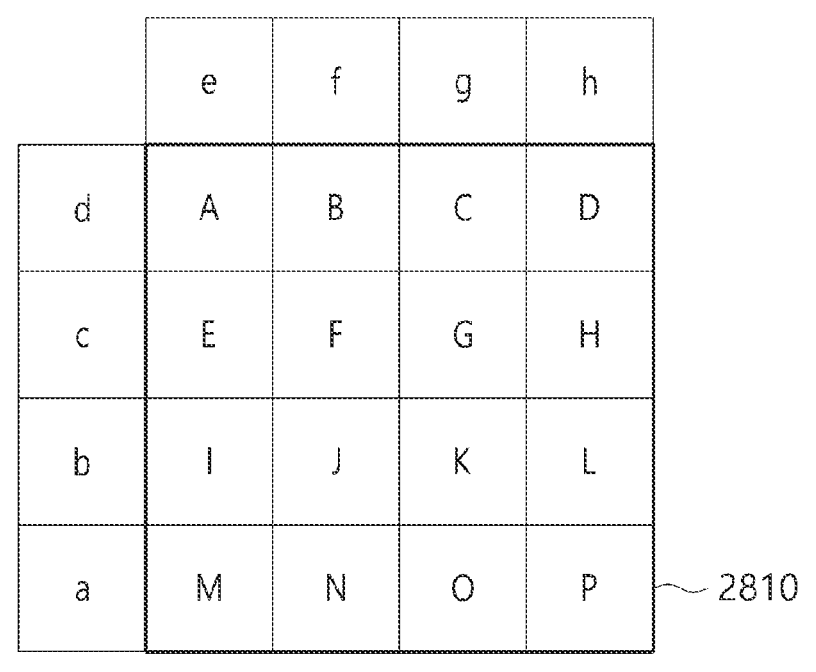

FIG. 28 illustrates spatial neighbor blocks of a target block and sub-blocks of the target block according to an example.

In FIG. 28, sub-blocks are indicated by capital letters "A" to "P", and spatial neighbor blocks are indicated by small letters "a" to "h".

The processing unit may split the target block into multiple sub-blocks, and may derive pieces of inter-prediction information of sub-blocks of the target block using pieces of inter-prediction information of spatial neighbor blocks for the sub-blocks of the target block.

Here, the spatial neighbor blocks for the sub-blocks of the target block may include 1) an additional sub-block that is adjacent to the corresponding sub-block of the target block and 2) a block that is adjacent to the corresponding sub-block of the target block and is also a spatial neighbor block of the target block. Further, the spatial neighbor block may be a block on which encoding and/or decoding are performed before the corresponding sub-block is encoded and/or decoded.

The processing unit may derive inter-prediction information of the sub-block using pieces of inter-prediction information of the spatial neighbor blocks of the sub-block. The processing unit may derive the inter-prediction information of the sub-block using pieces of inter-prediction information of multiple spatial neighbor blocks of the sub-block. For example, the inter-prediction information of the sub-block may be the average of the pieces of inter-prediction information of the multiple spatial neighbor blocks of the sub-block.

For example, the processing unit may derive inter-prediction information of sub-block A using 1) inter-prediction information of spatial neighbor block d, 2) inter-prediction information of spatial neighbor block e, or 3) the average of pieces of inter-prediction information of spatial neighbor block d and spatial neighbor block e.

For example, the processing unit may derive inter-prediction information of sub-block K using the average of pieces of inter-prediction information of one or more of block J, block F, block G, and block H, which are spatial neighbor blocks of sub-block K.

When deriving the inter-prediction information of the sub-block of the target block, the processing unit may simultaneously use a temporal neighbor block for the sub-block of the target block and a spatial neighbor block for the sub-block of the target block.

Derivation of Inter-Prediction Information Using Bilateral Matching

Figure 29:
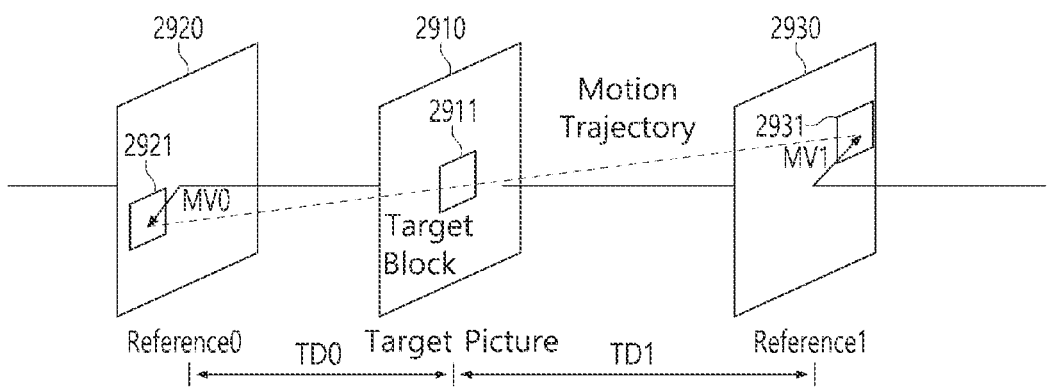
FIG. 29 illustrates the derivation of inter-prediction information using bilateral matching according to an example.

FIG. 29 illustrates the derivation of inter-prediction information using bilateral matching according to an example.

The processing unit may derive inter-prediction information using bilateral matching.

When performing bilateral matching, the processing unit may configure an initial motion vector candidate list for a target block, and may use at least one of one or more initial motion vector candidates, included in the configured initial motion vector candidate list, as an initial motion vector.

For example, the processing unit may use an AMVP mode so as to configure the initial motion vector candidate list for the target block. AMVP candidates in the AMVP candidate list in the AMVP mode may be the one or more initial motion vector candidates in the initial motion vector candidate list. The processing unit may add the AMVP candidates included in the AMVP candidate list to the initial motion vector candidate list.

For example, the processing unit may use a merge mode so as to configure the initial motion vector candidate list for the target block. Merge candidates in the merge candidate list in the merge mode may be the one or more initial motion vector candidates in the initial motion vector candidate list. The processing unit may add the merge candidates in the merge mode to the initial motion vector candidate list.

For example, the processing unit may configure a Frame Rate Up-Conversion (FRUC) unidirectional motion vector for the target block as the initial motion vector candidate list. The processing unit may add the FRUC unidirectional motion vector for the target block to the initial motion vector candidate list.

For example, the processing unit may configure the motion vector of the neighbor block of the target block as the initial motion vector candidate list. The processing unit may add the motion vector of the neighbor block of the target block to the initial motion vector candidate list.

For example, the processing unit may configure combinations of the above-described motion vectors as the initial motion vector candidate list. The number of combinations of motion vectors may be N or more. N may be a positive integer. The processing unit may add the combinations of the above-described motion vectors to the initial motion vector candidate list.

For example, the processing unit may use a motion vector for at least one of the direction of reference picture list L0 and the direction of reference picture list L1 upon configuring the initial motion vector list. The processing unit may add the motion vector for at least one of the direction of reference picture list L0 and the direction of reference picture list L1 to the initial motion vector list.

The processing unit may derive an initial motion vector for the target block when performing bilateral matching. The processing unit may derive the initial motion vector using the initial motion vector list.

When performing bilateral matching, the processing unit may derive a bidirectional motion vector that allows an initial motion vector indication block and the opposite block to best match each other using the initial motion vector list.

The initial motion vector indication block may be a block indicated by the initial motion vector. The opposite block may be a block present on the same trajectory as the initial motion vector indication block in a direction opposite that of the initial motion vector indication block. In other words, the direction of the initial motion vector indication block and the direction of the opposite block may be opposite each other, and the trajectory of the initial motion vector indication block and the trajectory of the opposite block may be identical to each other.

For example, as illustrated in FIG. 29, the processing unit may perform bilateral matching on a target block 2911 in a target picture 2910. When a motion vector present in the initial motion vector list is MV0 in reference picture Reference0 2920, the processing unit may derive motion vector MV1 1) which is present in reference picture Reference1 2930 present in a direction opposite that of MV0, 2) which is present on the same trajectory as the MV0, and 3) which indicates a block 2931 best matching a block 2921 indicated by the MV0.

In other words, when the processing unit derives the motion vector MV0 using the initial motion vector for the target block and determines motion vector MV1 depending on the MV0, 1) the direction of the MV1 may be opposite that of the MV0, and the motion trajectory of the MV1 may be identical to that of the MV0.

The processing unit may improve the initial motion vector.

For example, the processing unit may search for blocks neighboring the block indicated by the derived MV0, and may also search for blocks neighboring the block indicated by the derived MV1. The processing unit may improve the initial motion vector so that the best-matching blocks are indicated among the blocks neighboring the block indicated by the MV0 and the blocks neighboring the block indicated by the MV1.

When performing bilateral matching, the processing unit may derive inter-prediction information on a sub-block basis. The inter-prediction information may include motion information and/or a motion vector.

When deriving the motion information on a sub-block basis, the processing unit may use the above-described scheme for deriving an initial motion vector for a block to derive an initial motion vector for the sub-block.

When performing bilateral matching, the processing unit may define the degree of matching between blocks. That is, the processing unit may use one of specific defined schemes upon determining the degree of matching between blocks.

For example, the processing unit may determine that, when the Sum of Absolute Differences (SAD) between two blocks is the smallest, the two blocks best match each other. That is, the processing unit may determine that, as the SAD between two blocks is smaller, the two blocks better match each other.

For example, the processing unit may determine that, when the Sum of Absolute Transformed Differences (SATD) between two blocks is the smallest, the two blocks best match each other. That is, the processing unit may determine that, as the SATD between two blocks is smaller, the two blocks better match each other.

Derivation of Inter-Prediction Information Using Template Matching

Figure 30:
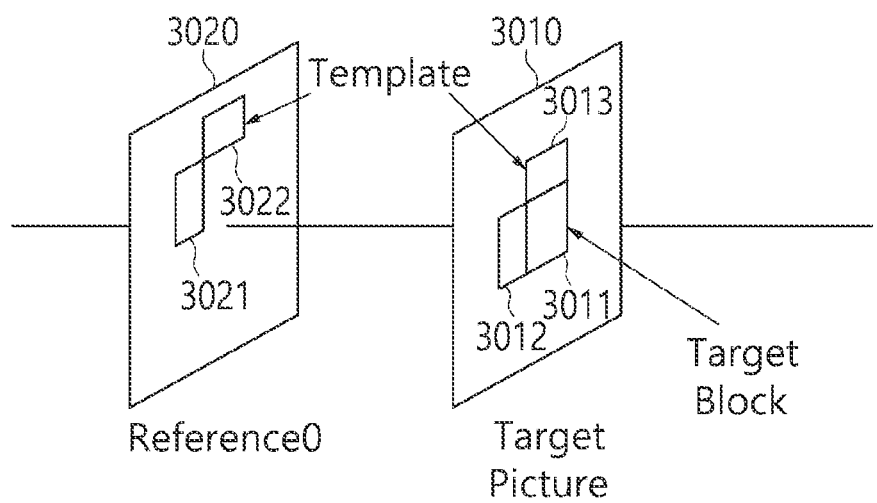
FIG. 30 illustrates the derivation of inter-prediction information using a template-matching mode according to an example.

FIG. 30 illustrates the derivation of inter-prediction information using a template-matching mode according to an example.

In FIG. 30, a target block 3011 in a target picture 3010 is illustrated.

The processing unit may derive inter-prediction information using template matching.

When performing template matching, the processing unit may use a neighbor block of a target block as a template. The size and location of the template may be set based on a predefined scheme.

For example, the processing unit may use a neighbor block 3013 adjacent to the top of the target block 3011 as the template.

For example, the processing unit may use a neighbor block 3012 adjacent to the left of the target block 3011 as the template.

For example, the processing unit may use the neighbor block 3013 adjacent to the top of the target block 3011 or the neighbor block 3012 adjacent to the left thereof as the template.

In an embodiment, when performing template matching, the processing unit may search a reference picture for a block using the template. In FIG. 30, "reference 0 (3020)" may be the reference picture.

When performing template matching, the processing unit may derive inter-prediction information using the template.

The processing unit may search the reference picture for a block corresponding to the template. The shape and size of the block corresponding to the template may be identical to those of the template. The block corresponding to the template may be the block best matching the template in the reference picture.

The processing unit may derive a motion vector indicating the block corresponding to the template. In other words, the processing unit may derive a motion vector indicating the block best matching the template in the reference picture.

For example, in FIG. 30, a block 3022 corresponding to the template, found for the neighbor block 3013 adjacent to the top of the target block, and a block 3021 corresponding to the template, found for the neighbor block 3012 adjacent to the left of the target block, are depicted.

The processing unit may derive the motion vector of the target block using the motion vector of the block corresponding to the template. The processing unit may set the motion vector of the block corresponding to the template as the motion vector of the target block.

Here, the direction of the reference picture in which the block is found and the direction of the reference picture indicated by the motion vector of the target block may be opposite each other.

The processing unit may improve the motion vector. For example, the processing unit may search for blocks neighboring the block indicated by the current template and the derived motion vector, and may improve the motion vector so that the motion vector indicates the block best matching the template, among the found neighbor blocks. In other words, the improved motion vector may be a motion vector for the block that best matches the template, among the blocks neighboring the block indicated by the derived motion vector.

When performing template matching, the processing unit may derive inter-prediction information on a sub-block basis. The inter-prediction information may include motion information and a motion vector.

When deriving the motion information on a sub-block basis, the processing unit may use the above-described scheme for deriving a motion vector for a block to derive a motion vector for the sub-block.

When performing template matching, the processing unit may define the degree of matching between blocks. That is, the processing unit may use one of specific defined schemes upon determining the degree of matching between blocks.

For example, the processing unit may determine that, when the SAD between two blocks is the smallest, the two blocks best match each other. That is, the processing unit may determine that, as the SAD between two blocks is smaller, the two blocks better match each other.

For example, the processing unit may determine that, when the SATD between two blocks is the smallest, the two blocks best match each other. That is, the processing unit may determine that, as the SATD between two blocks is smaller, the two blocks better match each other.

Motion Compensation and Motion Correction for Inter Prediction

In inter prediction for a target block, the processing unit may perform inter prediction using at least one of motion compensation, IC, OBMC, BIO, affine space motion prediction and motion compensation, and motion vector correction in the decoding apparatus 1300.

The processing unit may perform motion compensation to perform inter prediction for a target block.

The processing unit may generate a prediction block for the target block using the derived inter-prediction information. Motion compensation may be unidirectional motion compensation or bidirectional motion compensation.

In an example, the processing unit may perform motion compensation using a block in one picture present in one reference picture list L0.

In an example, the processing unit may perform motion compensation by combining multiple blocks in one picture present in one reference picture list L0.

In an example, the processing unit may perform motion compensation by combining multiple blocks in multiple pictures present in one reference picture list L0.

In an example, the processing unit may perform motion compensation by combining one block in one picture present in reference picture list L0 with one block in one picture present in reference picture list L1.

In an example, the processing unit may perform motion compensation by combining multiple blocks in one picture present in reference picture list L0 with multiple blocks in one picture present in reference picture list L1.

In an example, the processing unit may perform motion compensation by combining multiple blocks in multiple pictures present in reference picture list L0 with multiple blocks in multiple pictures present in reference picture list L1.

The processing unit may perform Illumination Compensation (IC) to perform inter prediction for the target block.

When performing motion compensation, the processing unit may compensate for lightness variation and/or illumination variation between a reference picture including a reference block that is used for motion compensation and a target picture including a target block.

For example, the processing unit may approximate variation between a neighbor sample of the target block and a neighbor sample of the reference block to N or more linear models, and may perform illumination compensation by applying the linear models to a motion-compensated block. N may be a positive integer.

Figure 31:
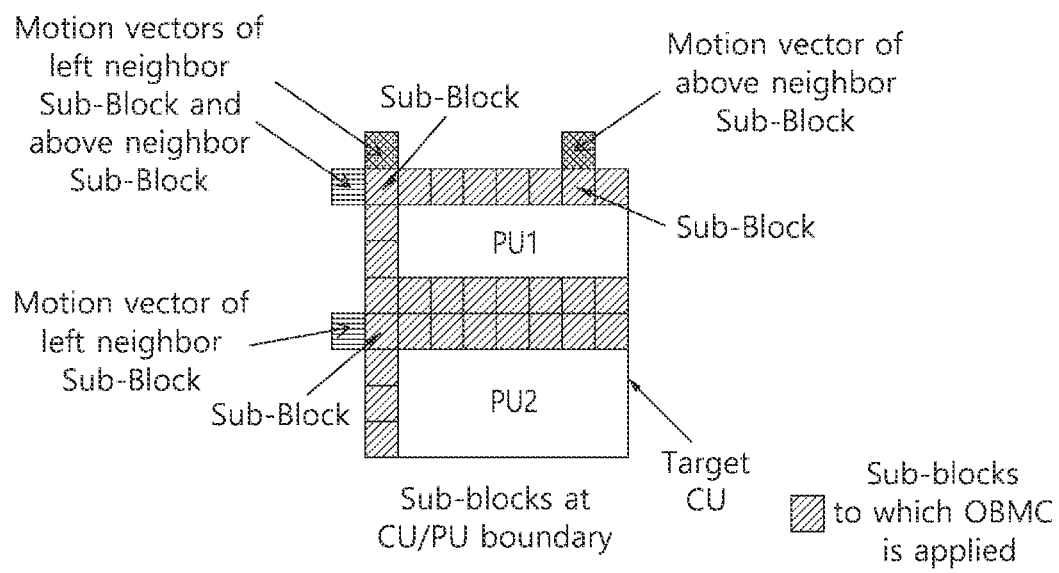
FIG. 31 illustrates the application of OBMC according to an example.

FIG. 31 illustrates the application of OBMC according to an example.

The processing unit may perform OBMC to perform inter prediction for a target block.

The processing unit may generate a prediction block by combining a first block with a second block. The first block may be a block generated via compensation that uses inter-prediction information of a target block. The second block may be one or more blocks generated via compensation that uses one or more pieces of inter-prediction information of one or more neighbor blocks adjacent to the target block. Here, the one or more neighbor blocks adjacent to the target block may include a left neighbor block adjacent to the left of the target block, a right neighbor block adjacent to the right of the target block, an above neighbor block adjacent to the top of the target block, and a below neighbor block adjacent to the bottom of the target block.

The processing unit may perform OBMC on each sub-block of the target block.

The processing unit may generate a prediction block by combining a first block with a second block. The first block may be a block generated via compensation that uses inter-prediction information of the sub-block of the target block. The second block may indicate one or more blocks generated via compensation that uses one or more pieces of inter-prediction information of one or more neighbor sub-blocks adjacent to the sub-block of the target block. The inter-prediction information may include a motion vector. Here, the one or more neighbor sub-blocks adjacent to the corresponding sub-block of the target block may include a left neighbor sub-block adjacent to the left of the sub-block of the target block, a right neighbor sub-block adjacent to the right of the sub-block of the target block, an above neighbor sub-block adjacent to the top of the sub-block of the target block, and a below neighbor sub-block adjacent to the bottom of the sub-block of the target block.

The processing unit may perform OBMC only on a specific sub-block, among the sub-blocks of the target block.

For example, the processing unit may perform OBMC only on a sub-block adjacent to the internal boundary of the target block.

In an example, the processing unit may perform OBMC on all sub-blocks of the target block.

For example, the processing unit may perform OBMC only on sub-blocks adjacent to the internal left boundary of the target block.

In an example, the processing unit may perform OBMC only on sub-blocks adjacent to the internal right boundary of the target block.

In an example, the processing unit may perform OBMC only on sub-blocks adjacent to the internal upper boundary of the target block.

In an example, the processing unit may perform OBMC only on sub-blocks adjacent to the internal lower boundary of the target block.

In FIG. 31, an example is illustrated in which a CU, which is the target block, is split into PU1 and PU2, OBMC is applied to 1) sub-blocks adjacent to the upper boundary, 2) sub-blocks adjacent to the left boundary, and 3) sub-blocks adjacent to the boundary between the PUs, among the sub-blocks of the CU.

Figure 32:
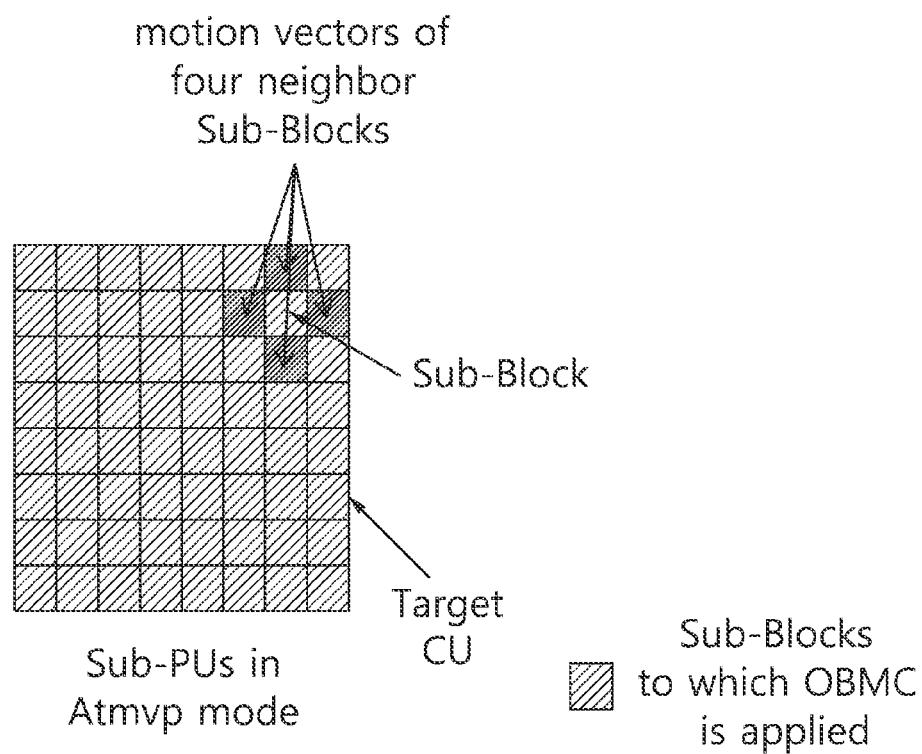
FIG. 32 illustrates sub-PUs in an ATMVP mode according to an example.

FIG. 32 illustrates sub-PUs in an ATMVP mode according to an example.

A target block may be split into multiple sub-blocks. The target block may be a target CU, and the sub-blocks may be sub-PUs. The processing unit may perform OBMC on all sub-blocks of the target CU.

The processing unit may generate a prediction block by combining a first block with a second block. The first block may be a block generated via compensation that uses inter-prediction information of each sub-block of the target block. The second block may be a block generated via compensation that uses pieces of inter-prediction information of the neighbor sub-blocks adjacent to the sub-block of the target block. The inter-prediction information may be a motion vector. Here, the neighbor sub-blocks adjacent to the corresponding sub-block of the target block may include a left neighbor sub-block adjacent to the left of the sub-block of the target block, a right neighbor sub-block adjacent to the right of the sub-block of the target block, an above neighbor sub-block adjacent to the top of the sub-block of the target block, and a below neighbor sub-block adjacent to the bottom of the sub-block of the target block.

The processing unit may perform affine space motion prediction and compensation to perform inter prediction for the target block.

In an example, the processing unit may generate motion vectors for respective pixels in the target block by applying an affine transformation equation to a first motion vector at the above-left location of the target block and to a second motion vector at the above-right location of the target block, and may perform motion compensation using the generated motion vectors.

In an example, the processing unit may generate motion vectors for respective sub-blocks in the target block by applying an affine transformation equation to a first motion vector at the above-left location of the target block and to a second motion vector at the above-right location of the target block, and may perform motion compensation using the generated motion vectors.

In order to provide the first motion vector and the second motion vector, at least one of the following schemes 1) to 3) may be used.

1) The first motion vector and the second motion vector may be transmitted from the encoding apparatus 1200 to the decoding apparatus 1300 (through a bitstream).

2) For each of the first motion vector and the second motion vector, the difference between the corresponding motion vector and a neighbor motion vector thereof may be transmitted from the encoding apparatus 1200 to the decoding apparatus 1300.

3) The first motion vector and the second motion vector may be derived using the affine motion vector of the neighbor block of the target block, without being transmitted.

The processing unit may perform BIO to perform inter prediction for a target block.

The processing unit may derive the motion vector of the target block using an optical flow that uses a unidirectional block.

The processing unit may derive the motion vector of the target block using a bidirectional optical flow that uses blocks present in a picture previous to the target picture in a display sequence and blocks present in a picture subsequent to the target picture. Here, the blocks present in the picture previous to the target picture and blocks present in the picture subsequent to the target picture may be blocks that have opposite motions and are similar to the target block.

The processing unit may perform motion vector correction on the decoding apparatus 1300 to perform inter prediction for the target block. The processing unit may perform correction on the motion vector of the target block using the motion vector that is transmitted to the decoding apparatus 1300.

Figure 33:
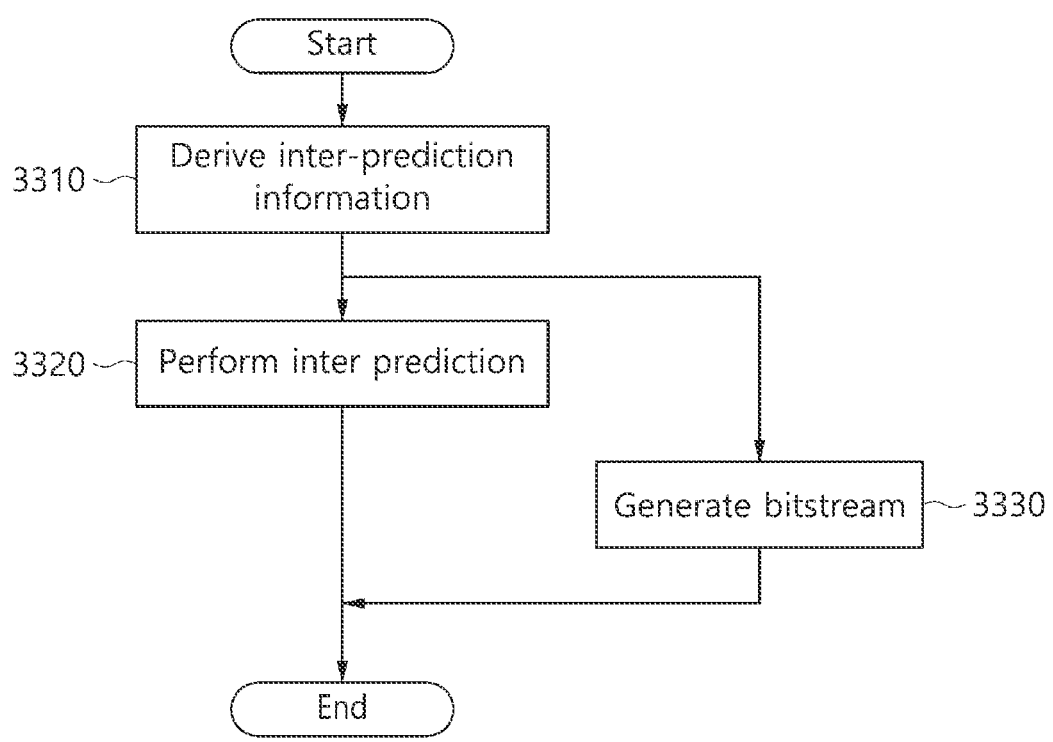
FIG. 33 is a flowchart illustrating a target block prediction method and a bitstream generation method according to an embodiment.

FIG. 33 is a flowchart illustrating a target block prediction method and a bitstream generation method according to an embodiment.

The target block prediction method and the bitstream generation method according to the present embodiment may be performed by an encoding apparatus 1200. The embodiment may be a part of a target block encoding method or a video encoding method.

At step 3310, the processing unit 1210 may derive inter-prediction information. Step 3310 may correspond to step 1410, described above with reference to FIG. 14.

At step 3320, the processing unit 1210 may perform inter prediction that uses the derived inter-prediction information. Step 3320 may correspond to step 1420, described above with reference to FIG. 14.

At step 3330, the processing unit 1210 may generate a bitstream.

The bitstream may include information about an encoded target block. For example, the information about the encoded target block may include transformed and quantized coefficients of the target block.

The bitstream may include information used to derive the inter-prediction information and information used for inter prediction.

In an example, the bitstream may include an indicator indicating a method for deriving the inter-prediction information.

For example, the bitstream may include an index indicating one of candidates present in the list of the encoding apparatus 1200 or the decoding apparatus 1300.

The processing unit 1210 may perform entropy encoding on the information used to derive the inter-prediction information and on the information used for inter prediction, and may generate a bitstream including pieces of entropy-encoded information.

The processing unit 1210 may store the generated bitstream in the storage 1340. Alternatively, the communication unit 1220 may transmit the bitstream to the decoding apparatus 1300.

Figure 34:
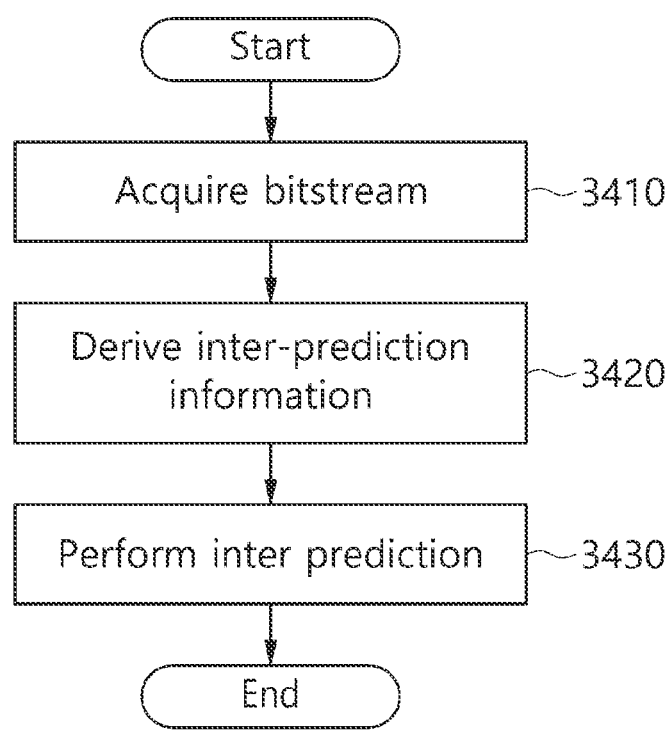
FIG. 34 is a flowchart illustrating a target block prediction method using a bitstream according to an embodiment.

FIG. 34 is a flowchart illustrating a target block prediction method using a bitstream according to an embodiment.

The target block prediction method using a bitstream according to the present embodiment may be performed by the decoding apparatus 1300. The embodiment may be a part of a target block decoding method or a video decoding method.

At step 3410, a communication unit 1320 may acquire a bitstream. The communication unit 1320 may receive the bitstream from the encoding apparatus 1200.

The bitstream may include information about an encoded target block. For example, the information about the encoded target block may include transformed and quantized coefficients of the target block.

The bitstream may include information used to derive inter-prediction information and information used for inter prediction.

For example, the bitstream may include an indicator indicating a method for deriving the inter-prediction information.

For example, the bitstream may include an index indicating one of candidates present in the list of each of the encoding apparatus 1200 and the decoding apparatus 1300.

The processing unit 1310 may store the acquired bitstream in the storage 1240.

The processing unit 1310 may acquire information used to derive inter-prediction information and information used for inter prediction by performing entropy decoding on pieces of entropy-encoded information in the bitstream.

At step 3420, the processing unit 1310 may derive inter-prediction information. Step 3420 may correspond to step 1410, described above with reference to FIG. 14.

At step 3430, the processing unit 1310 may perform inter prediction that uses the derived inter-prediction information. Step 3430 may correspond to step 1420 described above with reference to FIG. 14.

In the above-described embodiments, although the methods have been described based on flowcharts as a series of steps or units, the present disclosure is not limited to the sequence of the steps and some steps may be performed in a sequence different from that of the described steps or simultaneously with other steps. Further, those skilled in the art will understand that the steps shown in the flowchart are not exclusive and may further include other steps, or that one or more steps in the flowchart may be deleted without departing from the scope of the disclosure.

The above-described embodiments according to the present disclosure may be implemented as a program that can be executed by various computer means and may be recorded on a computer-readable storage medium. The computer-readable storage medium may include program instructions, data files, and data structures, either solely or in combination. Program instructions recorded on the storage medium may have been specially designed and configured for the present disclosure, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-ROM and a digital versatile disk (DVD), magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present disclosure, and vice versa.

As described above, although the present disclosure has been described based on specific details such as detailed components and a limited number of embodiments and drawings, those are merely provided for easy understanding of the entire disclosure, the present disclosure is not limited to those embodiments, and those skilled in the art will practice various changes and modifications from the above description.

Accordingly, it should be noted that the spirit of the present embodiments is not limited to the above-described embodiments, and the accompanying claims and equivalents and modifications thereof fall within the scope of the present disclosure.

The invention claimed is:

1. A video decoding method, comprising:
deriving inter prediction information for a target block; and
performing prediction for the target block using the inter prediction information, wherein:
a first list comprising a plurality of first candidates is configured for the target block,
the prediction is performed using the first list,
a candidate of a second list comprising a plurality of second candidates is used to add a candidate to the first list, and
the inter prediction information for the target block is added to the second list.

2. The video decoding method of claim 1, wherein
the plurality of first candidates are generated based on a plurality of neighbor blocks which are adjacent to the target block, and
the plurality of neighbor blocks include a left-most block among blocks adjacent to an upper side of the target block and an upper-most block among blocks adjacent to a left side of the target block.

3. The video decoding method of claim 1, wherein
the plurality of first candidates are generated by adding prediction information of a plurality of neighbor blocks which are adjacent to the target block to the first list according to a specific order,
according to the specific order, prediction information of an above neighbor block is added to the first list first, prediction information of a left neighbor block is added to the first list second,
the above neighbor block is a right-most block among blocks which are adjacent to an upper side of the target block, and
the left neighbor block is a lower-most block among block which are adjacent to a left side of the target block.

4. The video decoding method of claim 1, wherein
one candidate of the first list is generated based on prediction information of a plurality of neighbor blocks which are adjacent to the target block.

5. The video decoding method of claim 4, wherein
the one candidate is an average of two prediction information of two neighbor blocks.

6. The video decoding method of claim 4, wherein
the one candidate is generated based on prediction information of three neighbor blocks.

7. The video decoding method of claim 1, wherein
the inter prediction information comprises a motion vector, and
the motion vector is generated by a refinement for an initial motion vector.

8. The video decoding method of claim 7, wherein
the refinement is performed using a Sum of Absolute Differences (SAD) between two reference blocks.

9. A video encoding method, comprising:
deriving inter prediction information for a target block; and
generating an indicator indicating a method to derive the inter prediction information, wherein:
a first list comprising a plurality of first candidates is configured for the target block,
prediction is performed using the inter prediction information corresponding one of the plurality of first candidates,
a candidate of a second list comprising a plurality of second candidates is used to add a candidate to the first list, and
the inter prediction information for the target block is added to the second list.

10. The video encoding method of claim 9, wherein
the plurality of first candidates are generated based on a plurality of neighbor blocks which are adjacent to the target block, and
the plurality of neighbor blocks include a left-most block among blocks adjacent to an upper side of the target block and an upper-most block among blocks adjacent to a left side of the target block.

11. The video encoding method of claim 9, wherein
the plurality of first candidates are generated by adding prediction information of a plurality of neighbor blocks which are adjacent to the target block to the first list according to a specific order,
according to the specific order, prediction information of an above neighbor block is added to the first list first, prediction information of a left neighbor block is added to the list first second,
the above neighbor block is a right-most block among blocks which are adjacent to an upper side of the target block, and
the left neighbor block is a lower-most block among block which are adjacent to a left side of the target block.

12. The video encoding method of claim 9, wherein
one candidate of the first list is generated based on prediction information of a plurality of neighbor blocks which are adjacent to the target block.

13. The video encoding method of claim 12, wherein
the one candidate is an average of two prediction information of two neighbor blocks.

14. The video encoding method of claim 12, wherein
the one candidate is generated based on prediction information of three neighbor blocks.

15. The video encoding method of claim 9, wherein
a prediction is performed using the inter prediction information for a decoding for the target block using the indicator,
the inter prediction information comprises a motion vector, and
the motion vector is generated by a refinement for an initial motion vector.

16. The video encoding method of claim 15, wherein
the refinement is performed using a Sum of Absolute Differences (SAD) between two reference blocks.

17. A non-transitory computer-readable medium storing a bitstream generated by the video encoding method of claim 9.

18. A non-transitory computer-readable medium storing a bitstream, the bitstream comprising:
merge index;
wherein inter prediction information for a target block is derived,
prediction for the target block is performed using the merge index and the inter prediction information,
a first list comprising a plurality of first candidates is configured for the target block,
the merge index indicates one of the plurality of first candidates to be used for the prediction,
the prediction is performed using the first list,
a candidate of a second list comprising a plurality of second candidates is used to add a candidate to the first list, and
the inter prediction information for the target block is added to the second list.

* * * * *